US011371201B1

(12) United States Patent
Covington et al.

(10) Patent No.: US 11,371,201 B1
(45) Date of Patent: *Jun. 28, 2022

(54) SYSTEMS, APPARATUS AND METHODS FOR COLLECTING DEBRIS FROM A BODY OF WATER

(71) Applicant: Ocean Cleaner, LLC, Orange, TX (US)

(72) Inventors: Russell S. Covington, Orange, TX (US); Kim Michael Folse, Morgan City, LA (US)

(73) Assignee: Ocean Cleaner, LLC, Orange, TX (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/899,200

(22) Filed: Jun. 11, 2020

Related U.S. Application Data

(63) Continuation of application No. 16/052,045, filed on Aug. 1, 2018, now Pat. No. 10,683,627, which is a
(Continued)

(51) Int. Cl.
*E02B 15/04* (2006.01)
*E02B 15/08* (2006.01)
(Continued)

(52) U.S. Cl.
CPC .......... *E02B 15/0864* (2013.01); *B63B 35/32* (2013.01); *C02F 1/40* (2013.01); *E02B 15/048* (2013.01); *E02B 15/10* (2013.01); *E02B 15/106* (2013.01); *C02F 2103/007* (2013.01); *C02F 2201/008* (2013.01); *E02B 15/046* (2013.01)

(58) Field of Classification Search
CPC .... E02B 15/046; E02B 15/047; E02B 15/048; E02B 15/10; B63B 35/32
USPC ...... 210/747.6, 776, 170.05, 170.09, 170.11, 210/242.3, 923
See application file for complete search history.

(56) References Cited

U.S. PATENT DOCUMENTS 1,591,024 A 7/1926 Dodge
2,891,672 A 6/1959 Veld et al.
(Continued)

FOREIGN PATENT DOCUMENTS

EP 0005411 A1 11/1979
GB 2287000 A 9/1995
(Continued)

OTHER PUBLICATIONS

Ecooceane Products, http://ecooceane.com/products/, 7 pp.
(Continued)

*Primary Examiner* — Christopher Upton
(74) *Attorney, Agent, or Firm* — E. Randall Smith; E. Randall Smith, PC

(57) ABSTRACT

Systems, apparatus and methods useful for collecting debris from a body of water on a vessel having at least one cargo compartment and at least a first pump fluidly coupled to at least one cargo compartment and configured to concurrently draw water and debris from the body of water into, and remove water from, the cargo compartment(s) include at least a second pump, distinct from the first pump and configured to remove debris from at least one cargo compartment.

22 Claims, 33 Drawing Sheets

Related U.S. Application Data continuation-in-part of application No. 15/492,724, filed on Apr. 20, 2017, now Pat. No. 10,526,055, which is a continuation-in-part of application No. 14/881,394, filed on Oct. 13, 2015, now Pat. No. 9,643,692.

(60) Provisional application No. 62/064,776, filed on Oct. 16, 2014.

(51) Int. Cl.
*C02F 1/40* (2006.01)
*E02B 15/10* (2006.01)
*B63B 35/32* (2006.01)
*C02F 103/00* (2006.01)

(56) References Cited

U.S. PATENT DOCUMENTS

| | | | |
|---|---|---|---|
| 3,667,235 A | 6/1972 | Preus et al. | |
| 3,688,506 A | 9/1972 | Marcocchio | |
| 3,701,430 A | 10/1972 | Tuttle | |
| 3,708,070 A | 1/1973 | Bell | |
| 3,847,816 A | 11/1974 | DiPerna | |
| 3,923,661 A | 12/1975 | Crisafulli | |
| 3,926,812 A | 12/1975 | Neal | |
| 3,970,556 A | 7/1976 | Gore | |
| 3,983,034 A | 9/1976 | Wilson | |
| 4,033,876 A | 7/1977 | Cocjin et al. | |
| 4,054,525 A | 10/1977 | Propp | |
| 4,120,793 A | 10/1978 | Strain | |
| 4,211,659 A | 7/1980 | Nyfeld et al. | |
| 4,264,444 A | 4/1981 | Bronnec | |
| 4,308,140 A | 12/1981 | Pierson, Jr. | |
| 4,372,854 A | 2/1983 | Szereday | |
| 4,381,994 A | 5/1983 | Ayers | |
| 4,545,315 A | 10/1985 | Becherer | |
| 4,554,070 A | 11/1985 | Jordan | |
| 4,851,133 A | 7/1989 | Rymal | |
| 4,921,605 A * | 5/1990 | Chastan-Bagnis | E02B 15/046 210/242.3 |
| 4,959,143 A | 9/1990 | Koster | |
| 5,043,065 A | 8/1991 | Propp | |
| 5,047,156 A | 9/1991 | Sullivan | |
| 5,102,540 A | 4/1992 | Conradi et al. | |
| 5,108,591 A | 4/1992 | Hagan | |
| 5,194,151 A | 3/1993 | Broussard | |
| 5,215,654 A | 6/1993 | Karterman | |
| 5,292,430 A | 3/1994 | Sullivan | |
| 5,308,510 A | 5/1994 | Gore | |
| 5,378,376 A | 1/1995 | Zenner | |
| 5,688,075 A | 11/1997 | Gradek | |
| 5,893,978 A | 4/1999 | Yoda et al. | |
| 8,318,012 B2 | 11/2012 | Dragna | |
| 9,643,692 B2 | 5/2017 | Covington | |
| 10,293,895 B2 * | 5/2019 | Covington | B63B 35/32 |
| 10,526,055 B2 * | 1/2020 | Covington | E02B 15/046 |
| 10,683,627 B2 * | 6/2020 | Covington | E02B 15/10 |
| 2003/0132154 A1 | 7/2003 | Morin | |
| 2010/0314329 A1 * | 12/2010 | Prior | B63B 35/32 210/242.3 |
| 2013/0032524 A1 | 2/2013 | Dragna | |
| 2014/0165894 A1 | 6/2014 | Gastaldi et al. | |
| 2017/0197689 A1 | 7/2017 | Covington | |

FOREIGN PATENT DOCUMENTS

| | | |
|---|---|---|
| WO | 95/21764 | 8/1995 |
| WO | 2014158391 | 10/2014 |

OTHER PUBLICATIONS

Oil Spill Recover Europe Ltd., YouTube video demonstration page and company information, 7 pp.

Patzek, Tad W., "Energy and Environment Subcommittee of the Energy and Commerce Committee Jun. 9, 2010 Briefing", Jun. 8, 2010, 16 pp.

"Oil Skimmer 'The Big Gulp'", 2 pages, News Item Reported by Fox News 8, John Snell, Anchor, http://ladcompanies.com/index.php/home/news/101-oil-skimmer-qthe-big-gulpq.html, 2 pp.

"Oil Whale How it Works", Copyright 2016 by Oilwhale Oy, http://www.oilwhale.fi/how-it-works/, 5 pp.

* cited by examiner

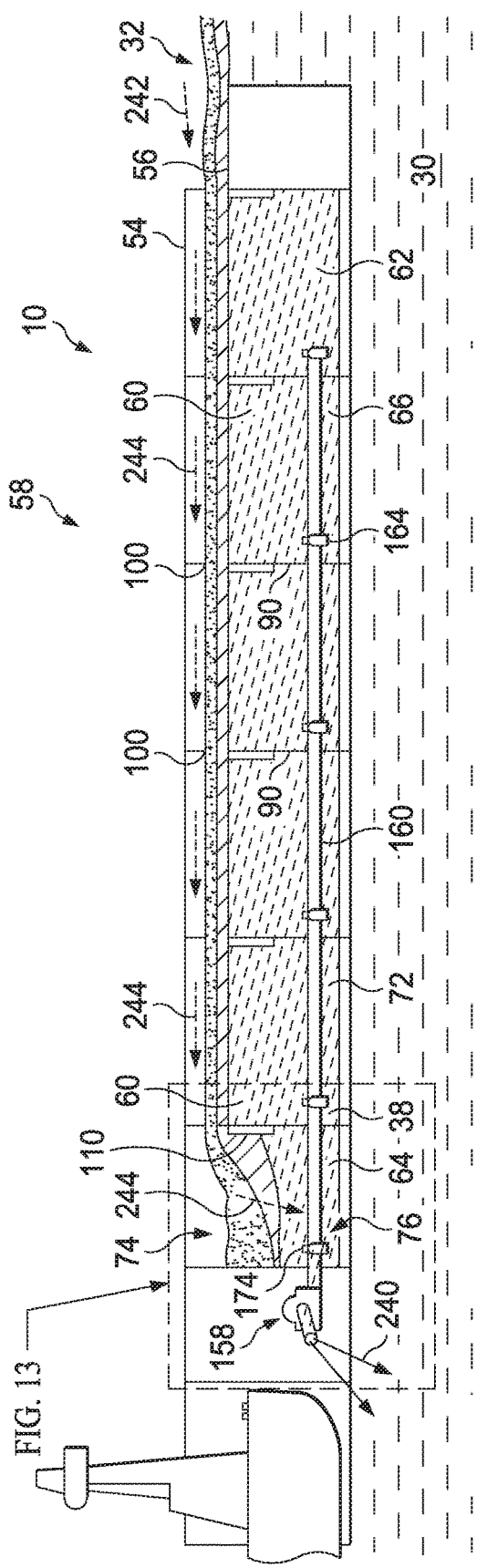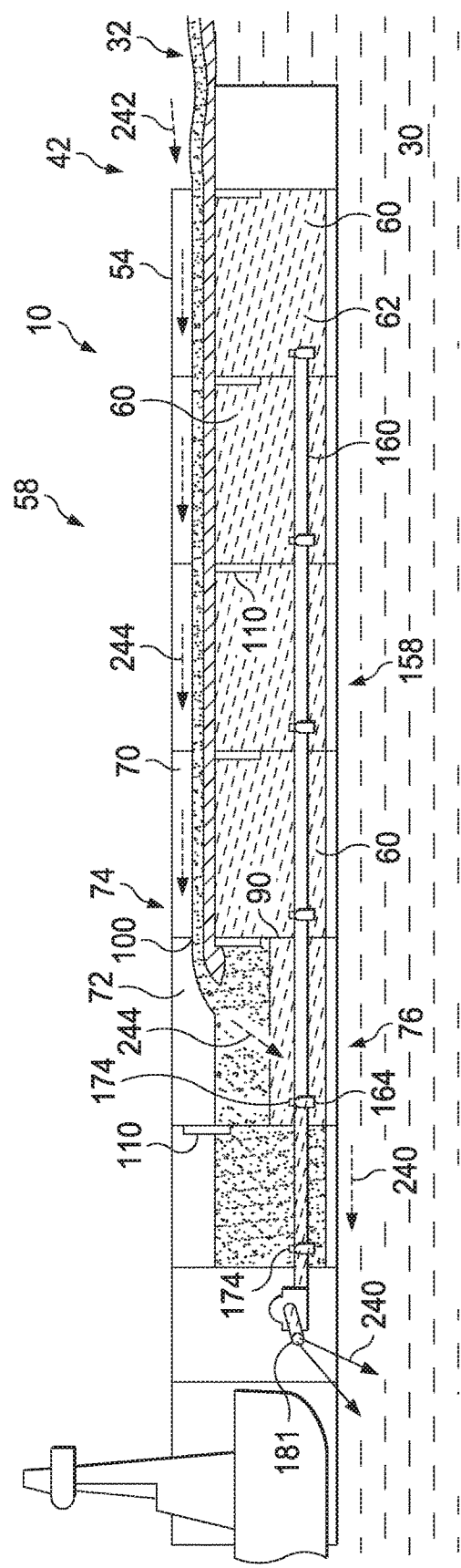

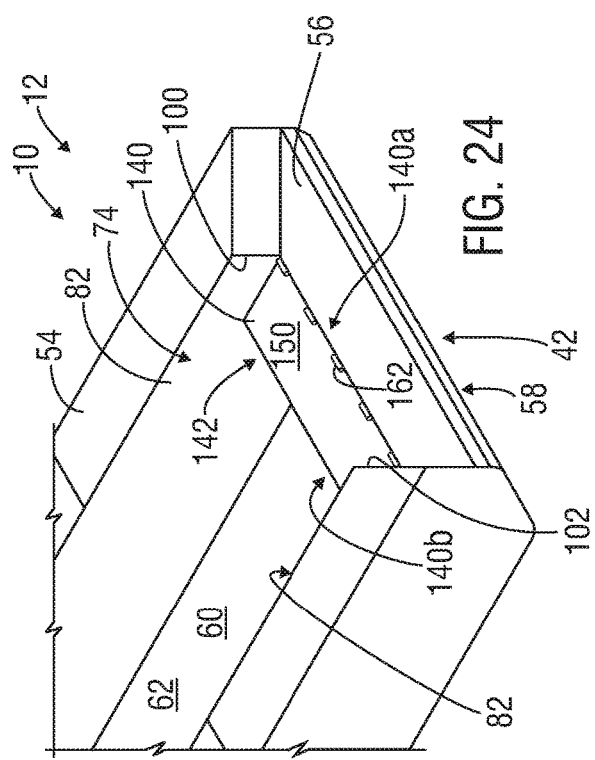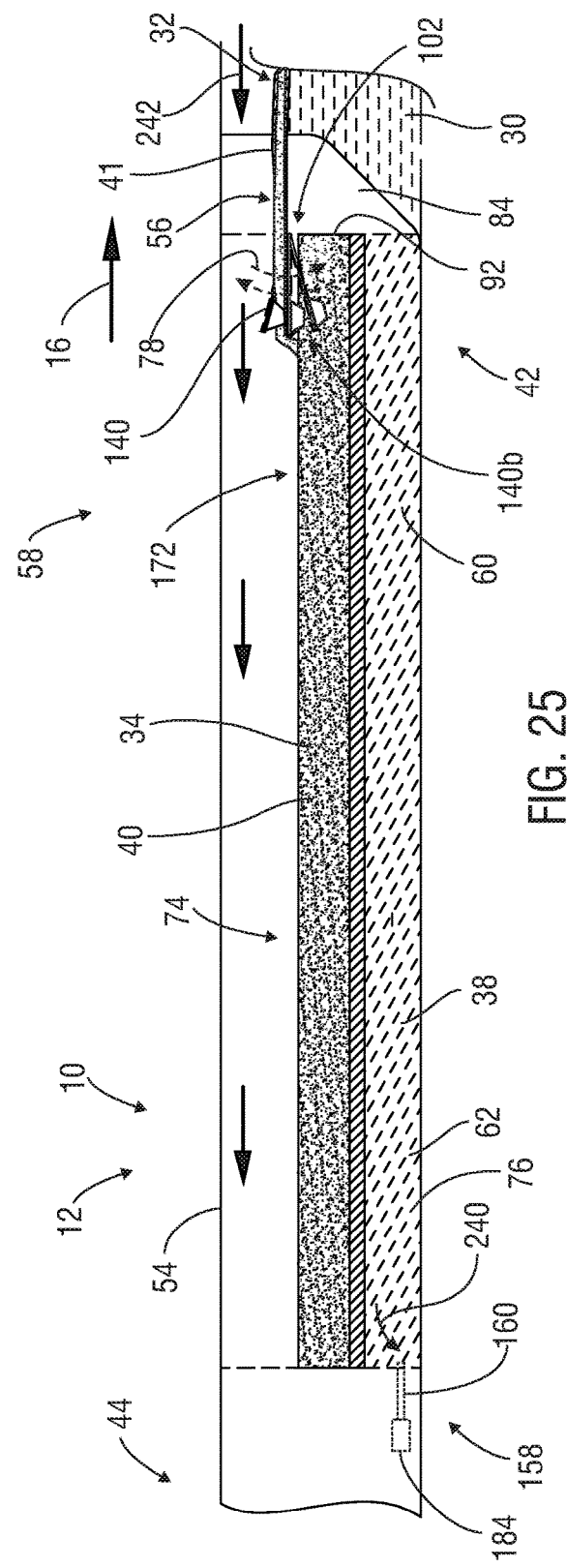

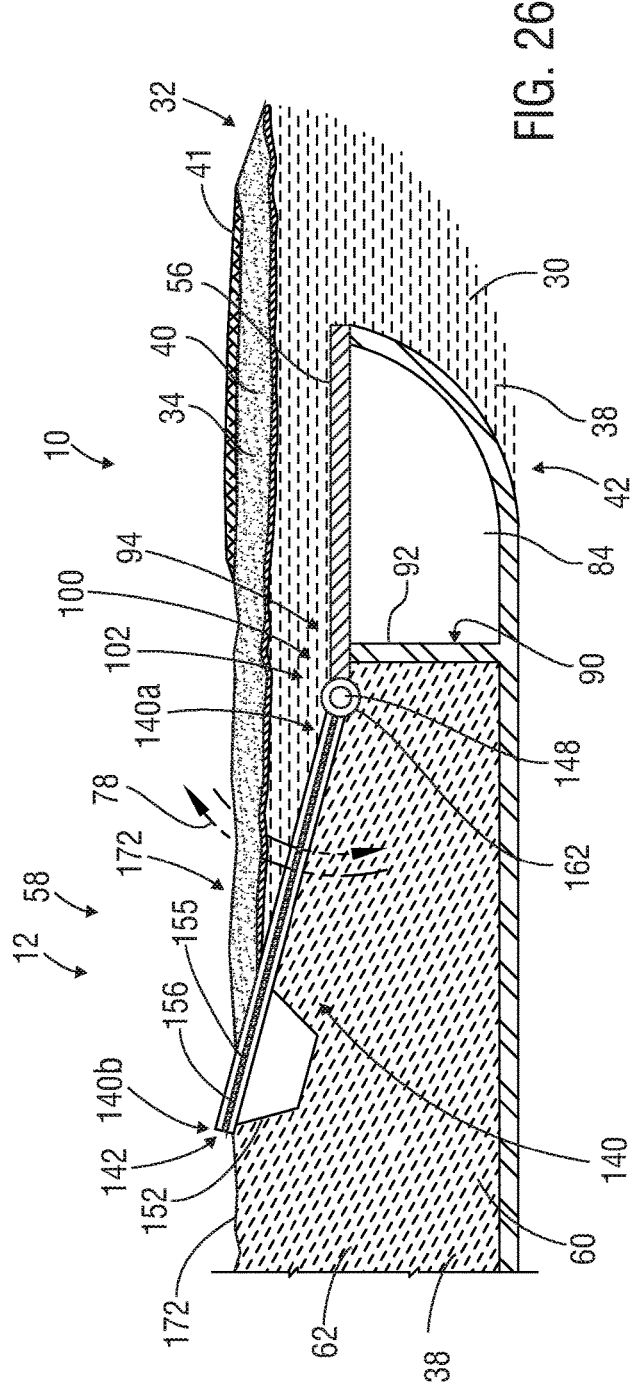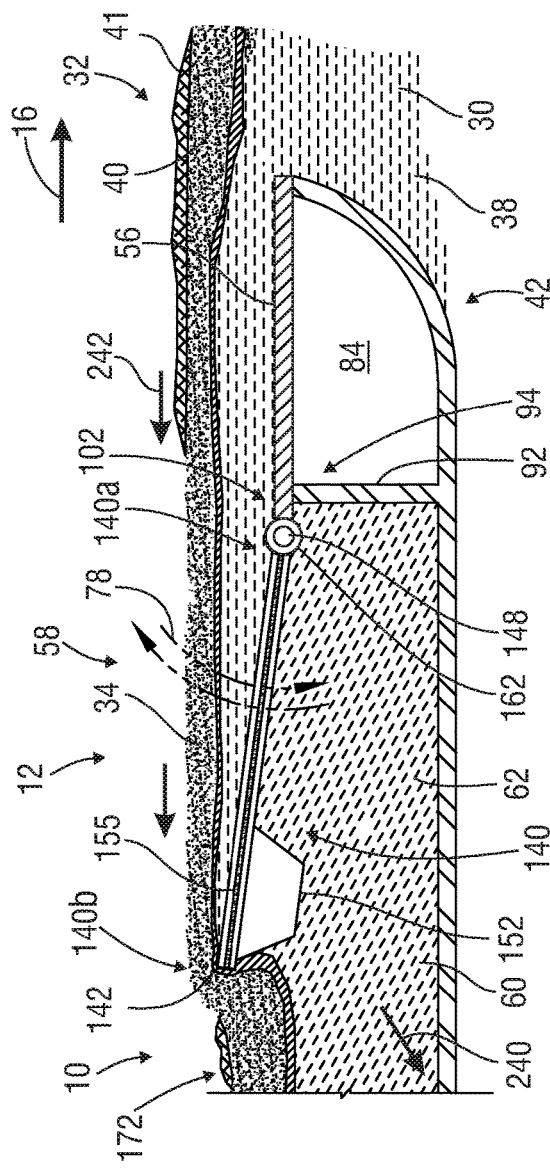

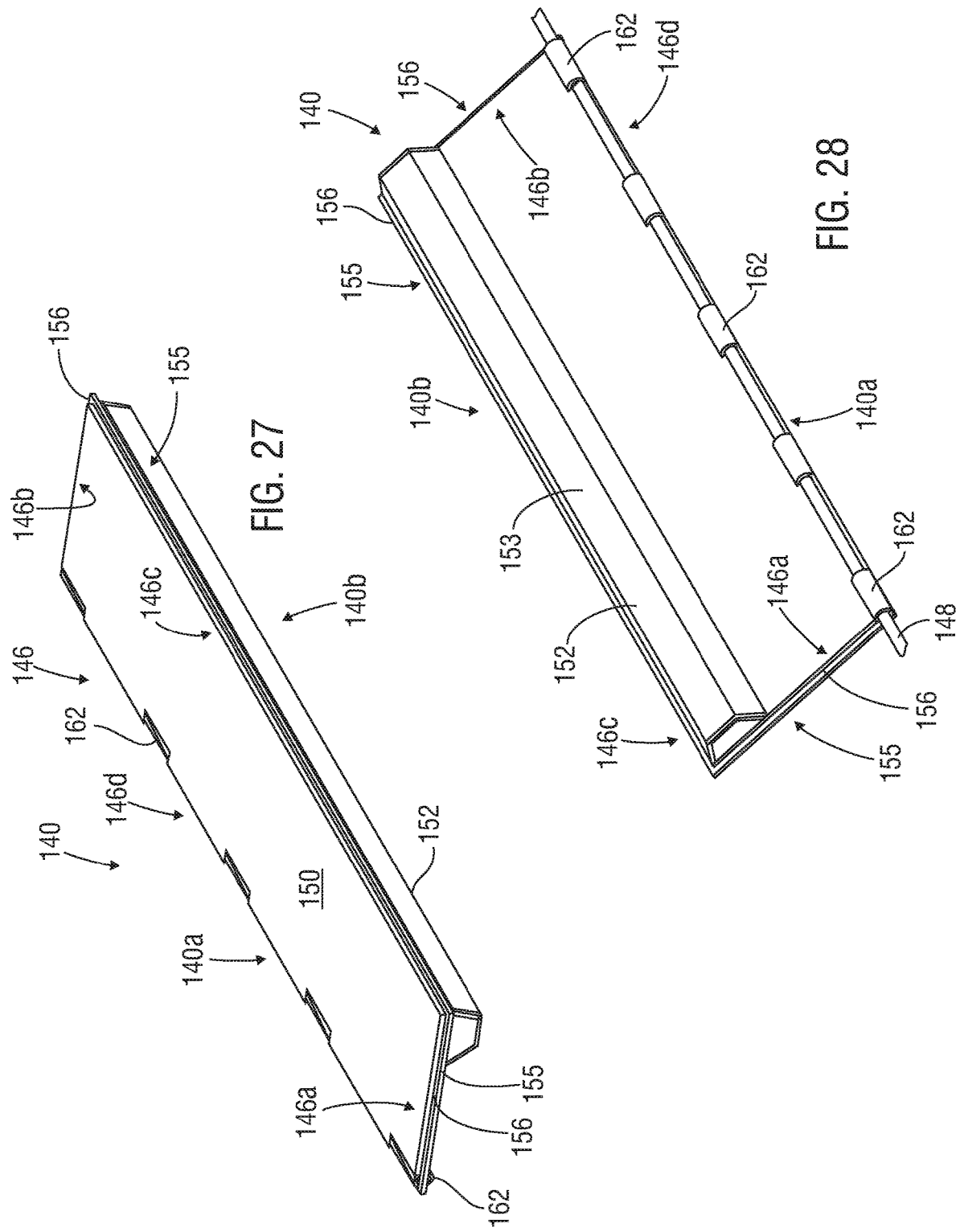

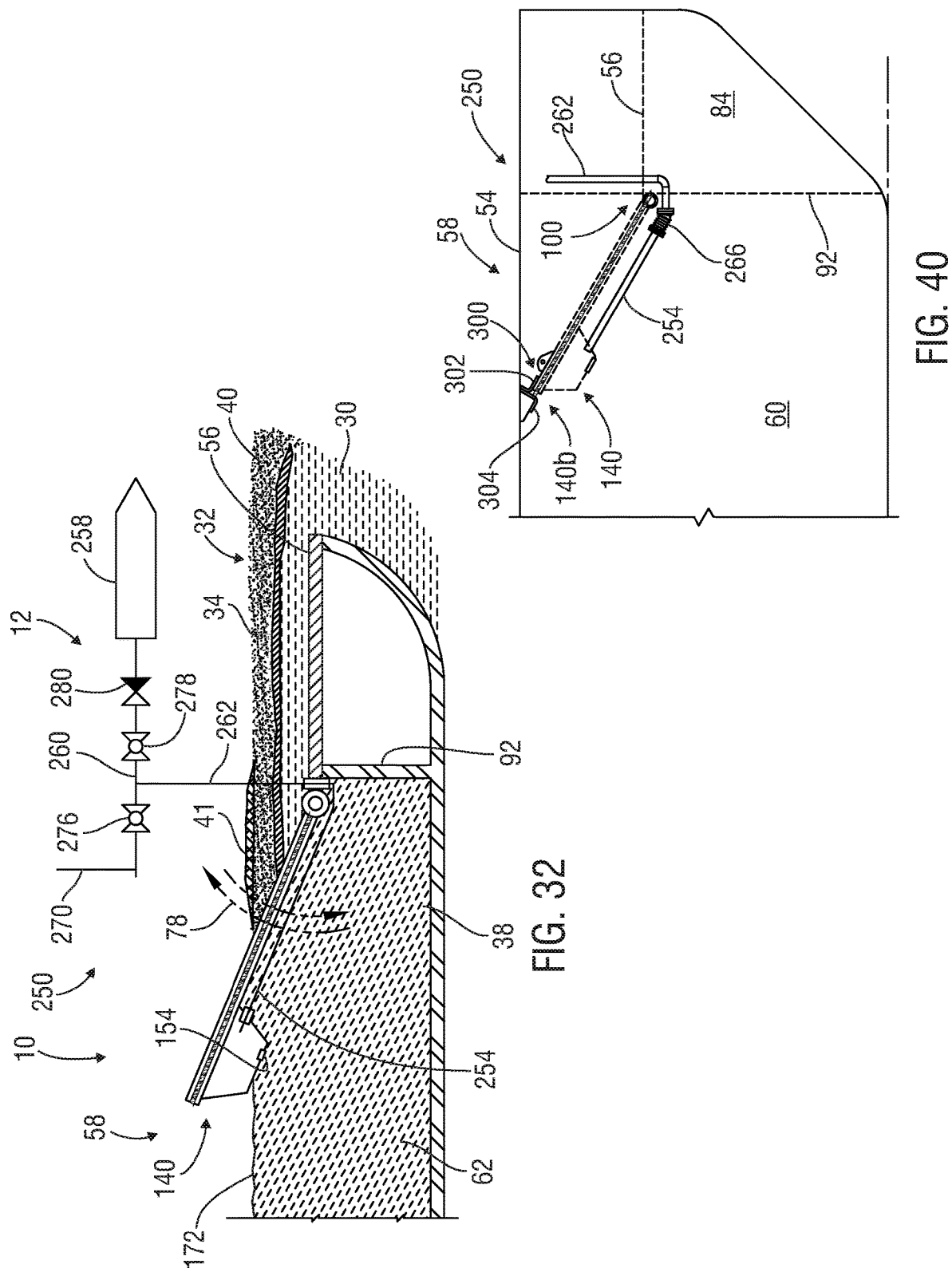

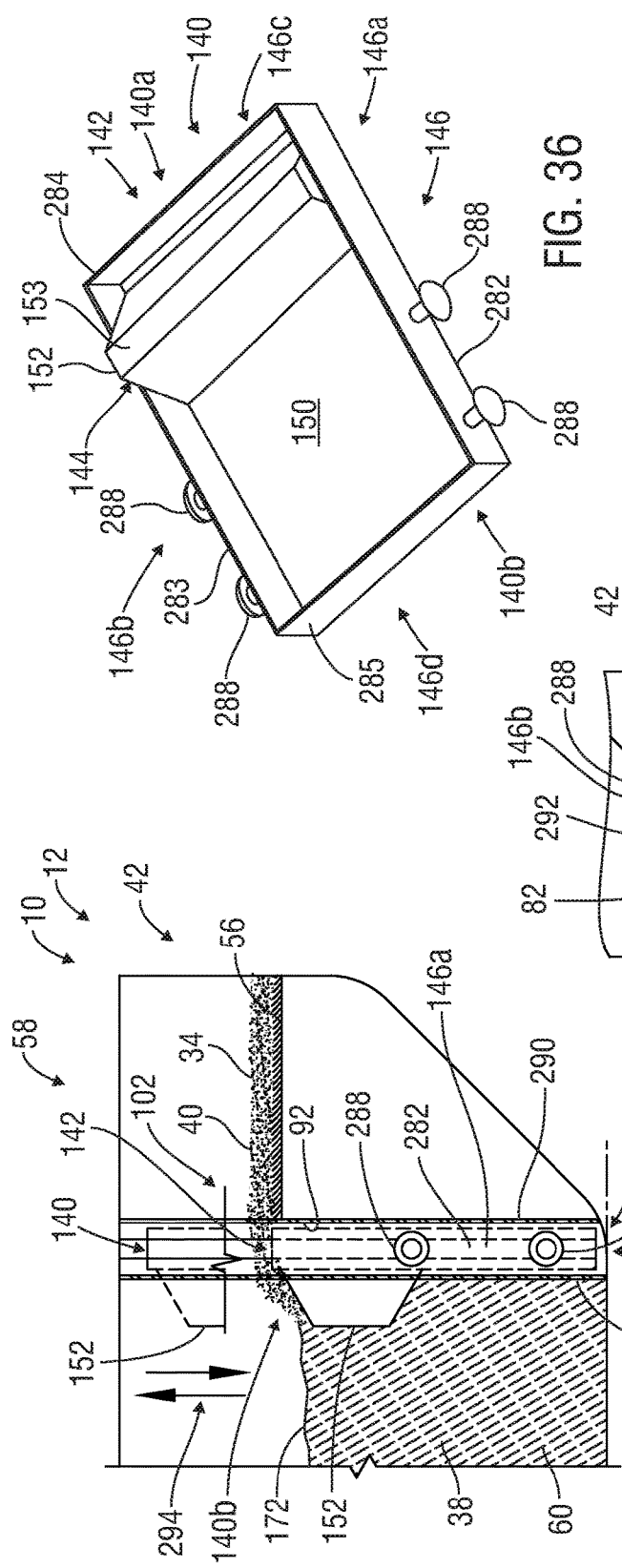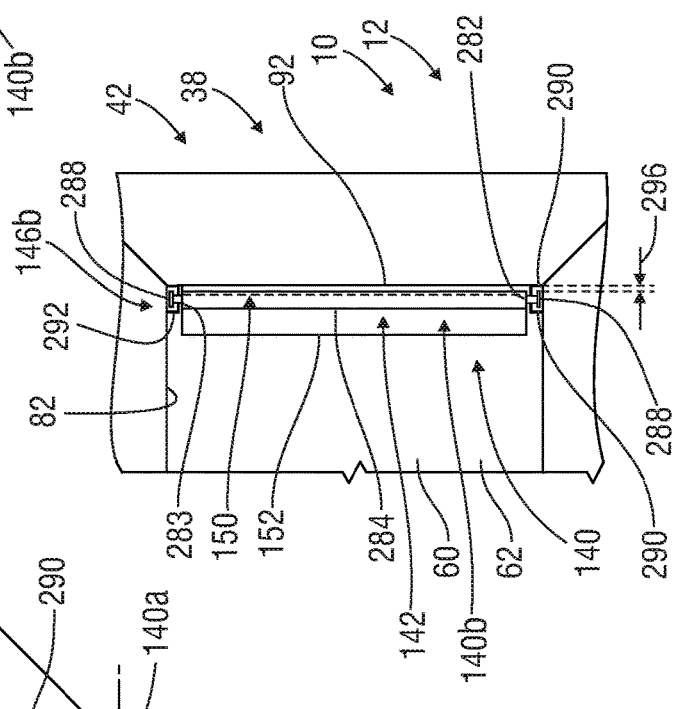

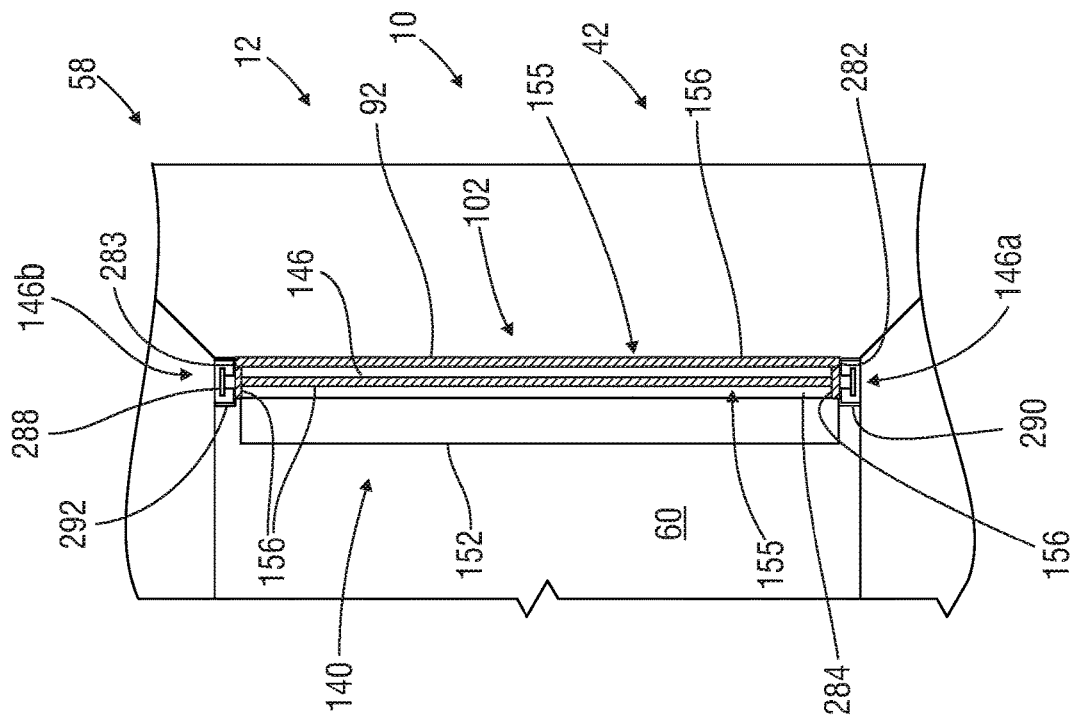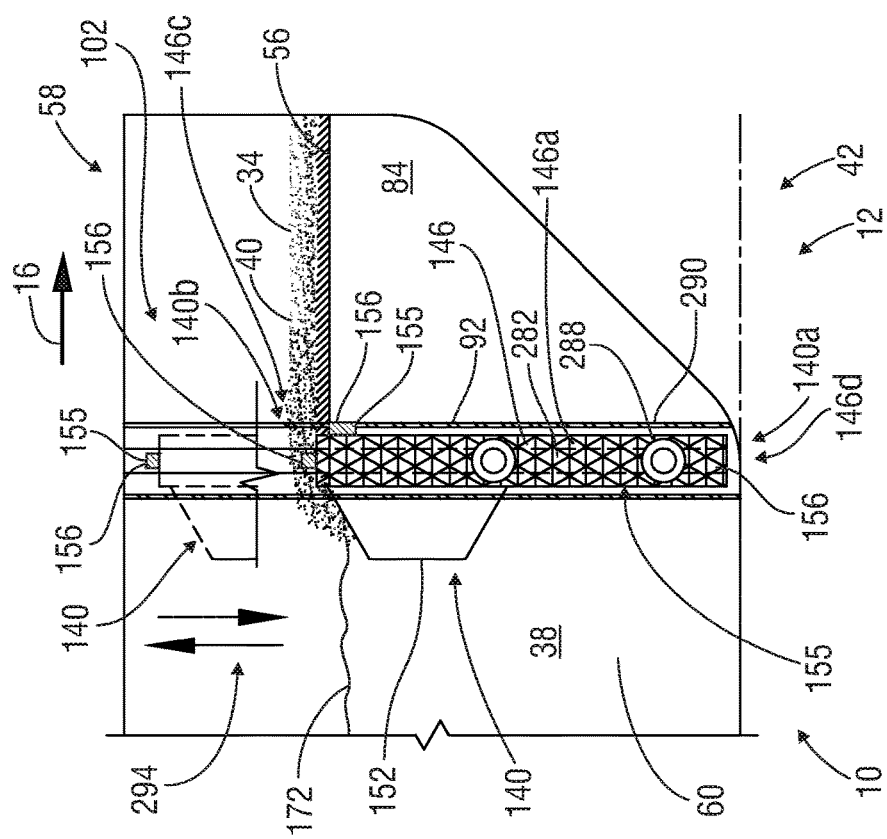

SYSTEMS, APPARATUS AND METHODS FOR COLLECTING DEBRIS FROM A BODY OF WATER

CROSS REFERENCE TO RELATED APPLICATIONS

The present application is a continuation application of and claims priority to U.S. patent application Ser. No. 16/052,045 filed on Aug. 1, 2018 and entitled "Systems, Apparatus & Methods for Collecting and Separating Floating Debris and Water From a Body of Water", which is a continuation-in-part application of and claims priority to U.S. patent application Ser. No. 15/492,724, filed on Apr. 20, 2017 and entitled "Apparatus and Methods for Recovering One or More Contaminants from a Body of Water", which issued as U.S. Pat. No. 10,526,055 and is a continuation-in-part application of and claims priority to U.S. patent application Ser. No. 14/881,394 filed on Oct. 13, 2015 and entitled "Apparatus and Methods for Recovering Oil from a Body of Water", which issued as U.S. Pat. No. 9,643,692 on May 9, 2017 and claims priority to U.S. Provisional Patent Application Ser. No. 62/064,776, filed on Oct. 16, 2014 and entitled "System, Apparats and Methods for Collecting Debris from a Body of Water", all of which are hereby incorporated by reference herein in their entireties.

FIELD OF THE DISCLOSURE

The present disclosure relates generally to recovering floating debris or contaminants from a body of water.

BACKGROUND

Historically, it has proven difficult to effectively and efficiently remove substantial amounts of floating debris, or contaminants, from the ocean and other bodies of water. Some variables that may hinder such recovery efforts include the large amount of debris often needed to be recovered, the different types of debris, the rapid speed at which the debris spreads, the effect of wind, waves, rough seas and other environmental factors on the recovery operations and the limited size and/or capacity of existing recovery vessels. Presently available debris recovery vessels and techniques are thus believed to have one or more limitations or disadvantages.

For example, presently known vessels being used or promoted to collect waterborne debris are typically unable to efficiently and/or effectively collect different types of debris. For another example, in the offshore and inland waterway oil spill recovery arena, various existing oil skimmers are believed to be unable to recover large volumes of oil. Many and perhaps all known systems cannot separate out significant amounts (or any) of the collected oil from sea water, resulting in limited on-board oil storage and, thus, oil recovery capacity. In fact, many existing systems cause further emulsification of the oil and water and thus cannot return separated water back to the sea or other body of water, limiting on-board oil storage capacity, increasing cost and time, etc. Other existing oil skimmers attempt to separate the recovered oil from sea water, but are slow and thus largely ineffective at recovering substantial volumes of oil.

It should be understood that the above-described features, capabilities, limitations and disadvantages are provided for illustrative purposes only and are not intended to limit the scope or subject matter of the appended claims or those of any related patent application or patent. Thus, none of the appended claims or claims of any related application or patent should be limited by the above discussion or construed to address, include or exclude each or any of the above-cited features, capabilities or disadvantages merely because of their mention above.

Accordingly, there exists a need for improved systems, apparatus and methods useful in connection with debris recovery operations having one or more of the attributes or capabilities described or shown in, or as may be apparent from, this patent.

BRIEF SUMMARY OF THE DISCLOSURE

Various embodiments involve a method of collecting debris from a body of water on a vessel having at least one cargo compartment configured to receive water and debris from the body of water through at least one intake opening during debris collection operations. At least a first pump is fluidly coupled to at least one cargo compartment and selectively controllable to concurrently draw water and debris from the body of water through at least one intake opening and into at least one cargo compartment and remove water from at least one cargo compartment. The method includes selectively actuating at least a second pump having at least one inlet in fluid communication with at least one trunk that extends upwardly from and is fluidly coupled to at least one cargo compartment at or above the upper end thereof to remove debris therefrom and through the at least one trunk. Air is allowed to be evacuated from the cargo compartment(s) through at least one air discharge vent disposed above the surface of contents in the cargo compartment(s) to ensure the inlet(s) of the second pump(s) remain submersed in liquid throughout debris collection operations.

In some embodiments, the present disclosure involves a system useful for collecting debris from a body of water on a vessel. The vessel includes at least one cargo compartment configured to receive water and debris from the body of water through at least one intake opening during debris collection operations. The system includes at least one discharge pump fluidly coupled to at least one cargo compartment and selectively controllable to concurrently (i) draw water and debris from the body of water into the at least one cargo compartment and (ii) remove water from the at least one cargo compartment. At least one trunk is fluidly coupled to at least one cargo compartment at or above the upper end thereof. At least one debris pump, distinct from the at least one discharge pump, is fluidly coupled to at least one trunk and selectively controllable to remove debris from at least one cargo compartment through the at least one trunk.

The present disclosure includes embodiments involving a method of collecting debris from a body of water on a vessel, the vessel having at least one cargo compartment configured to receive water and debris from the body of water through at least one intake opening during debris collection operations. The method includes selectively actuating at least one discharge pump fluidly coupled to at least one cargo compartment to concurrently (i) draw water and debris from the body of water into at least one cargo compartment and (ii) remove water from at least one cargo compartment At least one debris pump, distinct from the at least one discharge pump, is selectively actuated to remove debris from at least one cargo compartment. A vacuum is created above the surface of the contents in at least one cargo compartment. The vacuum is maintained during debris collection operations.

There are embodiments of the present disclosure involving a method of collecting debris from a body of water on a vessel having at least one cargo compartment configured to receive water and debris from the body of water through (i) at least one intake opening and (ii) an inflow regulator (IFR) chamber fluidly coupled between at least one cargo compartment and at least one intake opening. The IFR chamber includes first and second variable buoyancy IFRs at least partially free-floating at or near the surface of liquid therein during debris collection operations. The second variable buoyancy IFR is positioned between the first variable buoyancy IFR and the at least one cargo compartment. The method includes at least a first pump both drawing water and debris from the body of water into at least one cargo compartment and removing water from at least one cargo compartment. At least a second pump removes debris from at least one cargo compartment. The first variable buoyancy IFR is selectively actuated to de-ballast it higher in the at least one IFR chamber than the second variable buoyancy IFR when there is an increase in water turbulence and/or wave action in the body of water proximate to the at least one intake opening. The second variable buoyancy IFR is selectively actuated to de-ballast it higher in the at least one IFR chamber than the first variable buoyancy IFR when debris in the body of water is a sheen and/or decreases in thickness proximate to the at least one intake opening. The second variable buoyancy IFR is selectively actuated to ballast it lower in the at least one IFR chamber than the first variable buoyancy IFR when debris in the body of water is thicker than a sheen and/or increases in thickness proximate to the at least one intake opening.

In various embodiments, the present disclosure involves methods of collecting debris from a body of water on a vessel. The vessel includes at least one cargo compartment and at least one intake opening fluidly coupling the at least one cargo compartment and the body of water during debris collection operations. At least one discharge pump fluidly coupled to at least one cargo compartment concurrently draws water and debris from the body of water into the at least one cargo compartment and removes water from the cargo compartment(s). Concurrently therewith, at least one debris pump, distinct from the discharge pump(s), removes debris from the cargo compartment(s).

If desired, any one or more, or none, of the following features may be included. One or more discharge pumps may remove water from one or more cargo compartments at or proximate to the lower end thereof and/or one or more debris pumps may remove debris from one or more cargo compartments at or proximate to the upper end thereof. The discharge pump(s) may be selectively controlled to vary the volume of water removed from at least one cargo compartment and/or the debris pump(s) may be selectively controlled to vary the volume of debris removed from at least one cargo compartment.

At least one inflow regulator (IFR) chamber may be disposed on the vessel between the cargo compartment(s) and intake opening(s). The IFR chamber(s) may be at least partially separated from the compartment(s) by at least one wall and fluidly coupled thereto by at least one passageway. At least one IFR at least partially free-floating at or near the surface of liquid in at least one IFR chamber may limit the water and debris drawn from the body of water into the cargo compartment(s) to primarily debris and water that passes over the at least one IFR. At least one discharge pump may lower the liquid level in at least one IFR chamber between the IFR(s) and passageway(s) to a height lower than the liquid level therein between the IFR(s) and the intake opening(s) during debris collection operations.

A variable buoyancy system associated with at least one IFR may be selectively actuated to adjust the height thereof in the IFR chamber(s). First and second variable buoyancy IFRs may be disposed in the same IFR chamber, the second variable buoyancy IFR being positioned between the first variable buoyancy IFR and the cargo compartment(s). The first variable buoyancy IFR may primarily reduce wave action and/or turbulence in the water and debris moving through the IFR chamber(s) from the intake opening(s) to the cargo compartment(s), and/or the second variable buoyancy IFR may primarily cause mostly debris to enter the cargo compartment(s) during debris collection operations. The first variable buoyancy IFR may be selectively actuated to de-ballast it higher in the IFR chamber(s) than the second variable buoyancy IFR when there is an increase in water turbulence and/or wave action in the body of water proximate to the intake opening(s). The second variable buoyancy IFR may be selectively actuated to de-ballast it higher in the IFR chamber(s) than the first variable buoyancy IFR when debris in the body of water is a sheen and/or decreases in thickness proximate to the intake opening(s). The second variable buoyancy IFR may be selectively actuated to ballast it lower in the IFR chamber(s) than the first variable buoyancy IFR when debris in the body of water is thicker than a sheen and/or increases in thickness proximate to the intake opening(s).

A vacuum may be created above the surface of the contents of at least one cargo compartment and maintained during debris collection operations. The cargo compartment(s) may be maintained completely full of water and/or debris during collection operations. The vessel may include at least one trunk fluidly coupled to at least one cargo compartment at or above the upper end thereof and the debris pump(s) fluidly coupled to at least one trunk. Debris may be allowed to rise into at least one trunk from at least one cargo compartment and at least one debris pump may remove debris from the cargo compartment(s) through the trunk(s). The debris pump(s) may be selectively temporarily turned off when the level of debris in the trunk(s) is at or below a particular height. At least one sensor may be disposed at least partially within at least one cargo compartment and/or at least one vacuum trunk and indicate the height of water in the cargo compartment(s) and/or vacuum trunk(s), respectively.

In some embodiments, the present disclosure involves systems useful for collecting debris from a body of water on a vessel. The vessel includes at least one cargo compartment and at least one intake opening fluidly coupling the cargo compartment(s) and body of water during debris collection operations. At least one discharge pump may be fluidly coupled to the cargo compartment(s) and have sufficient pumping capacity both when the vessel is moving and stationary to concurrently (i) draw water and debris from the body of water into the cargo compartment(s) and (ii) remove water from the cargo compartment(s). At least one debris pump that is distinct from the discharge pump(s) is fluidly coupled to the cargo compartment(s) and selectively controllable to remove debris from the cargo compartment(s) concurrently with (i) and (ii) above.

If desired, any one or more, or none, of the following features may be included. each cargo compartment has upper and lower ends, further wherein the at least one discharge pump is fluidly coupled to at least one cargo compartment closer to the lower end than the upper end thereof and the at least one debris pump is fluidly coupled to at least one cargo compartment closer to the upper end than the lower end thereof. The discharge pump(s) may be selectively controllable to vary the volume of water removed from the cargo compartment(s) and the debris pump(s) may be selectively controllable to vary the volume of debris removed from the cargo compartment(s).

At least one IFR chamber may be disposed on the vessel between the cargo compartment(s) and intake opening(s) and at least partially separated from the at least one cargo compartment by at least one wall and fluidly coupled thereto by at least one passageway. At least one IFR may be at least partially free-floating at or near the surface of liquid in at least one IFR chamber. At least one discharge pump may be configured to lower the liquid level in at least one IFR chamber between the IFR(s) and passageway(s) to a height below the liquid level in the IFR chamber(s) between the IFR(s) and intake opening(s) during debris collection operations. First and second variable buoyancy IFRs disposed in the same IFR chamber, the second variable buoyancy IFR being positioned between the first variable buoyancy IFR and the cargo compartment(s).

A variable buoyancy system may be associated with at least one IFR, the variable buoyancy system being configured to (i) allow air to escape from the at least one IFR and be replaced with liquid to decrease the buoyancy thereof and (ii) provide air into the at least one IFR and force liquid out of the at least one IFR to increase the buoyancy thereof.

At least one trunk may be fluidly coupled to at least one cargo compartment at or above the upper end thereof. The debris pump(s) may be fluidly coupled to at least one trunk and configured to remove debris from at least one cargo compartment through at least one trunk. At least one sensor disposed at least partially within at least one cargo compartment and/or at least one trunk and configured to indicate the height of water therein, respectively.

In some embodiments, the present disclosure involves methods of collecting and separating floating debris and water from a body of water on a vessel moveable in the body of water. The vessel has at least one inflow regulator (IFR) chamber distinct from a main collection compartment and fluidly coupled thereto by at least one passageway. The main collection compartment has a length, width, height and upper and lower ends. The vessel also includes at least one intake opening fluidly coupling the IFR chamber(s) and the body of water and through which water and floating debris can enter the at least one IFR chamber and vessel from the body of water. At least one water removal outlet and at least one debris removal outlet (distinct from the water removal outlet(s)) are fluidly coupled to the main collection compartment. The passageway(s) and water removal outlet(s) are fluidly coupled to the main collection compartment closer to the lower end than the upper end of the main collection compartment and the debris removal outlet(s) are fluidly coupled to the main collection compartment closer to the upper end than the lower end of the main collection compartment. These methods include filling the main collection compartment with liquid to a fill height above the passageway(s) and water removal outlet(s) and thereafter, concurrently drawing floating debris and water from the IFR chamber(s) through the submersed passageway(s) and into the main collection compartment during collection operations. At least one IFR at least partially floats in the IFR chamber(s) and reduces wave action and/or turbulence in the floating debris and water passing through the IFR chamber(s) to the main collection compartment during collection operations. Floating debris in the main collection compartment is allowed to rise above the at least one debris removal outlet and the water in the main collection compartment, removing water from the main collection compartment through the water removal outlet(s) and discharged to the body of water. Floating debris is allowed to be removed from the main collection compartment through the debris removal outlet(s) and directed to one or more debris delivery destinations.

If desired, any of the following may be included. These methods may include minimizing emulsification of water and debris in the main collection compartment during collection and separation operations. At least initially, the main collection compartment may be filled with primarily water from the body of water to a fill height above the at least one debris removal outlet and all or substantially all air may be evacuated from the main collection compartment above the surface of the contents therein. If desired, initially, the main collection compartment may be completely filled with primarily water from the body of water and, thereafter, maintained completely full of water and/or debris during collection operations. Floating debris and little, or no, water may be caused to enter the main collection compartment during collection operations. A vacuum may be created above the surface of the contents of the main collection compartment. The vessel may include at least one vertically-oriented trunk having at least one elongated, upwardly extending void fluidly coupled to the main collection compartment at or above the upper end thereof, the void(s) having a width that is smaller than the length and width of the main collection compartment. Water and/or floating debris may be allowed to completely fill the main collection compartment and extend up into at least one void of the vertical trunk(s) during collection operations. The debris removal outlet(s) may be fluidly coupled to the void(s) and floating debris may be allowed to float to the upper end of the main collection compartment and into the vertical trunk(s) and be removed therefrom through the debris removal outlet(s) and directed to one or more debris delivery destinations.

These methods may include at least substantially preventing the entry of air into the main collection compartment during collection and separation operations. The drawing floating debris and water from the IFR chamber(s) into the main collection compartment may be ceased and at least one IFR allowed to extend at least partially above the surface of the contents of the at least one IFR chamber to prevent floating debris from backing out of the IFR chamber(s) through the intake opening to the body of water. One or more IFR(s) may be disposed on the vessel at a height above the location of the passageway(s) and limit the floating debris and water that enters the main collection compartment during collection operations to primarily floating debris and water that passes over the at least one IFR. The passageway(s) may have a width or diameter that is less than 10 percent the height of the main collection compartment and be disposed at or proximate to the bottom of the main collection compartment and primarily floating debris and some water may be drawn over the at least one IFR, down in the IFR chamber(s), through the passageway(s) and into the main collection compartment during collection operations.

A second IFR may be disposed in the IFR chamber(s) between a first IFR and the main collection compartment. The first IFR may primarily reduce wave action and turbulence in water and floating debris moving through the IFR chamber(s) and the second IFR may primarily cause mostly floating debris to enter the main collection compartment during collection operations. At least one IFR may be a variable buoyancy IFR and at least one variable buoyancy IFR may be actuated during collection operations to vary the buoyancy thereof and its reducing water turbulence in the floating debris and water moving through the IFR chamber(s) and into the main collection compartment. If desired, at least one variable buoyancy IFR may be selectively actuated during collection operations to vary the buoyancy thereof and its causing mostly floating debris to enter the main collection compartment during collection operations. A second IFR may be disposed in the IFR chamber(s) between a first IFR and the main collection compartment, both IFRs being variable buoyancy IFRs. The second IFR may be actuated during collection operations to de-ballast it higher in the IFR chamber(s) than the first IFR when the floating debris on the surface of the body of water is a sheen and/or decreases in thickness proximate to the intake opening(s) to assist in increasing the volume and cascading movement of floating debris passing by the second IFR into the main collection compartment. The first IFR may be selectively actuated to de-ballast it higher in the IFR chamber(s) than the second IFR during collection operations when at least one among the speed of the vessel in the body of water or the water turbulence and/or wave action in the body of water proximate to the intake opening(s) increases.

If desired, at least one fluid discharge pump may draw water and floating debris from the IFR chamber(s), through the passageway and into main collection compartment. The fluid discharge pump(s) may concurrently (i) draw water and floating debris from the body of water into the IFR chamber(s) and main collection compartment and (ii) remove water and little or no debris from the main collection compartment through the water removal outlet(s) and discharge it to the body of water during collection and separation operations. The fluid discharge pump(s) may lower the liquid level in the IFR chamber(s) between the passageway(s) and the IFR(s) to assist in increasing at least one among the cascading movement, volume and rate of floating debris drawn over the IFR(s) and into the main collection compartment. At least one debris discharge pump, distinct from the fluid discharge pump(s) may remove floating debris and little or no water from the main collection compartment through the debris removal outlet(s) and direct it to one or more debris delivery destinations during collection and separation operations. The debris discharge pump(s) may remove floating debris and little or no water from the main collection compartment through the debris removal outlet(s) and direct it to one or more debris delivery destinations concurrently with the fluid discharge pump(s) concurrently (i) drawing water and floating debris from the body of water into the IFR chamber(s) and main collection compartment and (ii) removing water and little or no floating debris from the main collection compartment through the water removal outlet(s) and discharging it to the body of water during collection and separation operations regardless of whether the vessel is moving.

At least one IFR may be a variable buoyancy IFR and the speed of the vessel in the body of water may be selectively varied, and/or the fluid discharge pump(s) may be selectively actuated and/or at least one variable buoyancy IFR may be selectively actuated to assist in (a) varying the buoyancy thereof in real-time on an ongoing basis as needed during collection operations in response to one or more changes in wind, rain, wave action, turbulence or other sea conditions in or above the body of water, the type, density and/or viscosity of liquid in the body of water or main collection compartment, the thickness, size, composition and/or depth of floating debris in the body of water or main collection compartment, or a combination thereof, and/or (b) changing at least one among the volume, rate and ratio of floating debris and water entering the main collection compartment, (c) optimizing the intake resistance of at least one IFR, (d) optimizing the efficiency and effectiveness of debris collection, (e) enhancing the separation of floating debris and water on the vessel, or a combination thereof.

If desired, at least one debris discharge pump, distinct from the fluid discharge pump(s) may be used to remove floating debris and little or no water from the main collection compartment through the debris removal outlet(s) and direct it to one or more debris delivery destinations during collection and separation operations. The debris pump(s) may be selectively actuated to vary the volume of floating debris removed from the main collection compartment. The suction of the fluid discharge pumps and/or speed of the vessel in the body of water may be increased during collection operations when the floating debris on the surface of the body of water is thicker than a sheen and/or increases in thickness proximate to the intake opening(s) in order to assist in increasing the volume and/or rate of floating debris entering the main collection compartment. At least one IFR may be de-ballasted during collection operations when at least one among the (i) speed of the vessel in the body of water, (ii) suction of the fluid discharge pump(s) and (iii) wave action and/or turbulence in the body of water proximate to the intake opening(s) increases.

At least one IFR may include at least one buoyant portion that free-floats at or near the surface of liquid in the IFR chamber(s). The buoyant portion(s) of IFR(s) may be lowered relative to the surface of liquid in the IFR chamber(s) during collection operations when (i) the vessel is not moving or slowed, (ii) there is a reduction in, or little or no, wave action and/or water turbulence in the body of water, (iii) the floating debris on the surface of the body of water is thicker than a sheen and/or increases in thickness proximate to the intake opening(s), or a combination thereof. The suction of the fluid discharge pump(s) and/or the height of the buoyant portion(s) of at least one IFR in the IFR chamber(s) may be varied during collection operations to assist in (i) increasing the ratio of floating debris to water entering the main collection compartment, (ii) increasing the volume and cascading movement of floating debris passing by the IFR(s) into the main collection compartment, (iii) optimizing the intake resistance of at least one IFR, (iv) optimizing the efficiency and effectiveness of debris collection, (v) enhancing the separation of floating debris and water on the vessel, or a combination thereof. The height of the buoyant portion(s) of at least one IFR may be increased in the IFR chamber(s) during collection operations when at least one among (i) the speed of the vessel in the body of water and/or the water turbulence and/or wave action in the body of water proximate to the intake opening(s) increases and/or (ii) the floating debris on the surface of in the body of water is a sheen or decreases in thickness proximate to the intake opening(s).

If desired, a second IFR may be disposed in the IFR chamber(s) between a first IFR and the main collection compartment, both IFRs being variable buoyancy IFRs. The second IFR may be ballasted lower in the IFR chamber(s) than the first IFR during collection operations when the floating debris on the surface of the body of water is thicker than a sheen or increases in thickness proximate to the intake opening(s). When the vessel is moving in the body of water during collection operations, the suction of at least one fluid discharge pump may be increased to a volume that is at least slightly greater than the volume of water and/or floating debris entering the intake opening(s) to reduce or eliminate the existence or effect of head waves at the intake opening(s). One or more fluid discharge pumps may be disposed in at least one suction chamber that is distinct from the IFR chamber(s) and the main collection compartment and fluidly coupled to the main collection compartment by the at least one water removal outlet. At least one suction chamber vent may be fluidly coupled to the suction chamber(s) proximate to the upper end thereof and opened during initial filling of the main collection compartment with liquid to at least partially vent the suction chamber(s) of gases and allow liquid to enter the suction chamber sufficient to submerse the water removal outlet(s) in liquid and provide a liquid-based seal between the suction chamber(s) and main collection compartment to allow minimal or no gases to enter the main collection compartment from the at least one suction chamber.

In many embodiments, the present disclosure involves systems for collecting and separating floating debris and water from a body of water on a vessel moveable in the body of water and which include a main collection compartment disposed on the vessel and having a length, width, height and upper and lower ends. At least one water removal outlet is fluidly coupled to the main collection compartment closer to the lower end than the upper end of the main collection compartment. At least one debris removal outlet, distinct from the at least one water removal outlet(s), is fluidly coupled to the main collection compartment closer to the upper end than the lower end of the main collection compartment. At least one inflow regulator (IFR) chamber is disposed on the vessel and at least partially separated from the main collection compartment and fluidly coupled thereto by at least one passageway. The at least one passageway is disposed closer to the lower end than the upper end of the main collection compartment. At least one intake opening is fluidly coupling the at least one IFR chamber and the body of water, whereby water and floating debris can enter the vessel from the body of water through the at least one intake opening and into the at least one IFR chamber. At least one fluid discharge pump is fluidly coupled to the main collection compartment by the at least one water removal outlet. The fluid discharge pump(s) are selectively controllable during collection operations to draw water and floating debris from the at least one IFR chamber, through the at least one passageway and into the main collection compartment and vary at least one among the volume, rate and ratio of water and floating debris drawn into the main collection compartment. At least first and second IFRs are at least partially floating in the same IFR chamber. The second IFR is disposed between the first IFR and the main collection compartment.

If desired, at least one IFR may be a variable buoyancy IFR that is selectively controllable during collection operations to vary the buoyancy thereof in at least one IFR chamber. A variable buoyancy system may be associated with one or more variable buoyancy IFRs and is selectively controllable during debris collection operations to allow air to escape from the variable buoyancy IFR(s) and be replaced with liquid to decrease the buoyancy of the variable buoyancy IFR(s), and provide air into the variable buoyancy IFR(s) and force liquid out of the variable buoyancy IFR(s) to increase the buoyancy of the variable buoyancy IFR(s). The first and second IFRs may be pivoting-type, variable buoyancy IFRs, each disposed on the vessel at a height above the location of the at least one passageway. At least one IFR may be configured to principally limit the floating debris and water that enters the main collection compartment from the at least one IFR chamber to primarily floating debris and water that passes over the at least one IFR and thereafter moves down in the at least one IFR chamber and into the at least one passageway. The passageway(s) may have a width or diameter that is less than 10 percent the height of the main collection compartment and be disposed at or proximate to the bottom of the main collection compartment. During collection operations, the at least one passageway and the at least one water removal outlet may be configured to be submersed in liquid to provide a liquid-based seal of the main collection compartment below the surface of the contents thereof and allow minimal or no gases to enter the main collection compartment from below the surface of the contents thereof.

A vertically-oriented trunk having at least one elongated, upwardly extending void may be fluidly coupled to the main collection compartment at or above the upper end of the main collection compartment. The void(s) may have a width that is smaller than the length and width of the main collection compartment. The debris removal outlet(s) may be fluidly coupled to the void(s) and the main collection compartment may be completely filled with water and/or floating debris. During debris collection operations, floating debris at the upper end of the main collection compartment may be able to pass into the vertical trunk(s) and thereafter removed through the debris removal outlet(s). A debris discharge pump that is distinct from the fluid discharge pump(s) and fluidly coupled between the debris removal outlet(s) and one or more debris delivery destinations may be included. The debris discharge pump(s) may be selectively controllable during collection and separation operations to vary the volume of floating debris removed from the main collection compartment through the debris removal outlet(s).

The fluid discharge pump(s) may be disposed on the vessel in at least one suction chamber that is distinct from the IFR chamber(s) and the main collection compartment and fluidly coupled to the main collection compartment by at least one water removal outlet. The water removal outlet(s) may be disposed proximate to the lower end of the main collection compartment and submersed in water during collection operations. At least one gate may be associated with the passageway(s) and/or water removal outlet(s). The gate(s) may be selectively controlled to block the passageway(s) and/or water removal outlet(s) and fluidly isolate the main collection compartment from the IFR chamber(s) and/or water removal outlet(s).

At least one IFR chamber cover may extend at least partially over at least one IFR chamber on the vessel and be at least partially transparent, see-through or perforated and/or strong enough to support large-sized debris placed thereupon. At least one front door may be disposed on the vessel and selectively controllable to close off or block the intake opening(s). At least one large-sized debris guard may be provided on the vessel proximate to the intake opening(s) to assist in preventing large-sized debris from entering into the IFR chamber(s).

In the present disclosure, there are also embodiments of systems for collecting and separating floating debris and water from a body of water on a vessel moveable in the body of water. These systems include a main collection compartment disposed on the vessel and having a length, width, height and upper and lower ends. At least one inflow regulator (IFR) chamber is disposed on the vessel and is distinct from the main collection compartment and fluidly coupled thereto by at least one passageway. At least one intake opening fluidly couples the IFR chamber(s) and the body of water, whereby water and floating debris can enter the vessel from the body of water through the intake opening(s) and into the IFR chamber(s). At least one fluid discharge pump is disposed on the vessel and fluidly coupled to the main collection compartment. The fluid discharge pump(s) are selectively controllable during collection operations to draw floating debris and water from the IFR chamber(s) through the passageway(s) and into the main collection compartment. At least one vertical trunk has at least one elongated, upwardly extending void fluidly coupled to the main collection compartment at or above the upper end thereof. During debris collection operations, floating debris at the upper end of the main collection compartment can pass into the vertical trunk to allow the main collection compartment to be completely filled with water and/or floating debris. At least one debris removal outlet through which floating debris can be removed from the main collection compartment is also included. The debris removal outlet(s) are fluidly coupled to the vertical trunk(s), whereby floating debris at the upper end of the main collection compartment will pass at least partially through the vertical trunk(s) as it is removed through the debris removal outlet(s). At least one IFR at least partially floats in the IFR chamber(s).

If desired, at least one wave diminishing surface may be disposed on the vessel between the IFR(s) and the body of water, slant downwardly away from the vessel and towards the body of water and be configured to assist in dampening or reducing the impact, size and/or action of waves and turbulence of water and debris entering the intake opening(s). The fluid discharge pump may be disposed on the vessel in at least one suction chamber having upper and lower ends and being distinct from the main collection compartment and IFR chamber(s). The suction chamber(s) may be fluidly coupled to the main collection compartment by at least one water removal outlet, the water removal outlet(s) being submersed in water during collection operations. A suction chamber vent may be disposed proximate to the upper end of the suction chamber(s) and configured to allow the suction chamber(s) to be selectively at least partially vented of gases. At least one flooding port may be fluidly coupled between the main collection compartment and body of water and configured to allow the main collection compartment to be at least partially filled with liquid from the body of water. At least one submersible fluid pump may be fluidly coupled to at least one flooding port and selectively actuated to completely fill the main collection compartment with liquid from the body of water. At least one air discharge vent may be disposed at or proximate to the upper end of, and fluidly coupled to, the main collection compartment and be configured to selectively allow gases to be evacuated from the main collection compartment. At least one vacuum pump may be fluidly coupled to at least one air discharge vent(s) and selectively controllable to remove gases from the main collection compartment.

If desired, at least one debris sensor may be disposed at least partially within the main collection compartment and configured to indicate whether debris is at a particular height in the main collection compartment. At least a first debris sensor may be disposed inside the main collection compartment above the passageway(s) and water removal outlet(s) to indicate when debris should be removed from the main collection compartment through the debris removal outlet(s) and assist in avoiding more than minimal debris being sucked into the fluid discharge pump(s). At least a second debris sensor may be disposed on the vessel below the debris removal outlet(s) to indicate when debris should not be removed from the main collection compartment through the debris removal outlet(s) and assist in avoiding more than minimal water being removed from the main collection compartment through the debris removal outlet(s).

In various embodiments, the present disclosure involves a system useful for collecting debris and water from a body of water at or near the surface of the body of water onto a waterborne vessel, separating the collected debris from water on the vessel and separately off-loading the collected debris and water from the vessel. At least one intake opening is provided in the vessel at or near the front of the vessel and in fluid communication with at least a first area inside the vessel. At least one variable buoyancy inflow regulator is disposed in the first area on the vessel aft of the intake opening and configured to at least partially float in liquid inside the first area. The inflow regulator includes at least one variable buoyancy chamber and may be selectively actuated to vary its buoyancy by introducing air into or allowing air to escape from the buoyancy chamber. At least one fluid discharge pump is disposed on the vessel and fluidly coupled to the first area. The discharge pump may be selectively actuated to draw debris and water from the body of water, through the intake opening into the first area and over the inflow regulator and discharge recovered water to the body of water. At least one debris pump is fluidly coupled to the first area and configured to remove recovered debris from the vessel and offload it to at least one destination off the vessel.

In some embodiments, the present disclosure involves apparatus, methods and systems useful for collecting debris (and some water) from a body of water at or near the surface of the body of water onto a waterborne vessel. The vessel has front and rear ends and is positionable at or near the surface of the body of water. The vessel includes at least a first cargo compartment in fluid communication with the body of water and configured to contain water and debris. At least one bulkhead is disposed on the vessel between the first cargo compartment and the front end of the vessel. At least one intake opening is disposed adjacent to or formed in the bulkhead(s) and fluidly couples the first cargo compartment and the body of water. At least a first, at least partially buoyant, inflow regulator is disposed at least partially in the first cargo compartment proximate to the intake opening(s). The inflow regulator has a front end and a rear end and extends at least partially across the width of the first cargo compartment. The inflow regulator is sufficiently buoyant so that when the first cargo compartment at least partially contains water, the front end thereof floats at or near the surface of the water in the first cargo compartment and limits the inflow of debris (and some) water from the body of water into the first cargo compartment to debris and water disposed at or near the surface of the body of water and which flows over the inflow regulator during use of the system. At least one suction conduit is disposed on the vessel and fluidly coupled to the first cargo compartment. At least one discharge pump is disposed on the vessel and fluidly coupled to at least one suction conduit. When one or more discharge pumps are actuated during use of the system, it/they will create suction in at least one suction conduit to concurrently (i) draw debris and water from the body of water through the intake opening(s) over at least one inflow regulator into the first cargo compartment and (ii) draw water from the first cargo compartment into at least one suction conduit.

In various embodiments, the present disclosure includes a system useful for collecting debris from a body of water on a vessel moveable in the body of water. The vessel includes at least one cargo compartment and at least one intake opening fluidly coupling the at least one cargo compartment with the body of water during debris collection operations. The system includes at least one discharge pump having sufficient pumping capacity both when the vessel is moving and stationary to concurrently (i) draw water and debris from the body of water, through the at least one intake opening and into the at least one cargo compartment and (ii) remove water and little or no debris from the at least one cargo compartment. At least one inflow regulator can at least partially free-float at or near the surface of liquid in the vessel and limit the water and debris drawn from the body of water into the at least one cargo compartment to primarily debris and water that passes over the at least one buoyant portion during debris collection operations. The at least one inflow regulator can also be selectively actuated to adjust the height of at least a portion thereof relative to the surface of liquid in the vessel during debris collection operations.

In many embodiments, the present disclosure involves methods of collecting debris from a body of water onto a vessel moveable in the body of water and having at least one intake opening fluidly coupling at least one cargo compartment of the vessel with the body of water. At least one discharge pump on the vessel is selectively actuatable, both when the vessel is moving and stationary, to concurrently (i) draw water and debris from the body of water, through the at least one intake opening and into the at least one cargo compartment and (ii) remove water and little or no debris from the at least one cargo compartment. At least one buoyant portion of at least one inflow regulator on the vessel free-floats at or near the surface of liquid in the vessel. The at least one inflow regulator limits the water and debris drawn from the body of water into the cargo compartment to primarily debris and water that passes over the at least one buoyant portion of the at least one inflow regulator during debris collection operations. The at least one inflow regulator is selectively actuatable to adjust the height of the at least one buoyant portion thereof relative to the surface of liquid in the vessel during debris collection operations.

In some embodiments, the present disclosure involves an oil recovery vessel useful for collecting oil floating in a body of water in an oil spill area at or near the surface of the body of water. The vessel includes a plurality of distinct cargo compartments positioned adjacent to one another along at least part of the length of the vessel and arranged and adapted to contain sea water and oil. A front the cargo compartment is disposed closest to the front of the vessel and a rear the cargo compartment is disposed closest to the rear of the vessel. The front cargo compartment is separated from the front end of the vessel by at least one front vertical wall. Each adjacent pair of cargo compartments is separated by at least one other vertical wall. Each vertical wall includes at least one opening formed therein proximate to the upper end thereof. Each opening is arranged and adapted to allow the flow of liquid through the associated vertical wall and into the adjacent cargo compartment aft of the vertical wall.

These embodiments include a plurality of gates. Each gate allows and disallows liquid flow through at least one of the openings. Each gate is selectively movable between at least one open and at least one closed position. At least one suction conduit is fluidly coupled to each cargo compartment to concurrently allow water to be removed from, and oil to enter, any of them. The vessel also includes at least one at least partially floating, elongated, boom disposed proximate to the front of the vessel. Each boom is arranged and adapted to encourage oil to flow into the front cargo compartment from the body of water.

In various embodiments, the present disclosure involves a system for collecting oil on a waterborne vessel from an oil spill area at or near the surface of a body of water. The system includes at least three successively fluidly coupled cargo compartments configured to initially hold sea water and thereafter hold oil. A front cargo compartment is disposed closest to the front of the vessel and a rear cargo compartment is disposed closest to the rear of the vessel. At least one intermediate cargo compartment is disposed between the front and rear cargo compartments.

The system of these embodiments also includes a plurality of fluid passageways. At least a first fluid passageway fluidly couples the front cargo compartment to the body of water and is configured to allow the flow of liquid into the front cargo compartment from the body of water. At least a second fluid passageway fluidly couples the front and the forward-most intermediate cargo compartment and is configured to allow the flow of liquid from the front cargo compartment into the forward-most intermediate cargo compartment. If there is more than one intermediate cargo compartment, at least a third fluid passageway fluidly couples each pair of successively fluidly coupled intermediate cargo compartments in the direction of the rear end of the vessel and is configured to allow liquid flow from the forward-most of each such pair of intermediate cargo compartments to the aft-most of each such pair of intermediate cargo compartments. At least one other fluid passageway fluidly couples the aft-most intermediate cargo compartment and the rear cargo compartment to allow liquid flow into the rear cargo compartment from the aft-most intermediate cargo compartment.

The system of these embodiments also includes at least one suction conduit fluidly coupled to each cargo compartment and configured to allow each cargo compartment to be concurrently at least substantially emptied of sea water and at least substantially filled with oil, starting with the rear cargo compartment. At least one fluid discharge pump is fluidly coupled to the suction conduit(s) and arranged and adapted to concurrently draw sea water out of each cargo compartment through the suction conduit(s) and draw oil into that cargo compartment through at least one associated passageway until that cargo compartment is substantially full of oil, starting with the rear cargo compartment and ending with the front cargo compartment.

There are embodiments of the present disclosure that involve a method of collecting oil on a waterborne vessel from an oil spill area at or near the surface of a body of water. At least three fluidly interconnected cargo compartments on the vessel are at least substantially filled with sea water. A front cargo compartment is disposed closest to the front end of the vessel, a rear cargo compartment is disposed closest to the rear end of the vessel and at least one intermediate cargo compartment is disposed between the front and rear cargo compartments. The front end of the vessel is positioned in or adjacent to the oil spill area. At least a first fluid passageway allows oil and some sea water to enter the front cargo compartment proximate to the upper end thereof from the body of water. Additional fluid passageways allow oil and some sea water to pass from the front cargo compartment into each successively fluidly coupled cargo compartment proximate to the upper end thereof (in the direction of the rear end of the vessel), respectively. At least one fluid discharge pump concurrently pumps sea water out of the rear cargo compartment through at least one suction conduit and allows oil and some sea water to enter the rear cargo compartment from the aft-most intermediate cargo compartment.

After the rear cargo compartment is substantially filled with oil, the rear cargo compartment is fluidly isolated from the other cargo compartments. At least one fluid discharge pump concurrently pumps sea water out of the aft-most intermediate cargo compartment through at least one suction conduit and allows oil and some sea water to enter the aft-most intermediate cargo compartment from the cargo compartment fluidly coupled thereto on its forward side. After the aft-most intermediate cargo compartment is substantially filled with oil, the aft-most intermediate cargo compartment is fluidly isolated from the other substantially water filled cargo compartments. These acts are repeated for any additional intermediate cargo compartments and then the front cargo compartment. After the front cargo compartment is substantially filled with oil, it is fluidly isolated from the body of water.

It should be noted that the use of "(s)" in reference to an item, component or action (e.g. "surface(s)") throughout this patent should be construed to mean "at least one" of the referenced item, component or act.

Accordingly, the present disclosure includes features and advantages which are believed to enable it to advance debris recovery technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 12 is a side view of the exemplary vessel of FIG. 1 with the side shell removed to show exemplary interior cargo compartments and other components during exemplary debris recovery operations in accordance with an embodiment of the present disclosure;

FIG. 14 is a side view of the exemplary vessel of FIG. 1 with the side shell removed to show exemplary interior cargo compartments and other components during exemplary debris recovery operations in accordance with an embodiment of the present disclosure;

FIG. 24 is an isolated perspective view of part of the front end of the exemplary vessel and debris recovery system of FIG. 23;

FIG. 25 is a side, partial cross-sectional, view of the exemplary vessel of FIG. 23 with the side shell removed and showing the exemplary interior cargo compartment and inflow regulator in accordance with at least one embodiment of the present disclosure;

FIG. 26 is side, partial cross-sectional, view of part of the exemplary vessel of FIG. 23 with the side shell removed and showing the exemplary inflow regulator in an exemplary rest position;

FIG. 27 is a perspective view of the exemplary inflow regulator of FIG. 26;

FIG. 28 is another perspective view of the exemplary inflow regulator of FIG. 26 showing its underside;

FIG. 29 is side, partial cross-sectional, view of part of the exemplary vessel of FIG. 23 with the side shell removed and showing the exemplary inflow regulator in an exemplary operating position;

FIG. 32 is a side, partial cross-sectional, view of the exemplary waterborne vessel of FIG. 23 with the side shell removed and the exemplary debris recovery system including the exemplary variable buoyancy system of FIG. 30 and showing the exemplary inflow regulator in an exemplary rest position in accordance with one or more embodiments of the present disclosure;

FIG. 35 is a side, cut-away view of part of an exemplary waterborne vessel with the side shell removed and including a debris recovery system having an exemplary sliding-type inflow regulator in accordance with one or more embodiments of the present disclosure;

FIG. 36 is a perspective view of the exemplary sliding-type inflow regulator of FIG. 35;

FIG. 37 is a top view of part of the exemplary waterborne vessel and debris recovery system shown in FIG. 35;

FIG. 38 is a side, cut-away view of part of the exemplary waterborne vessel of FIG. 35 with the side shell removed and including exemplary seal members in accordance with one or more embodiments of the present disclosure;

FIG. 39 is a top view of part of the waterborne vessel and exemplary debris recovery system shown in FIG. 38;

FIG. 40 is a side, cut-away view of part of the exemplary waterborne vessel of FIG. 30 with the side shell removed and including an exemplary inflow regulator catcher in accordance with one or more embodiments of the present disclosure;

DETAILED DESCRIPTION OF PRESENTLY PREFERRED EMBODIMENTS

Figure 1:
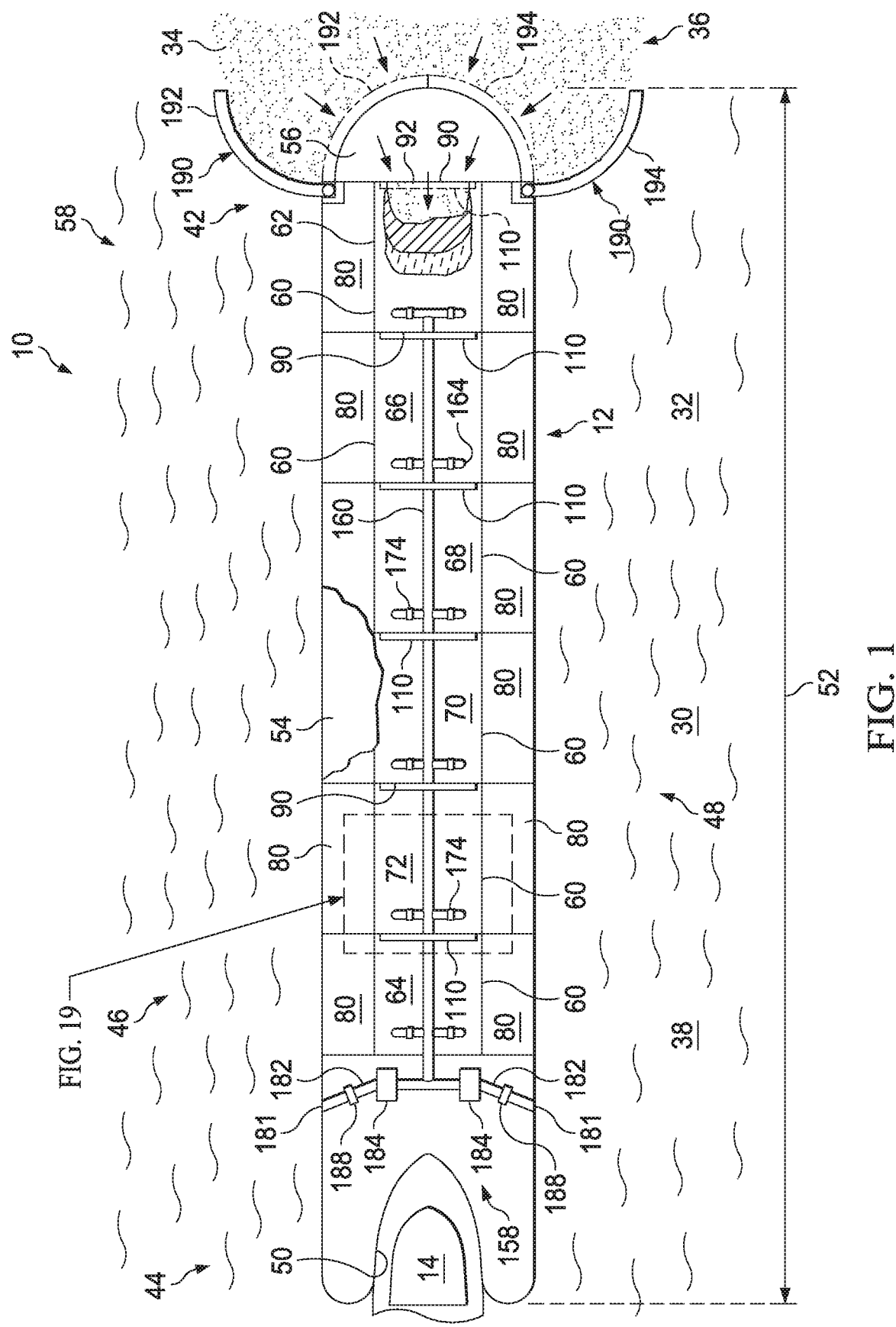
FIG. 1 is a top view of an exemplary debris recovery vessel in accordance with an embodiment of the present disclosure.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring initially to FIG. 1, an exemplary debris recovery vessel 10 in accordance with an embodiment of the present disclosure is shown in a body of water 30. In this example, the debris to be recovered is a contaminant, such as floating oil 34. However, the vessel 10 may be used to recover any other form of floating contaminants or debris. It should be noted, the terms "debris" and "contaminant" are used interchangeably herein. In other words, the "debris" being recovered may sometimes be referred to herein as a "contaminant", whether or not it actually formally contaminates the body of water 30. For example, the debris may include one or more substances, materials or a combination thereof, such as floating chemicals (e.g. alcohol, petroleum products, oil) and particulate pollutants (e.g. plastic debris and micro plastics, such as presently found in the Great Pacific Garbage Patch). Moreover, the present disclosure and appended claims are not limited to or by type of debris or contaminants, unless and only to the extent as may be expressly provided in a particular claim and only for that claim and claims depending therefrom.

The vessel 10 may be arranged and adapted to be used in any type of body of water 30. For example, the body of water 30 may be any inland or offshore waterway, such as a sea or ocean, bay, sound, inlet, river, lake, canal or the like. The nature and type of the body of water 30 is not limiting upon the present disclosure. For convenience, the water in the body of water 30 is referred to herein as "sea water" 38, even though it may not actually be sea water, depending upon the type of body of water 30. For example, in some cases, the "sea water 38" as referenced herein may be fresh water from an inland body of water, such as a lake.

The illustrated vessel 10 is useful for collecting oil 34 (and/or other debris) floating in the body of water 30 in a debris field, or oil spill area, 36 at or near the surface 32 of body of water 30. For the purposes of the description below and the appended claims, the surface 32 of the body of water 32 is considered generally at the sea level 33 (e.g. FIG. 41) of the body of water 30; the "debris field", or "oil spill area", 36 can be characterized as generally having a top layer of floating debris (e.g. oil), followed by a lower layer of debris (e.g. oil) contaminated sea water (e.g. "oily water") followed by lower layers of sea water 38, particularly when there is turbulence in the water from wind, waves, vessels moving through the oil spill area 36 or other causes. It should be noted, however, that such "layering" is a general description and the actual disposition of oil and other substances and materials in moving sea water 38 is dynamic and thus constantly changing. As used herein, the terms "wave" and variations thereof means and includes waves, swells, chops and any other formations of water 38 in a body of water 30 that cause the surface 32 of the body of water 30 to not be flat. In this embodiment, the vessel 10 includes a front or forward end 42, a rear or aft end 44, a left or port side 46, a right or starboard side 48 and is moveable across the surface 32 of the body of water 30 to, from and through the debris (e.g. oil) spill area 36. The front end 42 of the illustrated vessel 10 is shown having a curved shape, but could instead have a straight, rectangular or any other desired shape.

The vessel 10 may be self-propelled or have any other suitable propulsion arrangement. In this example, the vessel 10 is a ship shape tanker barge 12 moved by a primary mover, such as a tug boat 14, in an integrated tug/barge arrangement. The illustrated tug 14 inserts into the barge 12 at a slot 50 at the rear end 44 of the barge 12. Other embodiments of the vessel 10 may be a self-propelled tanker or other ship, a barge moved by a tanker ship or any other type of waterborne vessel. Furthermore, the vessel 10 may be a retrofit or a new vessel. Thus, the present disclosure is not limited by the nature and type of vessel 10 or how it is propelled in the body of water 30.

Still referring to FIG. 1, in accordance with an embodiment of the present disclosure, the vessel 10 includes a debris recovery system 58 having a plurality of distinct, successively fluidly coupled cargo compartments, or processing/collection tanks, 60. As used herein and in the appended claims, the terms "successive" and variations thereof means one after the other. In the above instance, for example, the cargo compartments 60 are fluidly coupled in succession, or one after the other. So a first compartment is fluidly coupled to a second compartment, which is fluidly coupled to a third compartment and so on. In the present embodiment, the exemplary cargo compartments 60 are positioned proximate or adjacent to one another along at least part of the length 52 of the vessel 10 and below the top deck 54. Each exemplary cargo compartment 60 is arranged and adapted to contain fluid (e.g. sea water 38 and oil 34).

Any desired number of cargo compartments 60 may be included. In this example, a front, or first, cargo compartment 62 is closest to the front end 42 of the vessel 10, a rearmost, or sixth, cargo compartment 64 is closest to the rear end 44 of the vessel 10 and four intermediate cargo compartments 60 (e.g. the second 66, third 68, fourth 70 and fifth 72 cargo compartments) are positioned therebetween. However, there may be fewer (e.g. one) or more (e.g. 6, 7, 8, etc.) cargo compartments 60. Some embodiments may include cargo compartments 60 that are side-by-side, one above the other, and/or multiple rows of cargo compartments 60 or any combination thereof. The present disclosure is not limited by the number, size, location and configuration of cargo compartments 60.

The cargo compartments 60 may have any suitable size, shape and dimensions. For example, in some embodiments, the exemplary cargo compartments 60 each have a height of 45 feet, a width of 50 feet and a length of 75 feet.

If desired, the vessel 10 may have additional compartments. For example, the illustrated barge 12 is a double-hull tanker that includes outer compartments surrounding the cargo compartments 60, such as one or more side ballast tanks 80, a forward void 84 (e.g. FIG. 2), a rear void 86 (e.g. FIG. 2) and one or more inner bottom tanks 88 (e.g. FIG. 2). These additional compartments may be used for any suitable purpose. For example, one or more of the ballast tanks 80 may be loaded and/or unloaded during debris recovery operations with sea water to obtain and maintain the desired height of the vessel 10 in the body of water 30. However, the inclusion, quantity, type, configuration, location and use of additional compartments is not limiting upon the present disclosure.

Figure 3:
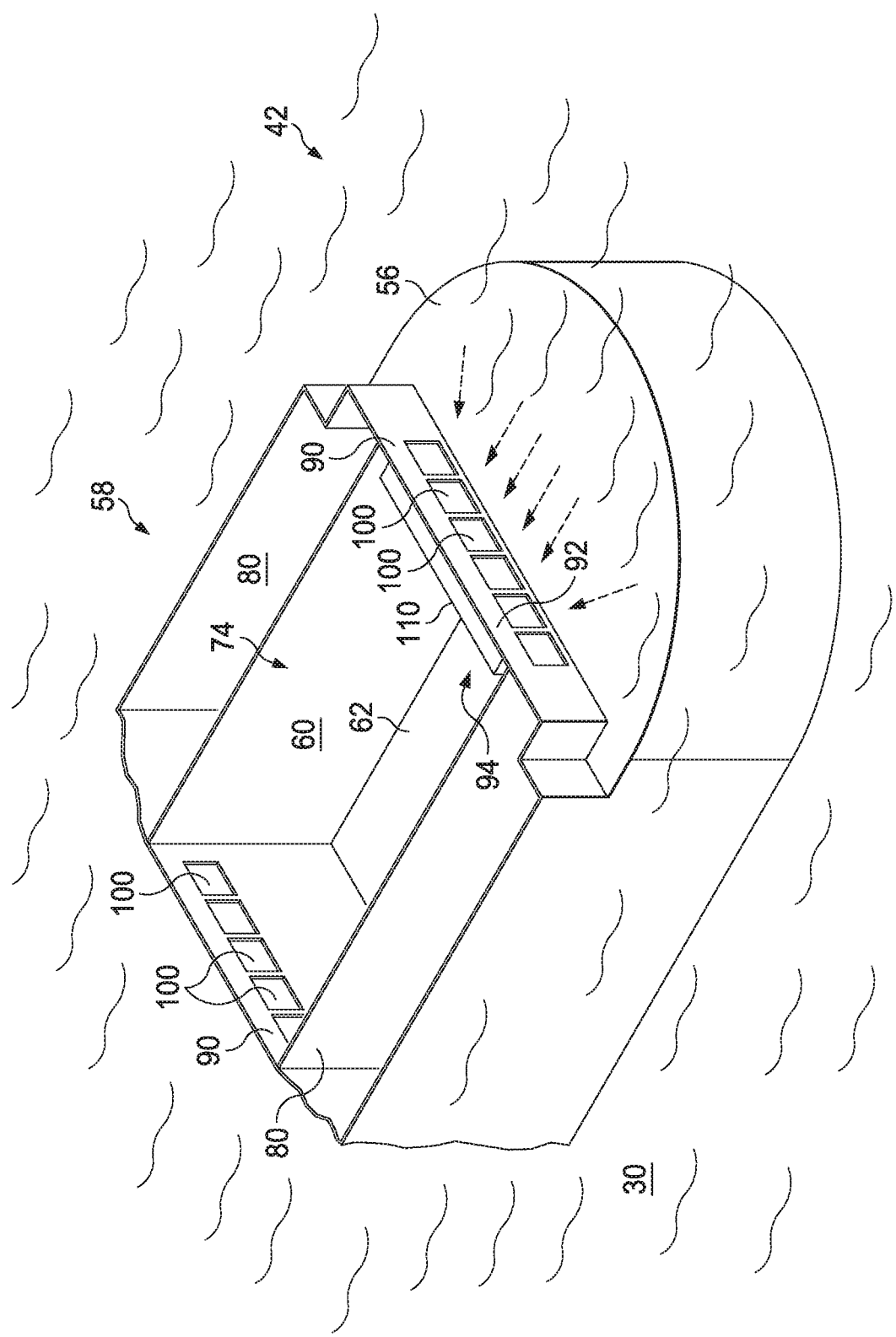
FIG. 3 is a perspective view of part of the front end of the exemplary vessel of FIG. 1.
Figure 4:
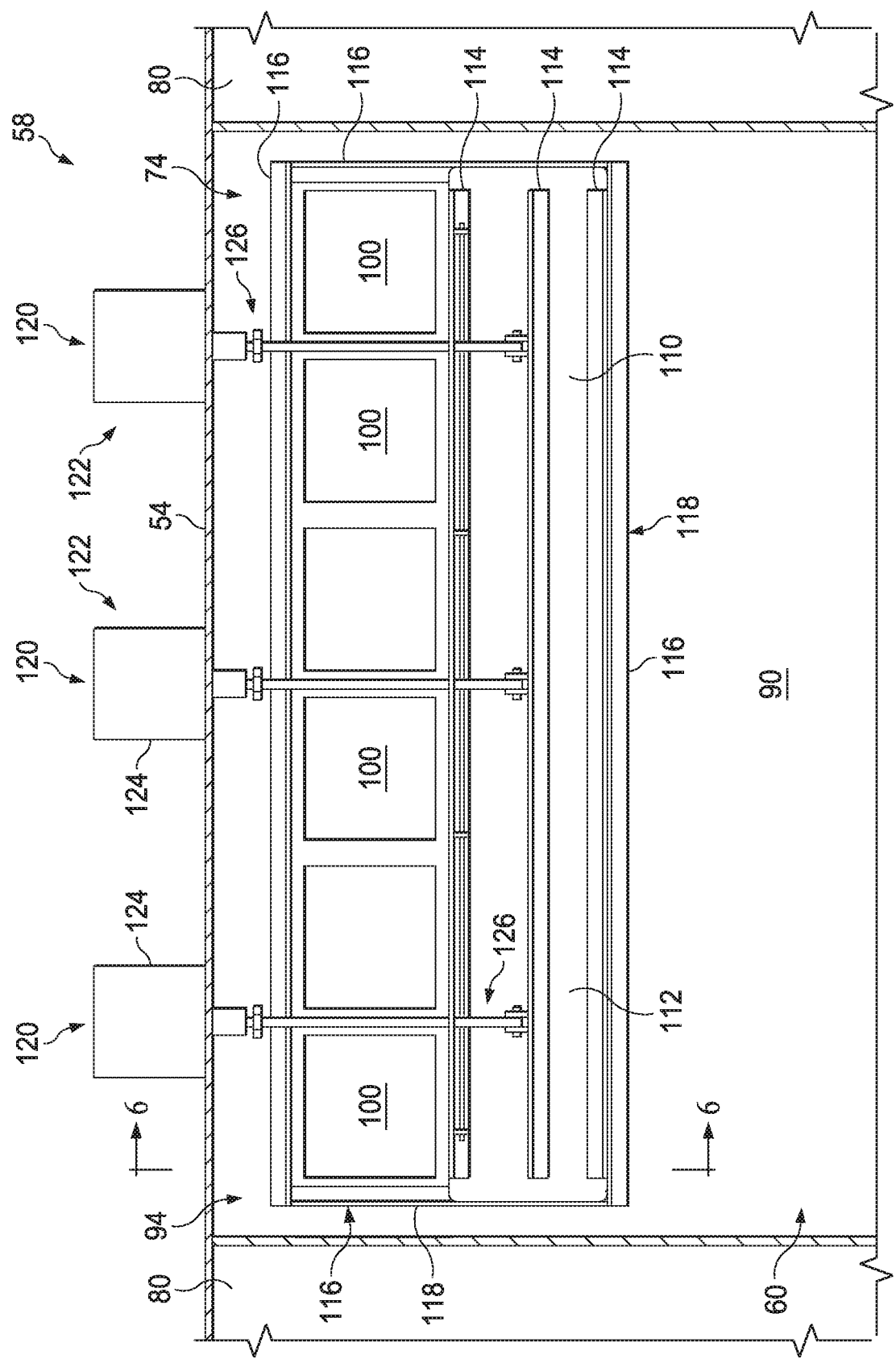
FIG. 4 is a view facing an exemplary vertical wall disposed between cargo compartments of the embodiment of FIG. 1 from inside one of the cargo compartments (facing rearwards) and showing an exemplary associated gate in a fully open position.
Figure 5:
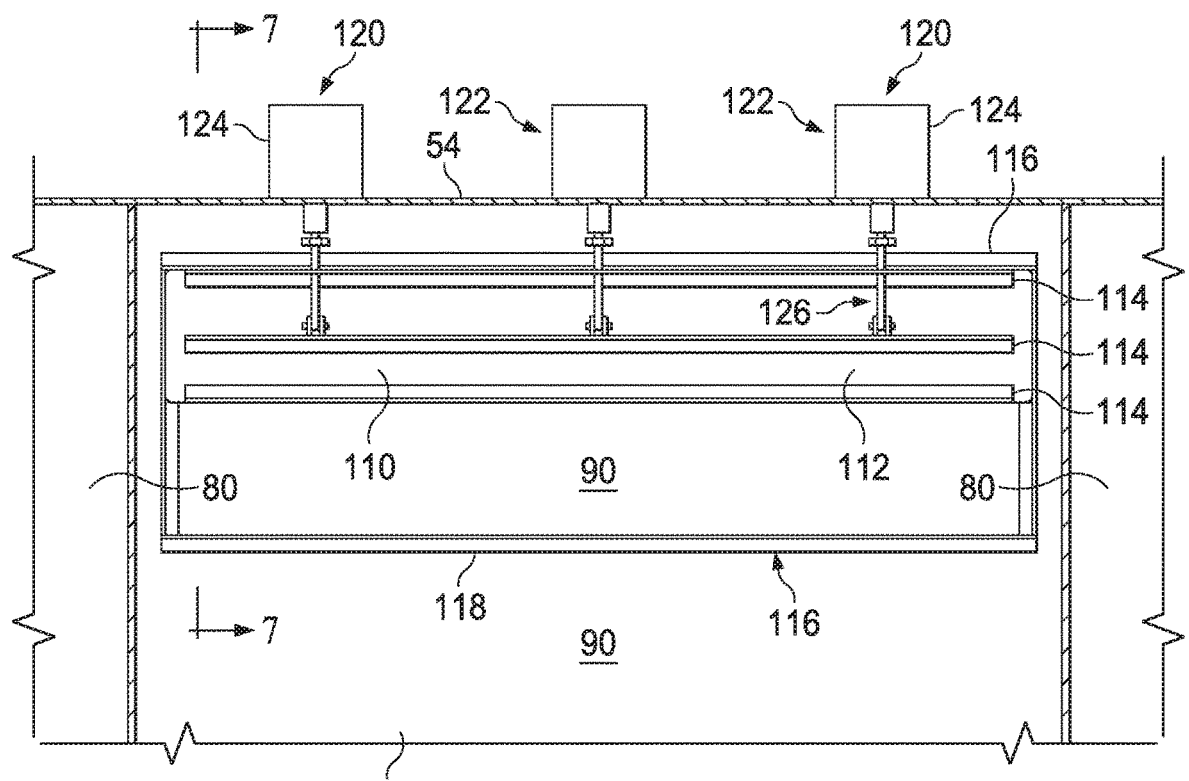
FIG. 5 shows the exemplary vertical wall of FIG. 4 with the exemplary gate in a closed position.
Figures 6, 7, 8:
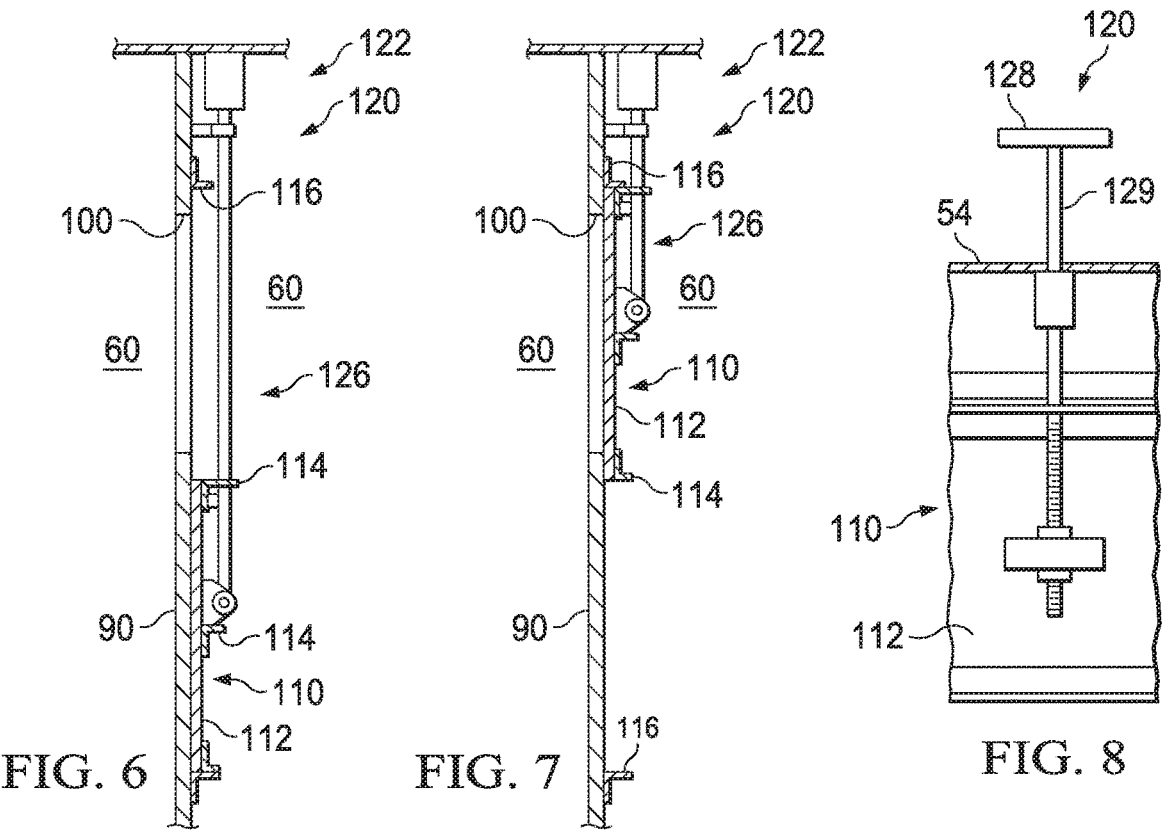
FIG. 6 is a cross-sectional view of part of the exemplary vertical wall and gate of FIG. 4 taken along lines 6-6.
FIG. 7 is a cross-sectional view of part of the exemplary vertical wall and gate of FIG. 5 taken along lines 7-7.
FIG. 8 is a front view of part of an exemplary gate of the present disclosure showing an alternate embodiment of a gate actuator.

Still referring to the embodiment of FIG. 1, each adjacent pair of illustrated cargo compartments 60 is separated by at least one vertical wall, or bulkhead, 90. At least one vertical wall, or bulkhead, 90 also separates the exemplary front cargo compartment 62 from the front end 42 of the vessel 10 and the body of water 30, and may sometimes be referred to herein as the front vertical wall 92. As used throughout this patent (including the appended claims), the term "vertical" and variations thereof means, includes and refers to perfectly vertical, angled (not perfectly vertical) or otherwise extending in a non-horizontal manner or orientation. For example, the "vertical wall" 90 is not limited to having only a perfectly vertical orientation, but instead means and includes any orientation that is not horizontal. Referring now to FIGS. 3 & 4, each illustrated vertical wall 90 includes at least one fluid passageway, or opening, 100 that allows fluid flow past the associated vertical wall 90. For example, the opening(s) 100 in the front vertical wall 92 (referred to sometimes herein as the intake opening(s) 102 (e.g. FIG. 24)) allows fluid flow between the body of water 30 and the front cargo compartment 62 (see also FIG. 11), while the openings 100 in each successive vertical wall 90 allow fluid flow between the successive adjacent cargo compartments 60 (see also FIG. 12). In other embodiments, the front vertical wall 92 may instead be coupled to one or more forward-facing trunk (not shown) or other component having at least one fluid passageway 100 (e.g. intake opening 102) that allows fluid flow from the body of water 30, through the associated opening(s) 90 and into the front cargo compartment 62. If desired, two trunks (not shown) fluidly coupled to the compartment 62 may be outwardly angled relative to the longitudinal centerline of the vessel 10. Likewise, the fluid passageways 100 in the other vertical walls 90 may communicate fluid through one or more trunks or other components. In some embodiments, one or more of the openings 100 may be at least partially formed in or by the body, hull, top deck or other component of the vessel 10 (e.g. not necessarily in a vertical wall 90).

In this particular example, each opening 100 is formed in the corresponding vertical wall 90 proximate to its upper end 94 and the upper end 74 of the adjacent cargo compartment(s) 60. As will be described further below, the location of the openings 100 near the upper end 74 of the cargo compartments 60 may be provided, for example, to encourage primarily oil 34 and some oily water (at times, maybe only oil or other debris) to flow into the front cargo compartment 62 from the body of water 30 and then into each successive cargo compartment 66, 68, 70 72 and 64 during debris recovery operations. It should be noted that to the extent that oil and sea water enter any cargo compartment 60, the lower density of the oil 34 and heavier density of the sea water 38 are expected, to a large extent, to cause the oil 34 to ultimately float atop the sea water 38 therein.

The openings 100 may have any suitable size, configuration and orientation. For example, each vertical wall 90 of the illustrated debris recovery system 58 includes six square openings 100, each having dimensions of 6 feet high by 15 feet wide and spaced 6 feet from the top of the associated cargo compartment 60. However, there may be more or less openings 100 formed in each vertical wall 90, which may have any other desired dimensions and location.

Figure 2:
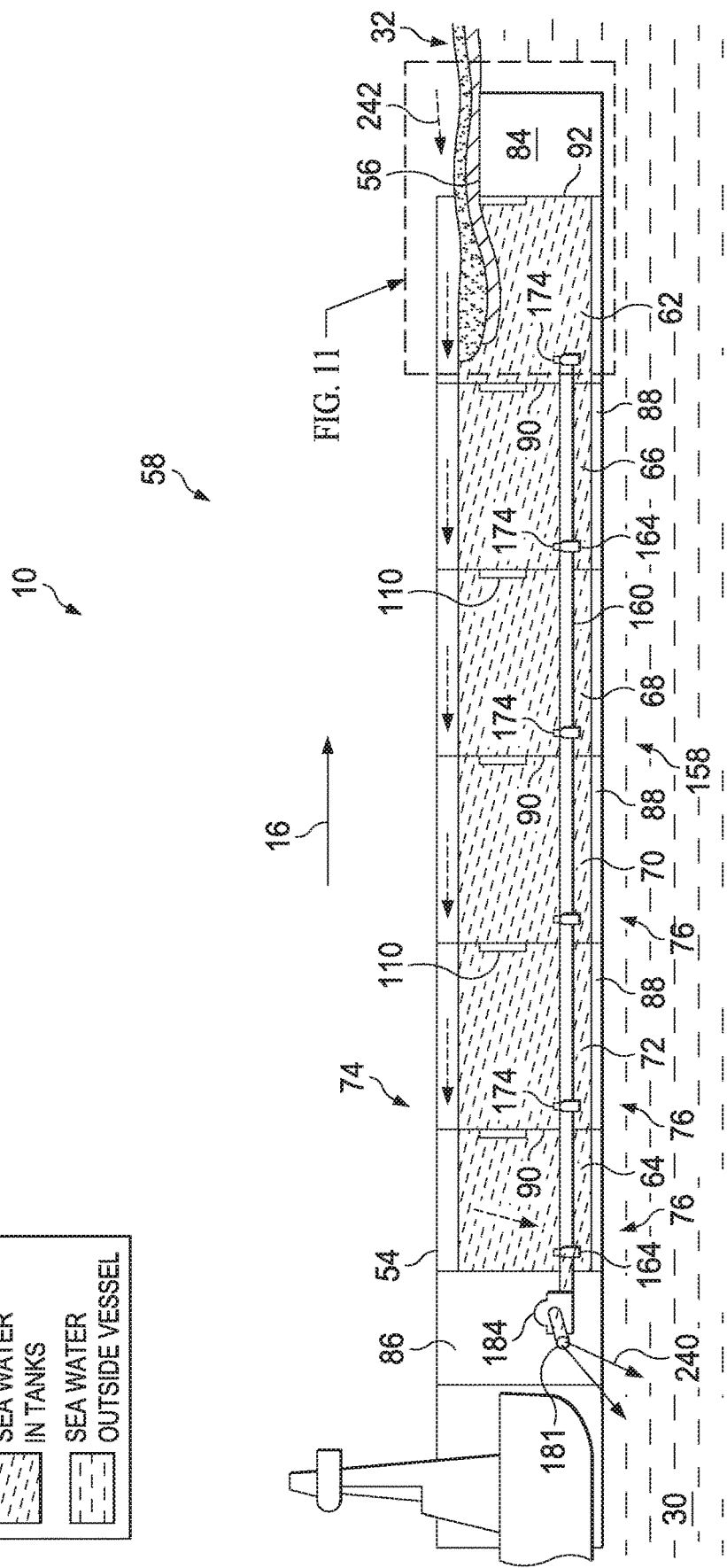
FIG. 2 is a side view of the exemplary vessel of FIG. 1 with the side shell removed to show exemplary interior cargo compartments and other components during exemplary debris recovery operations in accordance with an embodiment of the present disclosure.
Figure 11:
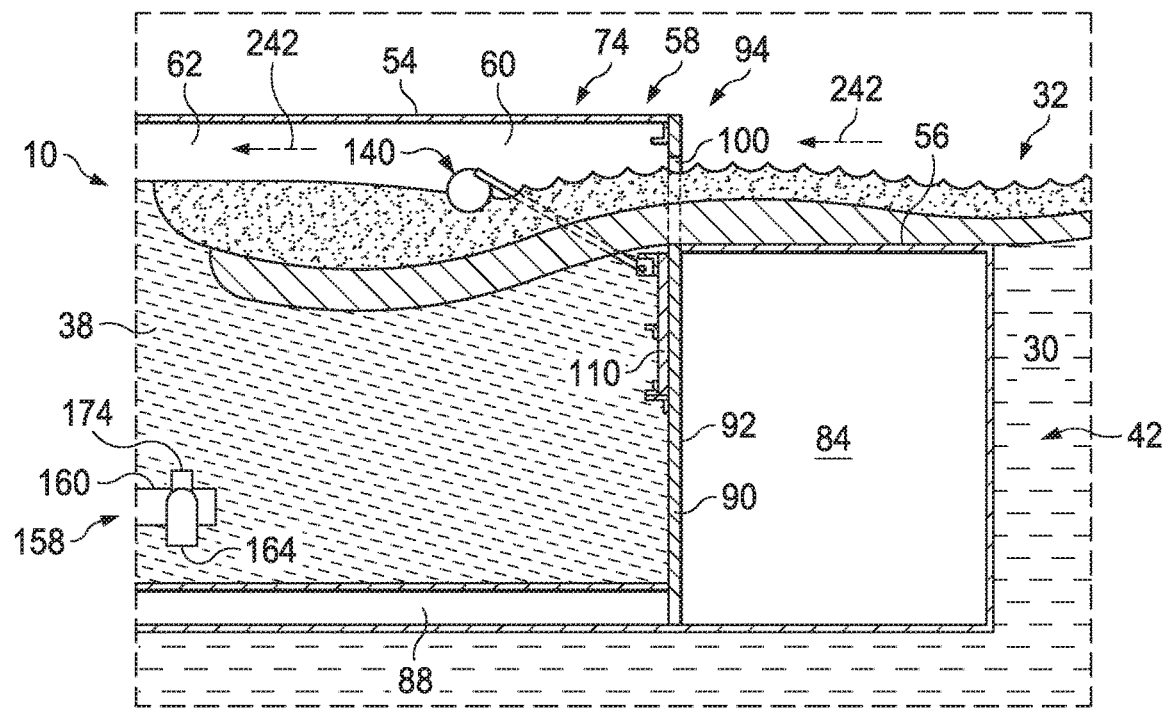
FIG. 11 is an exploded view of part of the exemplary vessel shown in FIG. 2.

Referring to FIGS. 1-3, in the illustrated embodiment, the opening(s) 100 in the front vertical wall 92 allow the flow of liquid into the front cargo compartment 62 from the body of water 30 (see also FIG. 11). The exemplary opening(s) 100 in each successive vertical wall 90 allow liquid to flow at least from the adjacent foremost cargo compartment 60 into the adjacent aft-most cargo compartment 60; or, in other words, into each successive cargo compartment 60 in the aft direction. Thus, in this embodiment, liquid can flow from the body of water 30 into the front cargo compartment 62, then into the second cargo compartment 66, then into the third cargo compartment 68 and so on and finally into the rear-most cargo compartment 64 through the respective openings 100.

Still referring to FIGS. 1-3, if desired, the vessel 10 may have an intake, or recessed front, deck 56 forward of the front vertical wall 92. As used herein, the term "recessed front deck", "intake deck" and variations thereof refers to the uppermost deck of the vessel 10 that is forward of the front vertical wall 92 and is recessed relative to, or lower in height than, the top deck 54 of at least some of the portion(s) of the vessel 10 that extend over the cargo compartments 60. In this embodiment, as shown in FIG. 3, the recessed front deck 56 is a flat plate that aligns below the height of the openings 100 in the front vertical wall 92, such as to assist in encouraging the flow of the top layer(s) of liquid from the body of water 30 into the front cargo compartment 62. However, the recessed front deck 56 may have any other form, configuration and shape or may not be included.

Still referring to FIGS. 1 & 3, the exemplary debris recovery system 58 may include at least one distinct door, or gate, 110 arranged and adapted to allow and disallow the flow of fluid through at least one of the openings 100. Each exemplary gate 110 is selectively movable between at least one open and at least one closed position. In the open position(s), each exemplary gate 110 allows liquid flow through its associated opening(s) 100, and in the closed position(s), each illustrated gate 110 disallows liquid flow through its associated opening(s) 100. If desired, the debris recovery system 58 may be configured so that the gates 110 may be used, at least in part, to further refine the flow of liquid thereby. For example, the position of the respective gates 110 may be remotely adjusted to serve as a skimmer, or oil separator, to encourage mostly oil to waterfall, cascade or pass, by the gate 110 through the associated opening(s) 100. In that context, the gate 110 thus serves as an embodiment of a "sliding"-type wave dampener, or inflow regulator, 140 (e.g. as discussed below). In the present embodiment, the fully open position(s) of each gate 110 is below the associated opening(s) 100. Consequently, if desired, each exemplary gate 110 may be movable up therefrom, or down from a closed position, into one or more partially open position. Thus, in some embodiments, the height of the gate 110 can be adjusted relative to the lower end of the associated opening(s) 100 to cause a waterfall, or cascading, effect of the top layer(s) of liquid (e.g. oil and oily water) and block the lower, heavier, layer of sea water 38 from passing thereby.

It should be noted that, in some embodiments, the gates 110 in the closed position may not provide a complete fluid-tight seal. Thus, when all gates 110 associated with all the openings 100 in one of the vertical walls 90 are in a closed position, the aft-most adjacent cargo compartment 60 is at least substantially sealed from the inflow of liquid from the other adjacent cargo compartment 60, or, in the case of the front cargo compartment 62, from the body of water 30. For example, when the gate(s) 110 associated with opening(s) 100 in the front vertical wall 92 are closed, the front cargo compartment 62 is at least substantially sealed from the entry of liquid from the body of water 30 through those opening(s) 100. As used herein and throughout this patent and the appended claims, the terms "substantial", "substantially", "primarily" and variations thereof mean generally more than 50% and depending upon the particular components involved and/or circumstances, may be more than 60%, 70%, 80%, 90% and even may be more than 95%. However, in some instances of the use of the terms "generally", "substantially" and variations thereof herein, the above definition may not apply, as should be apparent from the context of such use. For example, in some embodiments, such as upon completion of debris recovery operation and prior to transit of the vessel 10 to an off-loading location, all gates 110 may be 100% sealed.

The gates 110 may have any suitable form, construction, configuration and operation. Referring to FIGS. 4-7, in the illustrated embodiment, a single gate 110 is movable over all the openings 100 formed in the associated vertical wall 90. The exemplary gate 110 includes an elongated plate 112 that is selectively moveable up and down over the adjacent openings 100 between at least one open (e.g. FIGS. 4 & 6) and at least one closed position (e.g. FIGS. 5 & 7) by at least one gate actuator 120. In this embodiment, the gate 110 includes numerous (e.g. three) stiffeners 114 extending at least substantially across the length of the plate 112. The stiffeners 114 may have any suitable form, configuration and construction. For example, the stiffeners 114 may be angle iron coupled to the outside surface of the plate 112, such as to assist in supporting the plate 112 and maintaining the shape of the plate 112, other desired purpose(s) or a combination thereof. However, the present disclosure is not limited to this arrangement. In other embodiments, for example, a distinct gate 110 may be provide for each opening 10, may have a configuration that does not include an elongated plate 112 and/or may not have stiffeners 114.

The gate actuator(s) 120 may have any suitable form, configuration, construction and operation. For example, the gate actuator 120 may be electronically and/or manually and/or remotely controlled. For another example, one or more gate actuators 120 may be used to control movement of one or more gates 110. For yet another example, the gate actuator 120 may be used to selectively move the associated gate(s) 110 between positions, such as between any among multiple different open positions and a closed position, based upon any suitable criteria. For example, any one or more of the gates 110 may be moved to an optimal partially-open position for encouraging mostly oil to flow thereby based upon the particular density, thickness and/or weight of the oil. Thus, the gate actuator(s) 120 may, if desired, be configured so that the position of one or more of the gates 110 may be varied throughout debris recovery operations.

Still referring to FIGS. 4-7, in this embodiment, three gate actuators 120 are used to drive each exemplary gate 110. Each illustrated gate actuator 120 is a hydraulic actuator 122, as is and become further known. For example, the hydraulic actuator 122 may include a hydraulic power unit 124 (shown positioned above the top deck 54) which drives a telescoping unit 126 coupled to the gate 110. In other embodiments, the gate actuator 120 may be a pneumatic actuator, as is and become further known. In the embodiment of FIG. 8, the gate actuator 120 includes a manually rotatable crank-wheel 128 and crank rod 129 coupled to the gate 110 and configured to move the gate 110 up into at least one closed position and down into one or more open positions. If desired, the crank-wheel 128 may extend above the top deck 54, such as for convenience.

Referring specifically to FIG. 4, if desired, one or more gate guide/sealing mechanisms 116 may be provided, such as to assist in defining one or more position of the gate 110, guiding the up and down movement of the gate 110, enhancing the desired sealing engagement between the gate 110 and vertical wall 90, other purpose(s) or a combination thereof. The gate guide/sealing mechanism 116 may have any suitable form, configuration, construction and operation. In the illustrated embodiment, the gate guide/sealing mechanism 116 includes a frame 118 extending around the periphery of all of the openings 100 to define the upper and lower limits of movement of the gate 110 and also assist in providing some sealing engagement between the gate 110 in a fully closed position and the vertical wall 90. For example, the frame 118 may be constructed of angle iron coupled to the vertical wall 90.

Figure 10:
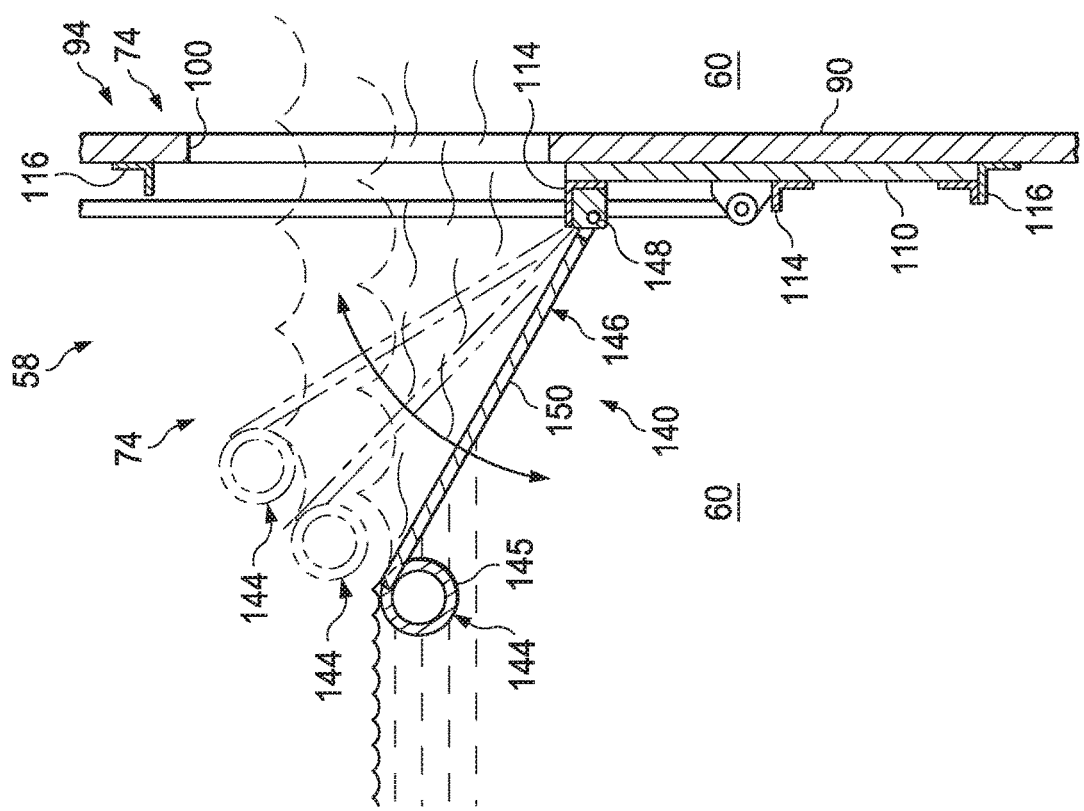
FIG. 10 is a side, cross-sectional view of the exemplary wave dampener of FIG. 9 taken along lines 10-10.
Figure 9:
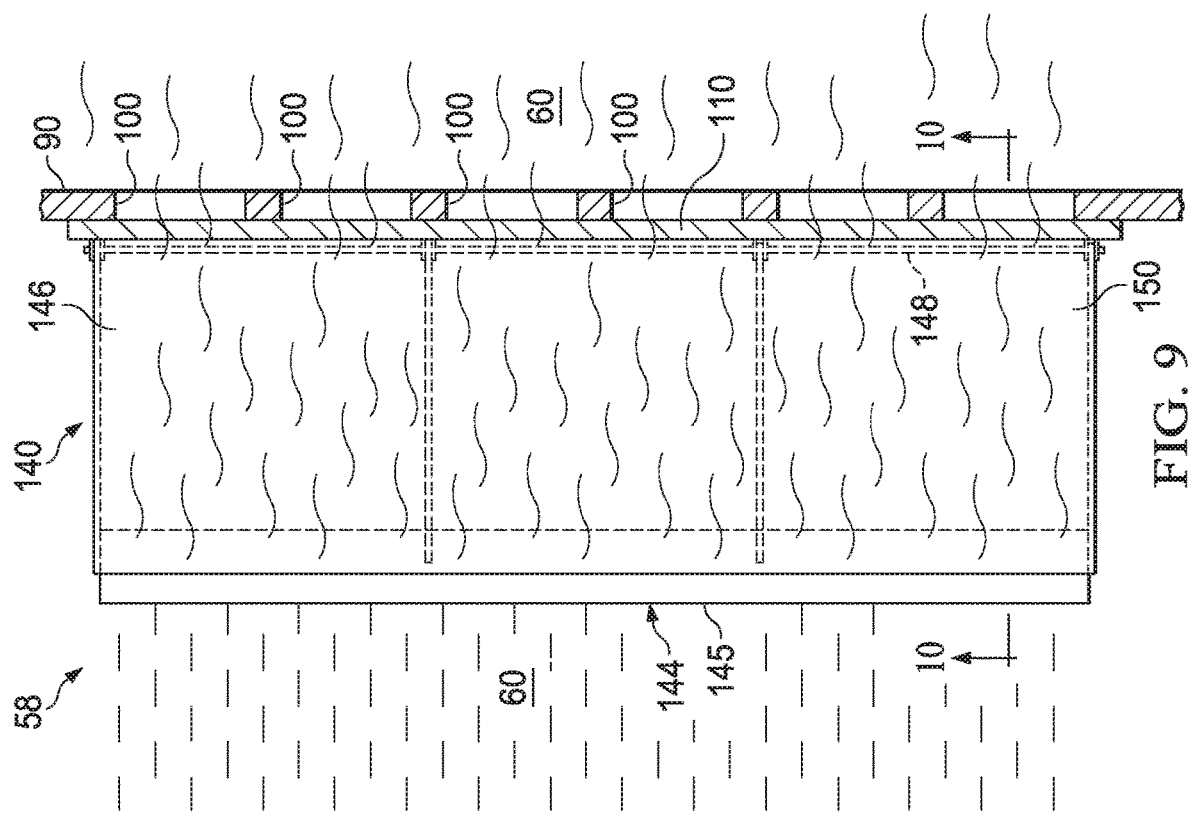
FIG. 9 is a top view of an exemplary wave dampener within an exemplary cargo compartment of the vessel of FIG. 1 in accordance with an embodiment of the present disclosure.

Now referring to FIGS. 9 & 10, if desired, the debris recovery system 58 may include one or more wave dampeners, or inflow regulators (IFR), 140 within one or more of the cargo compartments 60 or any other desired location on the vessel 10. As used herein and in the appended claims, the terms "wave dampener", "inflow regulator", "IFR" and variations thereof are used interchangeably. The wave dampener(s) 140 may have any suitable purpose. For example, the wave dampener(s) 140 may be provided to reduce the size of, or turbulence caused by, waves in the liquid passing through one or more of the openings 100, help encourage only the top layers of liquid (e.g. oil, oily water) to pass through the openings 100, and/or help maintain a steady flow of liquid through the openings 100.

The wave dampeners 140 may have any suitable form, configuration, construction and operation. Some embodiments of IFRs 140 are sometimes referred to herein as "sliding"-type IFRs 140 (e.g. gates 110, FIGS. 2, 4-6, 14-18; see also, FIGS. 35-39) because they are designed to move in a generally sliding movement (typically up and down) relative to the vessel 10, while others are sometimes referred to herein as "pivoting"-type IFRs 140 because they are configured to pivot relative to the vessel 10 (see e.g. FIGS. 10-13, 23-34, 41-48).

Figure 13:
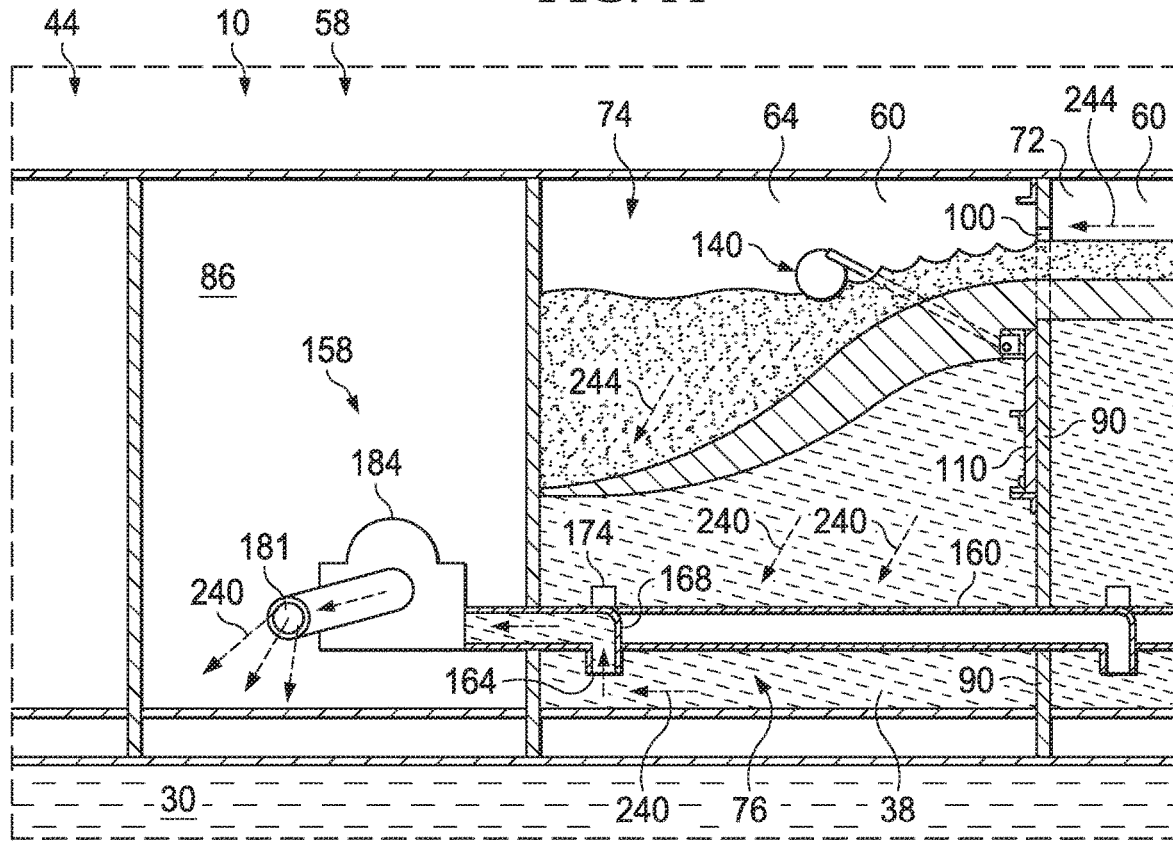
FIG. 13 is an exploded view of part of the exemplary vessel shown in FIG. 12.

Referring again to FIGS. 9 & 10, in this embodiment, a pivoting-type IFR 140 extends into each cargo compartment 60 proximate to the opening(s) 100 formed in the forward-most vertical wall 90 for that cargo compartment 60 (See also FIGS. 11 & 13). The illustrated wave dampener 140 includes at least one elongated float 144 spaced-away from the vertical wall 90 and arranged to float in the liquid entering the cargo compartment 60 though the openings 100. The exemplary elongated float 144 is configured to freely move up and down with the surface of the liquid. In FIG. 10, for example, the elongated float 144 is shown in three positions as it moves up and down with the incoming liquid.

In this particular embodiment, the elongated float 144 is a single tube 145 (e.g. hollow-pipe) coupled (e.g. by weld, mechanical connectors, etc.) to the end of one or more carrier 146. The illustrated carrier 146 is pivotably connected to the gate 110 associated with the openings 100, such as with one or more hinge pin 148. The exemplary carrier 146 and elongated float 144 extend across all of the openings 100 in the vertical wall 90. Depending upon the particular circumstances and arrangement, the carrier 146 may also assist in reducing the size of, or turbulence caused by, waves in the liquid passing through one or more of the openings 100, encouraging only the top layer(s) of liquid (e.g. oil, oily water) to pass through the openings 100, and/or maintaining a steady flow of liquid through the openings 100. In this embodiment, the exemplary carrier 146 is a flat plate 150. When included, the carrier 146 and float 144 may be constructed of metal, plastic or any other suitable material or combination thereof. In other embodiments, the wave dampener 140 may include multiple elongated floats 144 and/or carriers 146. For example, multiple independent sets of carriers 146 with floats 144 may be side-by-side across the width of the cargo compartment 60 (e.g. to move at least partially independently relative to one another). Further, the wave dampener 140 may instead be coupled to the vertical wall 90 or other component(s).

Referring back to FIGS. 1 & 2, the exemplary debris recovery system 58 may include a fluid removal system 158 configured to allow fluid to be selectively removed from each cargo compartment 60. In other words, fluid can be removed through the fluid removal system 158 from any one or more cargo compartment 60 at the same time, or in isolation relative to the other cargo compartments. Referring specifically to FIGS. 12 & 13, in the present embodiment, the fluid removal system 158 is particularly configured to allow the drainage of sea water 38 from the lower end 76 of any cargo compartment 60 and, at the same time, ultimately allow oil to at least partially fill that cargo compartment 60 from its upper end 74 through the opening(s) 100 in the forward-adjacent vertical wall 90. In fact, the illustrated system 58 allows each successive cargo compartment 60, starting at the rear end 44 of the vessel 10, to be at least substantially drained of sea water 38 and, concurrently, at least partially or substantially filled with oil 34.

The fluid removal system 158 may include any suitable components and operation. In the illustrated embodiment, as shown in FIG. 1, the system 158 includes a main suction conduit 160 extending at least partially through, and fluidly coupled to, each cargo compartment 60 and configured to remove liquid from each cargo compartment 60 as described above. The suction conduit 160 may have any suitable form, configuration, construction, location and operation. The exemplary suction conduit 160 extends lengthwise from the front cargo compartment 62 to aft of the rear cargo compartment 64, and delivers the drained liquid into the body of water 30 proximate to its aft end. However, any other desired configurations may be utilized. For example, the system 158 may include multiple main suctions conduits 160. For another example, the suction conduit(s) 160 may not extend lengthwise through all the cargo compartments 60 and/or may discharge liquid at one or more intermediate location on the vessel 10. For still a further example, the suction conduit(s) 160 may deliver the drained liquid to any other desired destination (e.g. into another one or more compartments and/or other container(s) on the vessel 10, or to another vessel, such as via one or more hose, etc.).

Figure 19:
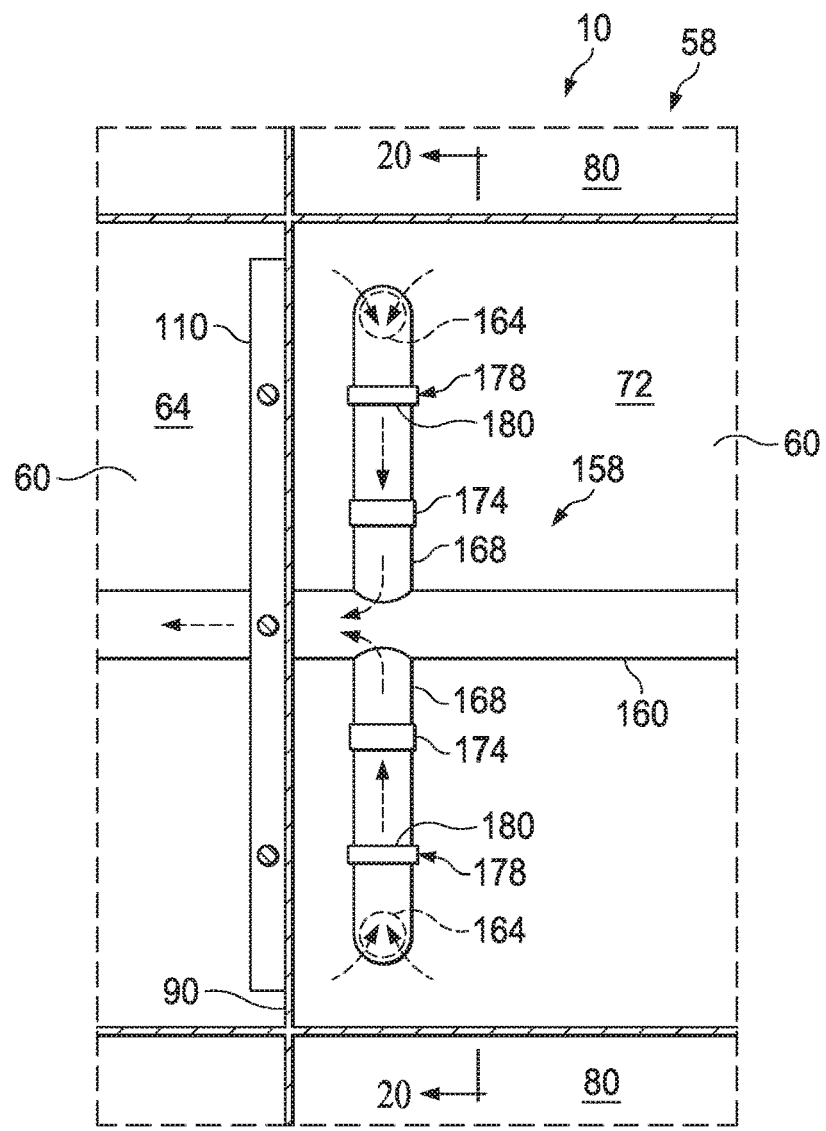
FIG. 19 is an exploded top view of part of the exemplary fluid removal system shown in FIG. 1.
Figure 20:
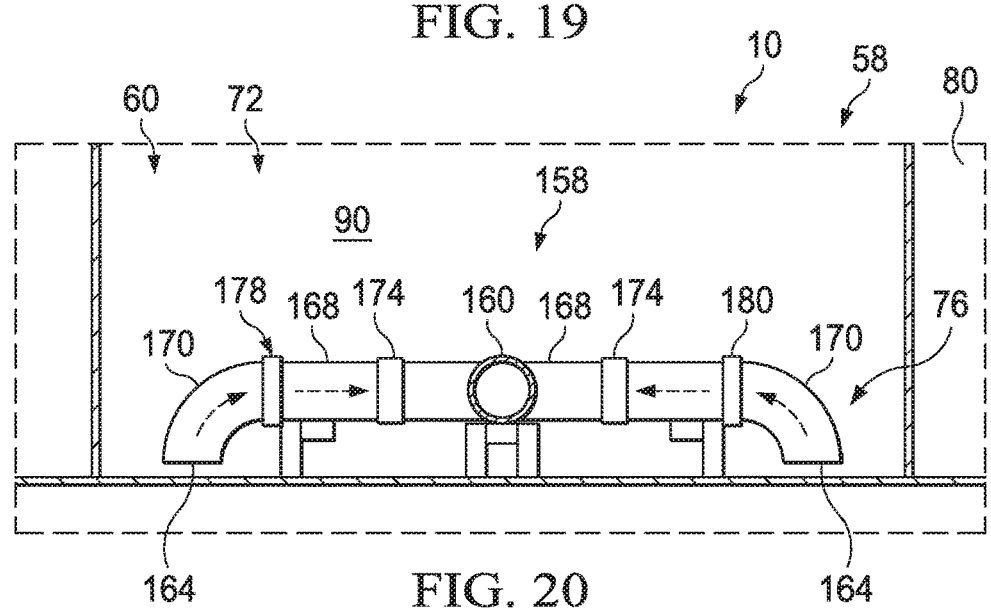
FIG. 20 is a front view of some of the exemplary fluid removal system components in FIG. 19 taken along lines 20-20.

Referring now to FIGS. 19 & 20, the exemplary suction conduit 160 is configured to draw liquid from each cargo compartment 60 at the lower end 76 thereof. For example, the illustrated suction conduit 160 can draw liquid through at least one distinct suction inlet 164 positioned within each respective cargo compartment 60 proximate to the lower end 76 thereof (See also e.g. FIG. 13). In this embodiment, the fluid removal system 158 includes two suction inlets 164 disposed within each cargo compartment 60. The exemplary suction inlets 164 are each provided in a respective inlet pipe section 168 fluidly coupled to and extending laterally from the suction conduit 160. The illustrated suction inlets 164 are positioned to optimally draw in liquid (e.g. sea water) from the bottom of the cargo compartment 60. For example, the inlets 164 may be positioned as close to the bottom (lower end 76) of the associated cargo compartment 60 as is possible or practical. In this embodiment, each suction inlet 164 is the open end of a downwardly facing elbow pipe 170 provided at the ends of the respective inlet pipe sections 168. However, this exemplary configuration is not limiting upon the present disclosure. Any other suitable arrangement may be used to remove fluid (e.g. sea water) from one or more cargo compartments 60.

The size, number and location of the suction inlets 164 may be determined based on any suitable criteria, such as to provide the desired liquid flow rate in the associated cargo compartment 60. For example, the velocity of the liquid (e.g. sea water) being removed from the cargo compartments 60 may be determined or limited to control or limit the turbulence and mixing of the liquid (e.g. oil, oily water) entering the successive compartments 60 through the associated openings 100 and promote the separation of oil and sea water in the cargo compartments 60.

Still referring to FIGS. 19 & 20, the fluid removal system 158 may be configured to fluidly isolate each cargo compartment 60 in any suitable manner. For example, at least one fluid valve 174 may be associated with each cargo compartment 60. In the present embodiment, in an open position, each such valve 174 will allow the flow of liquid from the associated cargo compartment 60 into the suction conduit(s) 160 at the location of that valve 174. In a closed position, each exemplary valve 174 will disallow liquid flow between the associated cargo compartment 60 and the suction conduit 160 at the location of that valve 174. Any suitable arrangement of valves 174 may be used for selectively allowing and disallowing liquid flow from each cargo compartment 60 into the fluid removal system 158. In this embodiment, a distinct selectively controllable valve 174 is provided between the suction conduit 160 and each suction inlet 164, such as in each inlet pipe section 168. Thus, to remove liquid from a particular cargo compartment 60, the exemplary valves 174 in that cargo compartment 60 are opened and the valves 174 in all other cargo compartments 60 are closed. In some embodiments, it may be possible to open one or more valves 174 in multiple cargo compartments 60 at the same time.

The valve(s) 174 may have any suitable form, configuration and operation. For example, the valves 174 may be the presently commercially available Class 123, iron body, gate-type valves having an outside screw and yoke with a rising stem by Crane Co. If desired, the valves 174 may be remotely actuated, such as via an electronic controller or computer-based control system, as is and becomes further known.

Still referring to FIGS. 19 & 20, if desired, the fluid removal system 158 may include one or more debris sensor 178 to determine when the debris being recovered from the body of water 30 is approaching or entering the fluid removal system 158. For example, the debris sensor(s) 178 may be mounted in the cargo compartment 60 or coupled to the fluid removal system 158. The debris sensor 178 may have any suitable form, configuration and operation. In this embodiment, the debris sensor 178 is an oily water sensor 180 disposed within each cargo compartment 60 proximate to each suction inlet 164 and configured to detect oil in the liquid entering the associated section inlet 164. For example, a distinct oily water sensor 180 may be fluidly coupled to each inlet pipe section 168 or the suction conduit 160. The illustrated oily water sensor 180 may, for example, be the presently commercially available Model EX-100P2/1000P2, in-line analyzer by Advanced Sensors. For another example, at least one oily water sensor may be mounted elsewhere in the cargo compartment 60. An example of a presently commercially available oily water sensor 180 that may be mounted elsewhere in the cargo compartment 60 is the Model EX-100M/1000M side stream analyzer by Advanced Sensors. If desired, the system 58 may be configured so that each sensor 178 may communicate with an electronic controller or computer-based control system, such as to provide control signals to the sensor 178 and/or for the sensor 178 to provide signals when the debris (e.g. oil) is detected in the sea water entering the associated suction inlet 164.

Referring back to FIG. 1, the fluid removal system 158 may deliver the fluid removed from the cargo compartments 60 to one or more desired destination in any suitable manner. In this embodiment, the suction conduit 160 discharges liquid from the cargo compartments 60 into the body of water 30 via at least one discharge opening 181 disposed aft of the rear cargo compartment 64. For example, the discharge opening 181 may be disposed on one or the other side 46, 48 of the vessel 10 and fluidly communicate with the suction conduit 160 via one or more discharge pipe sections 182. In the illustrated embodiment, at least one discharge pipe section 182 extends laterally from each side of the suction conduit 160 toward a distinct discharge opening 181 on the left or right side 46, 48 of the vessel 10, respectively.

If desired, the fluid removal system 158 may include one or more fluid discharge pumps 184 configured to assist in drawing fluid (e.g. sea water) from one or more cargo compartments 60 into the suction conduit 160 and discharge it from the debris recovery system 158. For example, the discharge pump(s) 184 may provide "active" removal of fluid from the cargo compartments 60, such as to expedite the debris recovery operation, eliminate the need to continuously move the vessel 10 through the debris field 36 during debris recovery operations, other desired purpose(s) or a combination thereof.

The discharge pump 184 may have any suitable form, configuration, location, operation and purpose. In this embodiment, a distinct discharge pump 184 is fluidly coupled to the discharge pipe section(s) 182 on each side of the suction conduit 160 and configured to create suction in the system 158 to draw liquid from one or more cargo compartments 60, through the suction conduit 160 and out the associated discharge opening 181. In other embodiments, one or more banks of multiple discharge pumps 184 (e.g. two banks of five or six pumps each, or more or less) may be provided, such as to enhance the ability to control fluid removal during debris recovery operations, provide greater flexibility in fluid removal, reduce the potential for negative consequences caused by pump failure during operations, one or more other purposes, or a combination thereof. The illustrated discharge pump 184 may be any suitable pump capable of providing sufficient suction on one of its sides to draw liquid from one or more cargo compartments 60 into the suction conduit 160 and discharge the fluid through the associated discharge opening(s) 181. For example, the discharge pump 184 may be a presently commercially available Model 3498 double suction pump by Goulds Pumps. However, some embodiments may not include any discharge pumps 184.

Still referring to FIG. 1, if desired, the fluid removal system 158 may include one or more fluid valves 188 to seal off the suction conduit 160 and/or or other components of the system 158. The valve(s) 188 may have any suitable form, configuration, location and operation and purpose. In the present embodiment, one or more valves 188 are provided proximate to each discharge opening 181 to seal off the aft end of the suction conduit 160 and related components from the body of water 30 when the system 158 is not in operation, during transit and/or after the cargo compartments 60 have been at least partially filled with oil and oily water. For example, a valve 188 is shown fluidly coupled to the discharge pipe section 182 between each discharge opening 181 and adjacent discharge pump 184. Any suitable type of fluid valve 188 may be used, such as the presently commercially available Class 123, iron body, gate-type valves having an outside screw and yoke with a rising stem by Crane Co. If desired, the valves 188 may be remotely actuated, such as via an electronic controller or computer-based control system, as is and becomes further known.

Still referring to the embodiment of FIG. 1, the debris recovery system 58 may include at least one at least partially floating, elongated, boom 190 disposed proximate to the front end 42 of the vessel 10. In some embodiments, the boom(s) 190 may be useful, for example, to encourage liquid to flow into the front cargo compartment 62 from the body of water 30 and, in particular, to ultimately effectively funnel, or corral, the top layer(s) of liquid, namely oil and oily water, for entry into the cargo compartment 62. Any desired number, type, configuration and construction of booms 190 may be included, and the boom(s) 190 may have any suitable location and operation. In the illustrated embodiment, the debris recovery system 58 includes first and second elongated booms 192, 194 configured to be movable between at least one stowed position and at least one deployed position. In the stowed position, the exemplary booms 192, 194 are positioned adjacent to the front end 42 of the vessel 10, such as shown in shadow in FIG. 1. In other embodiments, the boom(s) 190 in the stowed position may be positioned at least partially on the front end 42 of the vessel 10, such as atop the recessed front deck 56.

In at least one deployed position, the exemplary booms 190 extend angularly outwardly from the vessel 10 away from the front end 42, the first elongated boom 192 being closer to the left side 46 of the vessel 10 and the second elongated boom 194 being closer to the right side 48 of the vessel 10. In some embodiments, for example, the booms 192, 194 may extend out into the body of water at an approximate 45 degree angle relative to the longitudinal centerline of the vessel 10. In this embodiment, the deployed positions of the booms 190 are useful to form an overall funnel shape forward of the vessel 10 to allow or encourage liquid, particularly oil, to flow or funnel into the front cargo compartment 62 during debris recovery operations. If desired, one or more cables or other connectors may be coupled between each boom 190 and the vessel 10, such as to provide support for the boom 190 in the deployed position(s), maintain the position of the boom 190 in the deployed position, prevent the boom 190 from moving back towards the vessel 10 from the deployed position, other purpose(s) or a combination thereof. For example, multiple cables or other connectors may extend between the vessel 10 and each boom 190 at different locations along the length of the boom 190.

Figure 21:
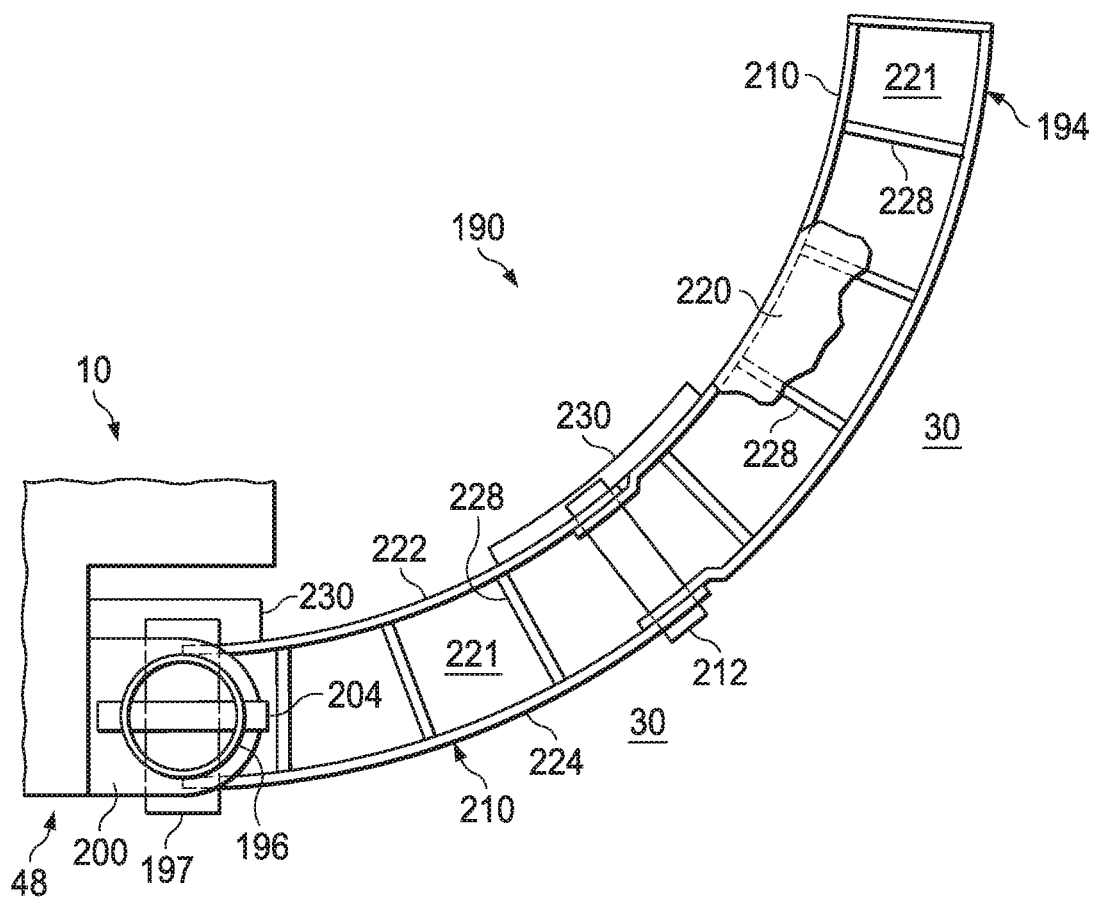
FIG. 21 is a top view of an exemplary elongated boom of FIG. 1 shown in a stowed position.
Figure 22:
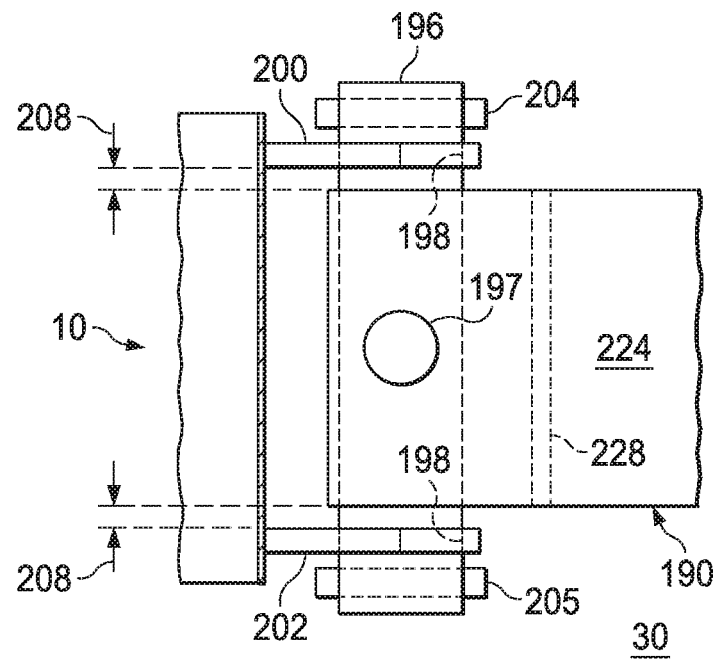
FIG. 22 is an exploded view of part of the exemplary elongated boom of FIG. 21.

The elongated boom(s) 190 may be movable between at least one stowed and at least one deployed position in any suitable manner. Referring to FIGS. 21 & 22, in this embodiment, each boom 190 is pivotably engaged with the vessel 10. For example, the boom 190 may be secured to a vertical pipe, or pin, 196, such as with one or more cross pin 197 extending transversely through the boom 190 and vertical pipe 196. The illustrated cross pin 197 allows the concurrent movement of the boom 190 and vertical pin 196. The exemplary vertical pin 196 is rotatable within holes 198 formed in at least one upper bracket 200 and at least one lower bracket 202 extending from, or coupled to, the vessel 10. The vertical pin 196 may be prevented from sliding out of the holes 198 in any suitable manner, such as with upper and lower locking pins 204, 206 extending transversely through the vertical pin 196 above and below the upper and lower brackets 200, 202, respectively. However, the present disclosure is not limited to this arrangement for moving the elongated boom(s) 190 between at least one stowed and at least one deployed position. For example, in some embodiments, one or more hydraulic or pneumatic actuators, cables, winches or other known components may be used to move booms 190 between stowed and deployed positions.

If desired, the boom 190 may be configured to be moveable into and secured in more than one distinct deployed position. This may be desirable, for example, to form a wider or narrow outer reach of multiple booms 190, or any other purpose. Any suitable mechanism(s) may be used to provide multiple distinct deployed positions of the boom(s) 190. For example, the vertical pin 196 may be engaged with a ratchet-like mechanism to secure the boom 190 in multiple deployed positions. If desired, the movement of the boom(s) 190 between at least one stowed and at least one deployed position may be automated and/or automatically controlled, such as with an electronic controller or computer-based control system, as is and becomes further known.

Still referring to FIGS. 21 & 22, each exemplary elongated boom 190 may be movable vertically relative to the vessel 10 during operations and/or include multiple articulating boom sections 210 to allow the boom 190 to follow or respond to the action of waves in body of water 30, reduce the potentially damaging forces places upon the boom 190 and/or connecting components (e.g. vertical pin 196, locking pins 204, 206, brackets 200, 202) during extreme or near extreme sea conditions, maintain a desired position of the boom 190 in the body of water 30, other purpose(s) or a combination thereof. These features may be useful, for example, to enhance the flexibility and capabilities of the vessel 10 and debris recovery system 58 to operate in typical deep sea conditions and not have to wait for the debris field to move close to shore.

Each boom 190 may be vertically moveable relative to the vessel 10 in any suitable manner. For example, the vertical pin 196 may be movable up and down relative to the upper and lower brackets 200, 202 within a desired range of motion. In this embodiment, the vertical pin 196 is movable up and down relative to the upper and lower brackets 200, 202 a desired distance 208. For example, if the distance 208 is 3 feet, the boom 190 and connected vertical pin 196 may move up to three 3 feet up and down relative to the brackets 200, 202 and vessel 10.

Still referring to FIGS. 21 & 22, each exemplary boom 190 includes multiple, interconnected, articulating boom sections 210 that are moveable relative to one another during debris recovery operations. While the illustrated embodiment includes two articulating boom sections 210, other embodiments may include three, four, five, size or more boom sections 210. The boom sections 210 being moveable relative to one another in any suitable manner. For example, the illustrated boom sections 210 are pivotably coupled together to allow each of them to move up and down relative to one other when the boom 190 is in one or more deployed positions. In this embodiment, adjacent boom sections 110 are connected with at least one hinge pin 212 extending transversely between them and allowing their relative up and down movement. In other embodiments, the boom sections 210 may be also or instead moveable side to side relative to one another.

Still referring to the embodiment of FIGS. 21 & 22, each elongated boom 190 may have an overall curved, straight or varied-shaped outer profile. The exemplary boom 190 is formed in a hollow box-beam configuration with one or more top plate 220, bottom plate 221, inner side plate 222, outer side plate 224 and end cap plate 226. If desired, one or more stiffener plates 228 may be provided within the boom 190, such as to add stiffness and structural support to the boom 190. The exemplary stiffener plates 228 are shown extending between the side plates 222, 224, but could also or instead be provided between the top and bottom plates 221 or oriented in a different configuration. The exemplary plates 220, 221, 222 and 224 and stiffener plates 228 are constructed of any suitable material, such as steel. However, the boom 190 may have any other suitable construction.

If desired, one or more flexible, fluidly impermeable cover 230 may be coupled to the boom 190 over the cross pin 197 and/or hinge pin(s) 212. This may be useful in some embodiments, for example, to prevent liquid, and particularly oil, from escaping from inside the funnel area caused by the boom(s) 190 through the boom 190 at the location of the cross pin 197 and hinge pin(s) 212. The flexible cover 230 may have any suitable form, configuration, construction and operation. For example, the flexible covers 230 may be flaps, sheets or other arrangements of heavy, flexible neoprene rubber. In this embodiment, each flexible cover 230 is coupled to the boom 190 only on one side of the respective cross pin 197 or hinge pin 212 to allow the remainder of the cover 230 to slide relative to the boom 190 during shifting or movement of the boom 190 or articulating section(s) 210 during operations. For example, the cover 230 disposed over the cross pin 197 may be coupled to the boom 190 forward of the cross pin 197, and the cover 230 disposed over each hinge pin 212 may be coupled to the adjacent boom section 210 forward of the hinge pin 212. In other embodiments, the cover 230 may instead be coupled to the boom 190 or other component on both respective sides of the cross pin 197 and/or hinge pins 212. For example, the cover 230 may have a pleated, or accordion-like, configuration and be coupled to both sides of the boom 190 or boom sections 210 so that it gives, or bends along with the boom 190 and/or boom sections 210.

Referring back to FIGS. 1 & 3, in some embodiments, the vessel 10 may be arranged and ballasted so that its front end 42 and the boom(s) 190 are at least partially submerged in sea water during debris recovery operations. In some circumstances, this may be beneficial to provide the desired rate and/or flow of liquid into the cargo compartments 60, encourage the top layer of liquid (e.g. oil) to enter the cargo compartments 60 from the body of water 30 other purpose(s) or a combination thereof. In the present embodiment, the vessel 10 may be configured so that when the vessel 10 is submerged to its load line, the recessed front deck 56 is at least partially submerged and the booms 192, 194 and openings 100 in the front vertical wall 92 are partially submerged so that the top layer(s) on the surface 32 of the body of water 30 can wash across the recessed front deck 56 and flow directly into those openings 100. For example, the vessel 10 may be arranged and ballasted so that the booms 190 and the openings 100 in the front vertical wall 92 are submerged up to approximately ½ their respective heights. Thus, if the booms 190 and the openings 100 in the front vertical wall 92 each have a height of 6 feet, for example, the vessel 10 may be positioned in the body of water so the boom 190 and openings 100 are each submerged 3 feet. However, any other desired arrangement may be used.

An exemplary method of removing debris from a body of water 30 in accordance with an embodiment of the present disclosure will now be described. Referring initially to the embodiment of FIGS. 1 & 2, the cargo compartments 60 of the debris recovery vessel 10 are initially at least substantially filled with water in any suitable manner. If desired, the cargo compartments 60 may be flooded with sea water 38 before the vessel reaches the oil spill area 36. For example, all the gates 110 could be moved into a fully open position to allow the cargo compartments 60 to free-flood with sea water 38. Also if desired, the free-flooding of the cargo compartments 60 could be performed during the forward movement of the vessel 10 in the direction of arrow 16 (FIG. 2), such as to flood, or assist in expediting flooding of, the compartments 60. Preferably, the illustrated valves 174 are closed during free-flooding of the cargo compartments 60. However, it may be possible to temporarily open the valves 174 and even turn on one or more discharge pump 184 to fill the compartments 60 with sea water. The vessel 10 may be arranged and ballasted so that flooding the cargo compartments 60 will submerge the vessel 10 to the desired load line, such as described above.

After the exemplary cargo compartments 60 are at least substantially filled with water, the vessel 10 is moved to the oil spill area 36. Preferably at that time, each illustrated boom 190 is moved to a deployed position, such as described above. However, the boom(s) 190 may be moved into a deployed position at an earlier or later time. Once at the oil spill area 36, while all of the exemplary gates 110 are in an open position, sea water is removed from the rear cargo compartment 64. For example, one or more of the valves 188 are opened and all of the valves 174, except those in the rear cargo compartment 64, are closed. The exemplary valves 174 in the rear cargo compartment 64 are opened to remove sea water from the lower end 76 of the rear cargo compartment 64 into the suction conduit 160 and out one or more discharge opening 181 in the path of arrows 240 (FIG. 2). If desired, one or more discharge pump 184 may be turned on, such as to provide active suction and pumping of the sea water.

Still referring to the embodiment of FIG. 2, as sea water is removed from the lower end 76 of the rear cargo compartment 64, liquid is simultaneously drawn into or enters the front cargo compartment 62 through the openings 100 in the front vertical wall 92. Although it is impossible to forecast the actual makeup of the liquid entering those openings 100 at any specific point in time, the exemplary debris recovery system 58 is configured so that primarily the liquid on and near the surface 32 of the body of water 30 (e.g. oil and some oily water) enter the front cargo compartment 62, as shown by flow arrow 242 in FIGS. 2 & 11.

In accordance with this embodiment, since the intermediate cargo compartments 66, 68, 70 and 72 are substantially full of sea water, as the lower end 76 of the rear cargo compartment 64 is being emptied of sea water, the upper layers of liquid (e.g. oil and some oily water) entering the front cargo compartment 62 are preferably drawn across the surface of the sea water in the intermediate cargo compartments 66, 68, 70 and 72 through the openings 100 in each successive vertical wall 90 and ultimately into the rear cargo compartment 64, such as shown with flow arrows 244 in FIG. 12. If one or more exemplary wave dampeners 140 (e.g. FIGS. 11 & 13) are included in one or more of the cargo compartments 60, the wave dampener(s) 140 may assist in encouraging primarily oil and some oily water to enter the front and subsequent cargo compartments 62, 66, 68, 72 and 64 through the successive openings 100, reduce wave action and turbulence of liquid entering each compartment 60, help maintain a steady flow of liquid through the openings 100 other desired purpose(s) or a combination thereof. In this embodiment, as sea water continues to be drawn down through the rear cargo compartment 64, it is expected that at least some of the oil in the oily water therein will separate and float on top of the sea water, further separating the oil from the sea water therein.

Referring now to the embodiment of FIGS. 12 & 14, when substantially all of the sea water in the exemplary rear cargo compartment 64 is removed, that compartment 64 is fluidly isolated as desired. For example, the compartment 64 may be fluidly isolated from the fluid removal system 158 and the other compartments 60, such as by closing the valves 174 in the cargo compartment 64 and the gate(s) 110 associated with the openings 100 that lead into that compartment 64. In some embodiments, the cargo compartment 64 may be fluidly isolated when it is substantially full of oil. For example, this may occur when one or more debris sensors 178, such as the oily water sensors 180 (e.g. FIG. 20), indicate the presence of some or a particular amount of oil in the exiting sea water.

In this embodiment, to continue the debris recovery operations, the above process as performed with respect to the rear cargo compartment 64 is repeated for each successive aft-most cargo compartment 60. For example, referring to FIG. 14, the valve(s) 174 in the next cargo compartment 72 are opened to allow sea water to be removed from the lower end 76 of that compartment 72 in the path of arrows 240. Substantially simultaneously, principally oil and some oily water preferably enters into the upper end 74 of, and fills, that cargo compartment 72, such as shown with flow arrows 244. In this embodiment, when substantially all sea water in that cargo compartment 72 is removed (e.g. FIG. 15), that compartment 72 is fluidly isolated. For example, the compartment 72 may be fluidly isolated at least from the remaining forward cargo compartments 60 which still contain sea water, or fluidly isolated similarly as described above with respect to cargo compartment 64. For example, the valves 174 in that cargo compartment 72 and the gate(s) 110 associated with the openings 100 that lead into that compartment 72 may be closed.

Figure 15:
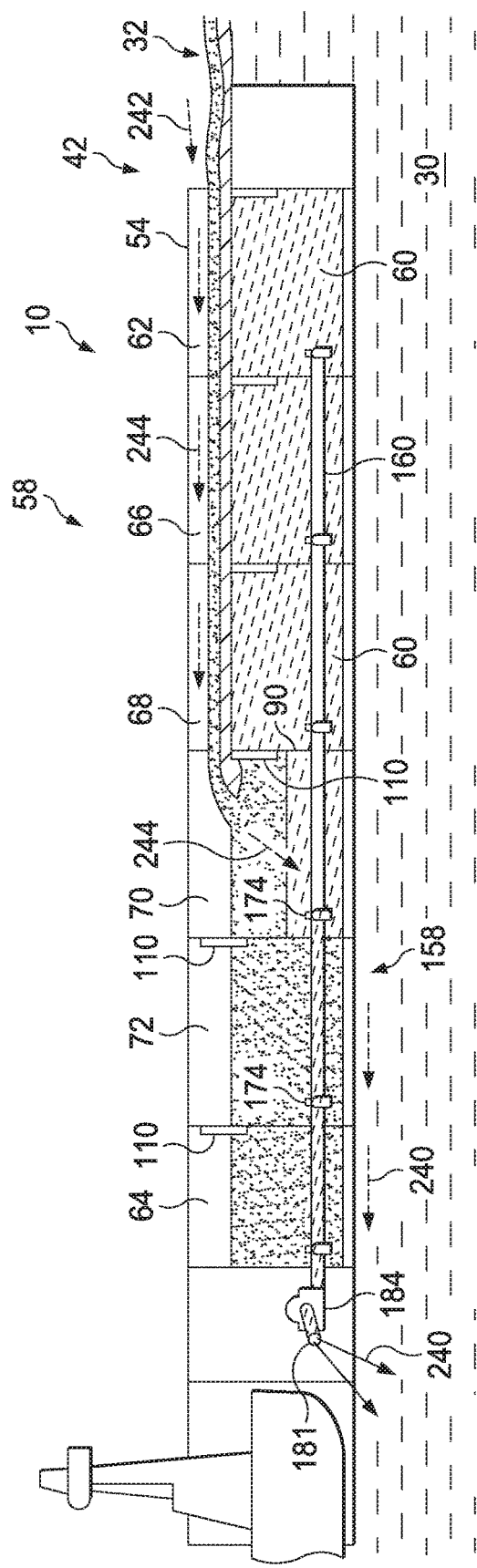
FIG. 15 is a side view of the exemplary vessel of FIG. 1 with the side shell removed to show exemplary interior cargo compartments and other components during exemplary debris recovery operations in accordance with an embodiment of the present disclosure.
Figure 16:
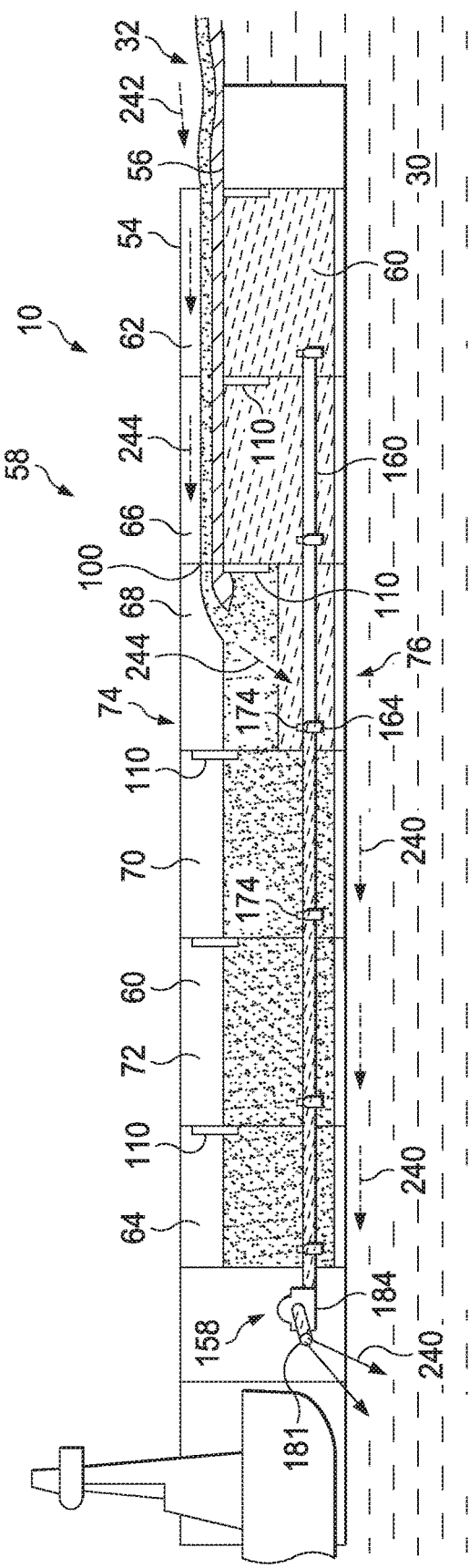
FIG. 16 is a side view of the exemplary vessel of FIG. 1 with the side shell removed to show exemplary interior cargo compartments and other components during exemplary debris recovery operations in accordance with an embodiment of the present disclosure.
Figure 17:
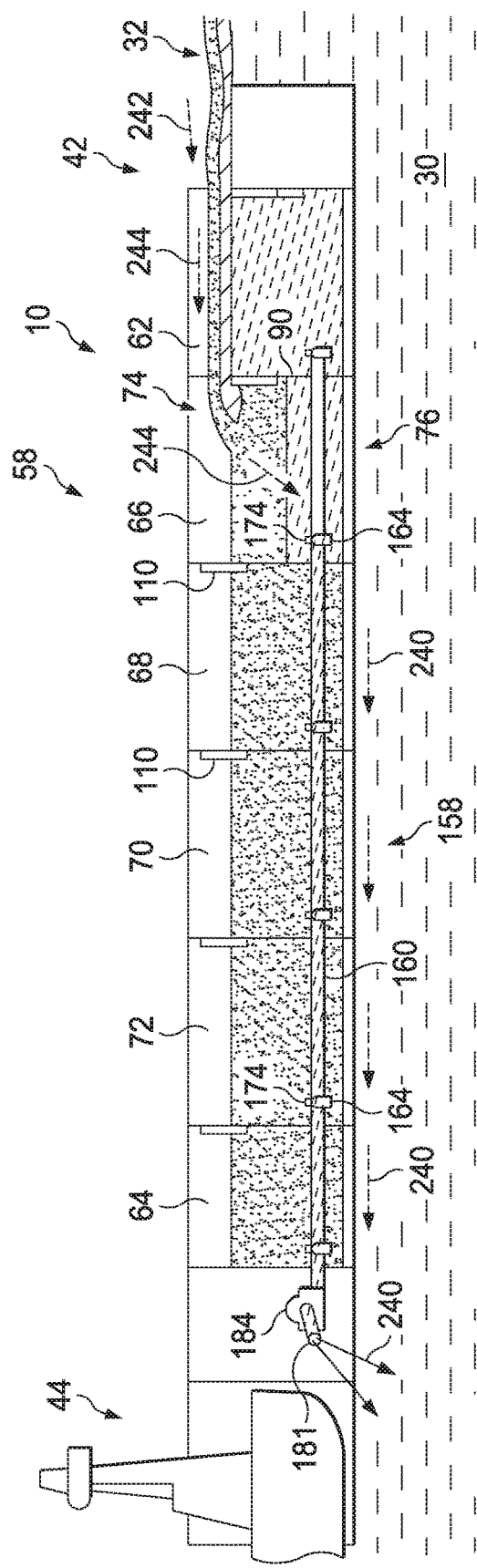
FIG. 17 is a side view of the exemplary vessel of FIG. 1 with the side shell removed to show exemplary interior cargo compartments and other components during exemplary debris recovery operations in accordance with an embodiment of the present disclosure.

If desired, the above exemplary process may then be repeated for cargo compartment 70 (e.g. FIGS. 15 & 16) by opening the valves 174 therein to allow sea water to be removed from the lower end 76 of that compartment 70 in the path of arrows 240. In this embodiment, substantially simultaneously, principally oil and some oily water preferably enters into the upper end 74 of, and fills, that cargo compartment 70, such as shown with flow arrows 244 (FIG. 15). When substantially all sea water in that cargo compartment 70 is removed (FIG. 16), it may be fluidly isolated, such as described above.

Figure 18:
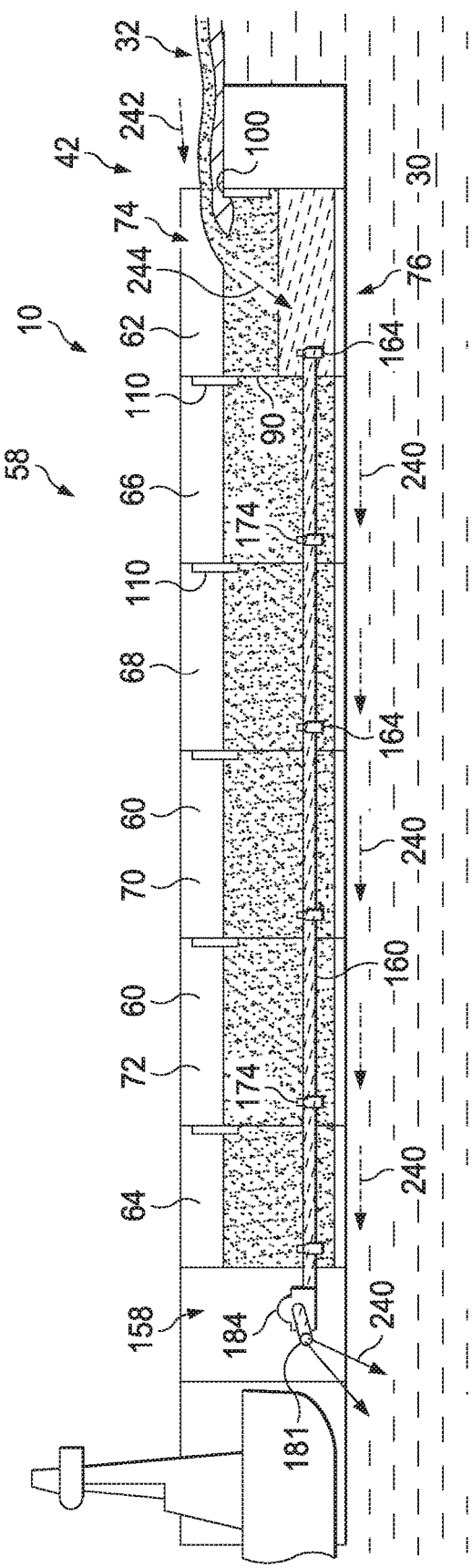
FIG. 18 is a side view of the exemplary vessel of FIG. 1 with the side shell removed to show exemplary interior cargo compartments and other components during exemplary debris recovery operations in accordance with an embodiment of the present disclosure.

In this embodiment, the above process may then be repeated for cargo compartment 68 (e.g. FIGS. 16 & 17), then cargo compartment 66 (e.g. FIGS. 17 & 18) and finally cargo compartment 62 (e.g. FIG. 18). If desired, one or more cargo compartment 60 may be skipped in the process by fluidly isolating that compartment 60 (and the other more rearward cargo compartments 60), such as described above. When substantially all sea water in the illustrated front cargo compartment 62 is removed, it is fluidly isolated, such as described above. It should be noted that the above process can be used with embodiments having any number (e.g. 2, 3, 4 etc.), form and configuration of cargo compartments 60. Thus, the methods of debris recovery of present disclosure are not limited by the number, form and configuration of compartments 60.

In accordance with many embodiments, oil 34 is separated from sea water 38 and collected as it moves across the vessel 10 and as sea water 38 is discharged from the vessel 10. In many embodiments, large amounts of floating contaminants or debris (e.g. oil) may be relatively quickly collected and removed from practically any body of water 30.

Referring back to the embodiment of FIG. 1, as the cargo compartments 60 are being emptied of sea water and at least partially filled with oil, liquid may be added to or removed from one or more of the other compartments 80, 84, 86, 88 in the vessel 10, such as to maintain the desired height of the vessel 10 in the body of water 30 (e.g. at the desired load line or other position). For example, sea water may be added to and removed from one or more of the side ballast tanks 80 on either, or both sides, of the vessel 10 as needed throughout the above debris recovery operations to maintain or refine the height of the vessel 10 in the body of water 30.

If desired, the vessel 10 may be moved in a forward direction (e.g. arrow 16, FIG. 2) through the oil spill area 36 at any desired speed, or at varying speeds, throughout, or at certain times, during the debris recovery operations. This may be desirable, for example, for strategic positioning of the front end 42 of the vessel 10 relative to the debris field or oil spill area 36 (e.g. like moving a vacuum cleaner over a dirty rug) as the discharge pump(s) 184 actively move liquid through the fluid removal system 158 as described above, to urge or assist in directing preferably oil and some oily water into the front cargo compartment 62 and through the other compartments 60, thus enhancing the active flow action caused by the discharge pump(s) 184, to cause the passive flow of liquid through the fluid removal system 158 when the discharge pumps 184 are not used, other purpose(s) or a combination thereof. In the present embodiment, for example, the vessel 10 may be eased through the oil spill area 36 in the forward direction at a steady, slow speed during debris recovery operations. However, forward movement of the vessel 10 is not necessary in all embodiments.

Also during the debris recovery operations, if desired, the position of one or more of the exemplary open gates 110 may be varied as needed to affect or control the flow of liquid into the cargo compartments 60. For example, one or more of the gates 110 may be moved into one or another partially open position, such as to provide the optimal flow rate and/or liquid content (e.g. primarily oil) of the flowing liquid. If desired, the height of any of the open gates 110 relative to their associated openings 100 may be dynamically adjusted during debris recovery operations, such as via an electronic controller or computer-based control system. One or more variables, such as the weight, density and viscosity of the oil and/or other debris, substances or material in the sea water, may affect and be considered in varying the position of one or more gates 110 to achieve a desired flow rate and/or content of the liquid passing through the openings 100.

When debris recovery operations are completed, the exemplary fluid removal system 158 and all the cargo compartments 60 may be fluidly isolated from the body of water 30. For example, all the gates 110 and all valves 174, 188 may be closed and the discharge pumps 184 turned off. If desired, all the gates 110 and/or cargo compartments 60 may be substantially sealed. In some embodiments, all the gates 110 and/or cargo compartments 60 may be completely (100%) sealed. The exemplary elongated boom(s) 190 may be moved to a stowed position and the vessel 10 transported to a desired location for offloading the contents (preferably primarily oil) in the cargo compartments 60. If desired, one or more other compartments on the vessel, such as the ballast tanks 80, may be emptied, such as to raise the height of the vessel 10 in the body of water 30 as it leaves the oil spill area 36. This may be desirable, for example, to minimize further oil contamination of the exterior surface of the side shell of the vessel 10 and/or allow cleaning/removal of any oil adhered thereto.

The contents of the cargo compartments 60 may be offloaded in any suitable manner. For example, the contents of the cargo compartments 60 may be offloaded to containers on one or more other vessel or onshore. In some embodiments, the oil and oily water may be offloaded through the openings 100 or other openings (not shown) in the cargo compartments 60, such as via one or more hose or other component. In other embodiments, the oil and oily water may be offloaded through the fluid removal system 158. If desired, the tug 14 used with a first vessel 10 as described above may be used to take a second similar vessel 10 to the oil spill area 36 to recover debris while the first vessel 10 is being offloaded.

Referring now to the embodiments of FIGS. 23-40, the illustrated vessel 10 (e.g. barge 12) includes a debris recovery system 58 utilizing a single cargo compartment 60 (e.g. front cargo compartment 62). It should be noted that all of the details and description provided above and/or shown in, or as may be apparent from, FIGS. 1-22 are hereby incorporated by reference herein in their entireties with respect to this embodiment of the vessel 10 and system 58 and FIGS. 23-40, except and only to the extent as may be described differently or evident from the description herein and/or the appended figures. As shown in FIG. 24, one opening 100 (e.g. intake opening 102) is provided in or proximate to the illustrated front bulkhead 92 to allow water and debris to enter the exemplary cargo compartment 60 from the body of water 30. The illustrated opening 102 is shown extending upwardly from the recessed front deck 56 with no upper boundary and generally across the width of the cargo compartment 60. Thus, the upper end 74 of the exemplary cargo compartment 60 at the front end 42 of the vessel 10 is essentially open to allow debris 40, 41 and probably some water 38 to wash, or flow, from the body of water 30 across or over the recessed front deck 56 and into the cargo compartment 60. However, the debris recovery system 58 may instead include more than one cargo compartment 60 and/or opening 102, and the opening(s) 102 may have any other desired configuration and location(s).

To illustrate that the exemplary debris recovery system 58 may be configured to recover a wide (potentially unlimited) variety and size of debris, the debris shown being recovered includes both small-sized debris 40 (e.g. oil 34, other chemicals, particulate pollutants, small biological materials (e.g. algae bloom), small plastic material (e.g. micro plastics), other small trash particles, etc.) and large-sized debris 41 (e.g. cups, bottles, other garbage, driftwood, large biological materials (e.g. deceased marine life, algae bloom)). Thus, the debris recovery system 58 is not limited by type of debris or contaminants being collected, except as may be explicitly provided or recited herein or in any particular claims and only for such claim and claims depending therefrom.

Figure 23:
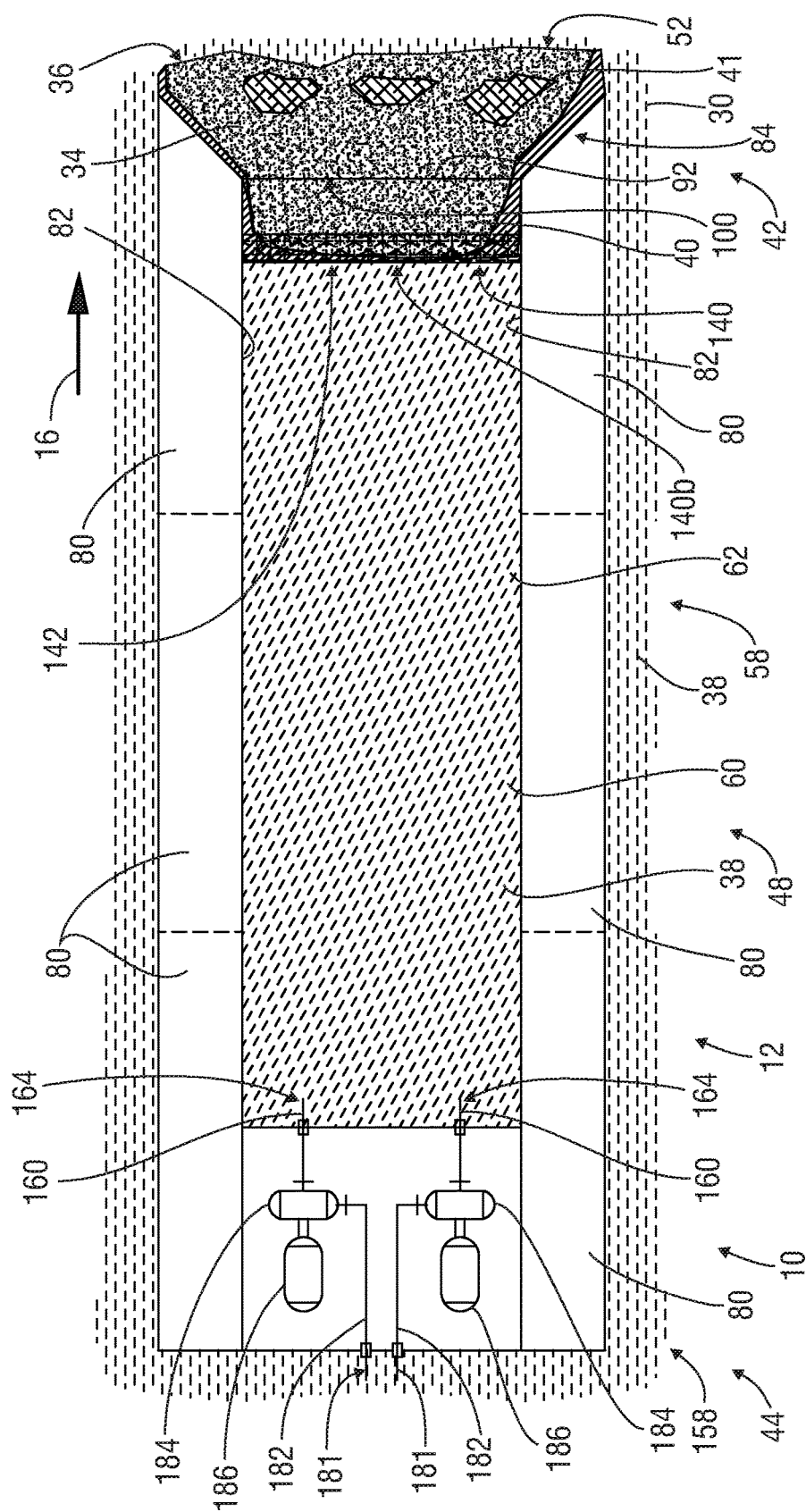
FIG. 23 is a plan view of an exemplary waterborne vessel with the decks removed to show parts of an exemplary debris recovery system having an exemplary pivoting-type inflow regulator in accordance with at least one embodiment of the present disclosure.

As shown in FIGS. 23 & 25, the exemplary debris recovery system 58 includes a fluid removal system 158 configured to allow the drainage of sea water 38 from the cargo compartment 60 (e.g. at its lower end 76) and, at the same time, draw in debris (and often some water) to at least partially fill the cargo compartment 60, such as previously described herein. In this embodiment, the fluid removal system 158 is shown including two sets of suction conduits 160 drawing water from the same (e.g. single) cargo compartment 60, along with associated discharge pumps 184 (having associated motors 186), discharge pipe sections 182, discharge openings 181, valves and other components such previously described herein. During use of the exemplary debris recovery system 58, at least one of the discharge pumps 184 will create suction in the associated suction conduit(s) 160 to concurrently (i) draw debris (and probably some water) from the body of water 30, through the intake opening 102, over the inflow regulator 140 and into the cargo compartment 60 and (ii) draw water 38 from the cargo compartment 60 into the associated suction conduit(s) 160. In effect, the suction created by the exemplary discharge pump(s) 184 will at least slightly lower the liquid level rearward of the IFR 140 relative to the liquid level forward of the IFR 140 causing the liquid forward of the IFR 140 to move rearward, typically increasing the volume and cascading movement (rushing) of small-sized debris over the front edge 142 of the IFR 140 and utilizing any cohesive properties (intermolecular attractive forces) of the debris (e.g. oil) to rapidly draw in all or virtually all of the debris in the debris field.

In many debris recovery scenarios, substantial pumping capacity may be necessary (e.g. to offset the influence of wave action, choppy surface conditions, substantial water intake due to forward travel speed, to optimize debris collection and/or intake resistance, etc.).

Referring to FIGS. 23-25, the illustrated debris recovery system 58 includes a single at least partially buoyant inflow regulator 140 configured to be positionable to at least substantially (i) regulate, or limit, the inflow of debris (and typically some water) into the cargo compartment 60 from the body of water 30 to that debris (and maybe some water) which is disposed at or near the surface 32 of the body of water 30 and which passes through the intake opening 102 over the IFR 140 during use of the debris recovery system 58, (ii) dampen or reduce the size of, or turbulence caused by, waves in the liquid passing through the opening(s) 100, (iii) maintain a steady flow of debris/water through the opening(s) 100, (iv) take advantage of the cohesive properties (intermolecular attractive forces) of the debris (e.g. oil) to rapidly draw in all or virtually all of the debris in the debris field, (v) other desired purpose(s) or (vi) a combination thereof. It should be noted that, in other embodiments, more than one IFR 140 may be used (e.g. side-by-side and/or one forward of another or any other configuration). The exemplary IFR 140 will typically at least substantially regulate, or limit, inflow into the cargo compartment 60 to debris (and water) that passes over the IFR 140 and disposed at or near (or comes from) the surface 32 of the body of water 30 by providing resistance to the water/debris passing through the opening 100, constraining the amount of water/debris able to pass into the compartment 60 to the top layer(s) (e.g. the least dense or most buoyant liquid/debris) moving through the opening 102. This is sometimes referred to herein and in the appended claims as the "intake resistance", "ability to constrain the inflow of fluid/debris into the cargo compartment(s) 60" and variations thereof.

In many embodiments, the (e.g. ideal) intake resistance and/or suction of the discharge pump(s) 184 will cause debris (e.g. oil) to rush or cascade over the front edge 142 of the exemplary IFR 140 and into the cargo compartment 60. In the case of oil and any other debris with similar relevant properties, the IFR 140 may use the cohesive property (intermolecular attractive forces) of the debris and/or overcome the adhesion of water and debris to facilitate or encourage the inflow (and even increased velocity) of mostly, or all, debris and little water. For example, the exemplary IFR 140 may be configured and used to act similarly as holding a ladle or spoon on the surface of soup having a layer of oil or grease on top and applying downward pressure sufficient to cause or allow (up to the entire volume of) oil or grease to rush or cascade into the ladle or spoon (referred to sometimes herein as the "ladle effect"). As the small-sized debris is drawn into the exemplary vessel 10, due to the cohesive property of the debris (e.g. oil), the debris passing over the IFR 140 will effectively pull the surrounding debris across the surface 32 of the body of water 30 into the vessel 10 (potentially pulling the entire body of debris into the vessel 10). When the debris is thin, even as thin as just a sheen, the exemplary IFR 140 may be positioned to cause a very thin layer to pass over the top edge 142 thereof, increasing the volume and cascading movement (rushing, ladle effect) of the debris as it falls over the front edge 142 of the IFR 140 (e.g. due to the cohesive nature of the small-sized debris and the condition caused by the suction of the discharge pump(s) 184 of at least slightly lowering the water level rearward of the IFR(s) 140 below the water level forward of the IFR(s) 140), which may accelerate the recovery of the small-sized debris and the amount of debris recovered. In fact, the use of the exemplary debris recovery system 58 may result in recovery of substantially all the small-sized debris on or near the surface of the body of water in the subject debris field(s).

With regard to various embodiments of the present disclosure and appended claims, there may be configurations, applications or periods of use of the system 58 during which only debris (and no water) are collected or drawn into the cargo compartment 60. Thus, any mention herein and in the claims of both debris and water being collected or drawn into the cargo compartment(s) 60 is meant to include and includes use of the exemplary system 58 to draw in only debris, only water or any combination thereof, unless expressly provided otherwise.

In many embodiments, the debris recovery system 58 will not at least substantially mix or emulsify the incoming debris and water (e.g. due to the intake resistance and/or wave dampening effect caused by the IFR 140, utilizing one or more controllable variables, such as discussed below), allowing the debris to float across the water in the cargo compartment 60. Often, the exemplary cargo compartment 60 will contain a defined layer of debris on top of the water, and may include an intermediate layer of mixed debris and water (e.g. FIG. 25). These consequences of various embodiments of the present disclosure will make on-board separation of debris and water easy, achievable and not overly onerous or time-consuming, allow substantial volumes of water to be discharged from the cargo compartment 60 and thus free up more on-board space for debris, allow the collection of a higher ratio of oil to water, other benefits, or a combination thereof.

Depending on the particular type and conditions of use of the debris recovery system 58, the position (and movement) of each IFR 140 (e.g. relative to the surface 172 of the water/debris in the cargo compartment 60 or other part of the vessel 10 (e.g. IFR chamber 320, FIG. 41)) and its intake resistance, the rate of inflow/volume of debris (and some water) and the debris/water ratio entering the cargo compartment 60 or other part of the vessel 10 (e.g. IFR chamber 320, FIG. 41) may be regulated and varied as desired by selectively controlling one or more "controllable" variables. Some potential examples of controllable variables are the direction and speed of movement of the vessel 10, buoyancy of the exemplary IFR 140, use of one or more IFR variable buoyancy mechanisms (such as described below), activity such as the amount of suction within the cargo compartment 60 or other part of the vessel (e.g. varying suction with the use of one or more variable speed discharge pumps 184 and/or multiple discharge pumps 184, manipulating one or more of valves (e.g. valves 174, 188) in the fluid removal system 158), off-loading of debris from the vessel 10 (e.g. through one or more debris pumps 380, FIGS. 41-47) or a combination thereof. Depending upon the particular embodiment of the debris recovery system 58 and conditions of use, any one or more of the controllable variables may be evaluated and/or varied as desired (e.g. in real-time, on an ongoing basis).

One or more "non-controllable" variables can also influence the position (and movement) of each IFR 140 (e.g. relative to the surface 172 of the water/debris in the cargo compartment 60 or other part of the vessel 10 (e.g. IFR chamber 320, FIG. 41)) and its intake resistance, the rate of inflow/volume of debris (and some water) and debris/water ratio entering the cargo compartment 60 or other part of the vessel 10 (e.g. IFR chamber 320, FIG. 41)) and can be factored in (e.g. in real-time, on an ongoing basis when deciding on the manipulation or use of one or more controllable variable). Some potential examples of non-controllable variables include environmental factors (e.g. wind, rain, wave action, sea conditions, etc.), the type or nature (e.g. density, viscosity) of liquid in the cargo compartment 60 and body of water 30 (e.g. fresh verses salt water) and the thickness, composition and depth of the debris in the body of water 30, as well as the size or varying sizes of debris, at the collection site, all of which may be changing on an ongoing basis during operations.

As mentioned above, the IFR 140 may have any suitable form, configuration, components and operation and some examples of IFR(s) 140 are a "pivoting"-type IFR (e.g. FIGS. 23-34, 40-46) and a "sliding"-type IFR (e.g. FIGS. 35-39). Still referring to FIGS. 23-25, in this embodiment (as well as other embodiments), the IFR 140 is an at least partially buoyant, pivoting-type IFR 140, extends into the cargo compartment 60 across the width of the cargo compartment 60 and is pivotable relative to the vessel 10. For example, the pivoting-type IFR 140 may be pivotably coupled to the vessel 10 proximate to the front end 42 thereof. Referring specifically to FIG. 26, the illustrated pivoting-type IFR 140, at or near its rear end 140a, is pivotably coupled to the bulkhead 92, front recessed deck 56 or other portion(s) or component(s) of the vessel 10. The exemplary pivoting-type IFR 140 is thus pivotable relative to the surface 172 of liquid in the cargo compartment 60 as indicated with arrows 78. In this embodiment (as well as other embodiments (e.g. FIGS. 27-34, 40-46)), the debris recovery system 58 is designed so that the rear end 140a of the pivoting-type IFR 140 will be below the surface 32 of the body of water 30 and the surface of debris/water entering the cargo compartment 60 during debris recovery. It should be noted, however, that the pivoting-type IFR 140 may be positioned so that its rear end 140a is not below the surface 32 of the body of water 30 and/or the surface of debris/water entering the cargo compartment 60, and may be coupled to the vessel 10 in any other desired manner (e.g. not across the entire width of the cargo compartment 60 or other part of the vessel 10) and location.

Still referring to FIG. 26, the front end 140b of the illustrated pivoting-type IFR 140 is free-moving up and down (e.g. in the cargo compartment 60, arrows 78). (See also FIGS. 35-39). (In various figures (e.g. FIG. 25, 30, 35, 38) the illustrated pivoting-type IFR 140 is shown in multiple potential positions.) Further, the exemplary pivoting-type IFR 140 is sufficiently buoyant so that its front end 140b will float at or near the surface 172 of water/debris contained in the cargo compartment 60 during use of the debris recovery system 58. (See also FIGS. 35-39, 41-46).

Referring now to FIGS. 27 & 28, the pivoting-type IFR 140 may have any suitable form, configuration, components, construction and operation. In this embodiment, the carrier 146 of the IFR 140 is a flat, rigid plate 150 and the float 144 is a buoyancy chamber 152 coupled to the plate 150, such as by welding, connectors (e.g. bolts), etc., proximate to the front end 140b of the IFR 140 to provide the desired buoyancy of the IFR 140. The plate 150 and buoyancy chamber 152 may be constructed of metal (e.g. aluminum, steel), wood, plastic, any other suitable material or combination thereof. If desired, the carrier 146 may include multiple plates 150, one or more support or frame members (e.g. to provide desired rigidity, sturdiness, durability, etc.), or may be semi-rigid, flexible or pliable, perforated, non-flat, convex or concave or have any other form, configuration and components. If desired, the IFR 140 may include multiple side-by-side adjacent sections (e.g. two or more sets of carriers 146 and corresponding floats 144), such as to accommodate or provide flexibility in response to side-by-side rocking or rolling of the vessel 10.

In some embodiments, the pivoting-type IFR 140 may not include any separate floats 144 or buoyancy chambers 152. Any other suitable component(s) may be included to provide the desired buoyancy of the IFR 140. For example, the carrier 146 may include one or more buoyancy sections, cavities or chambers, and may be at least partially inflatable. For another example, the IFR 140 (e.g. carrier 146) may include foam or other material with floatation properties to provide the desired buoyancy or uplift of the front end 140b or other portion thereof. For yet another example, the IFR 140 may be, or include, one or more bladder bags coupled to the vessel 10 proximate to the front end 42 thereof and configured to provide the desired intake resistance. If desired, the bladder bag(s) may be fixed buoyancy or variable buoyancy (e.g. similarly as described below).

Still referring to FIGS. 27 & 28, the exemplary carrier 146 includes one or more seal members 155 or other components to provide or encourage at least substantial sealing engagement of the pivoting-type IFR 140 with the cargo compartment 60 during use of the debris recovery system 58. The seal members 155 may have any suitable form, configuration, components and operation. For example, the seal members 155 may include one or more elongated gaskets 156 coupled to the carrier 146 (e.g. with connectors (e.g. bolts), epoxy or other glue, opposing mating portions, by friction fit, or a combination thereof) extending along the side edges 146a, 146b of the carrier 146 to sealingly engage the interior opposing side walls 82 (e.g. FIGS. 24, 31) of the cargo compartment 60 or one or more other components adjacent thereto during use of the debris recovery system 58.

Figure 31:
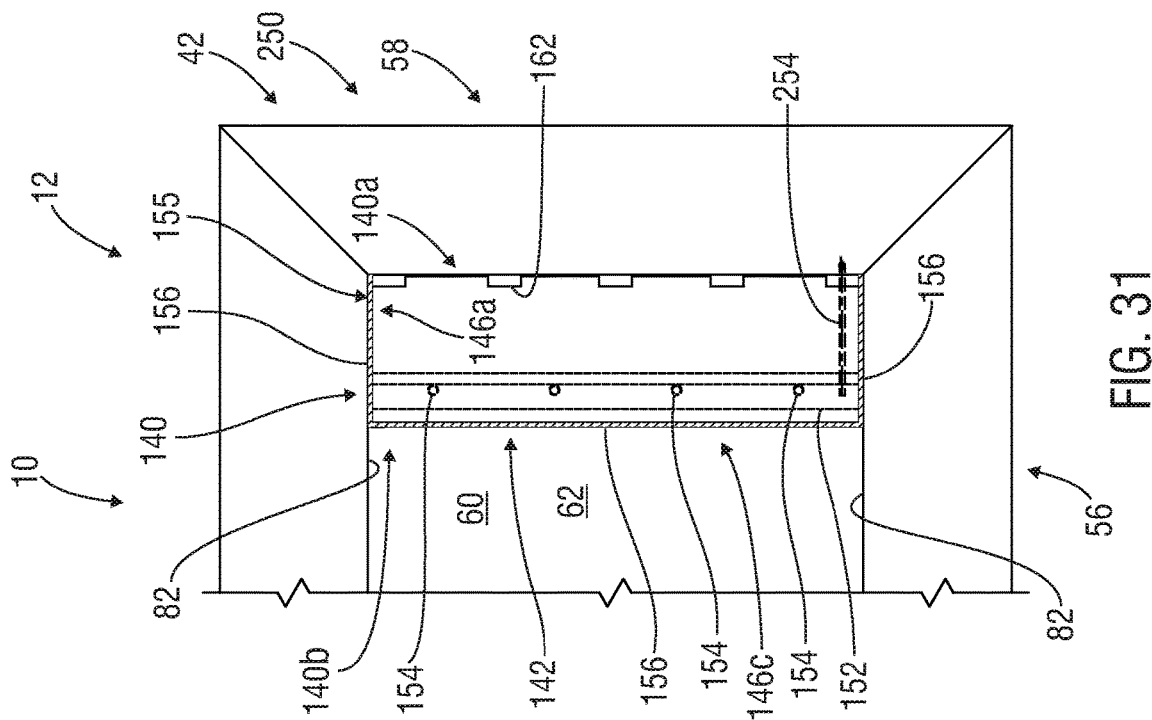
FIG. 31 is a plan view of part of the exemplary debris recovery system shown in FIG. 30.

In this embodiment, one or more seal members 155 (e.g. elongated gaskets 156) are also shown extending along the front edge 146c of the carrier 146 (see also FIGS. 31, 38). This may be useful, for example, to at least substantially sealingly engage the IFR 140 with the underside of the top deck 54 or other component(s) on the vessel 10 to at least substantially prevent the loss of liquid/debris from the cargo compartment 60 through the opening(s) 100 before or after debris recovery operations, other purpose(s) or a combination thereof.

If desired, one or more seal members 155 (e.g. elongated gaskets 156) may be provided along the rear edge 146d of the exemplary carrier 146, such as to at least substantially seal any gap between the IFR 140 and the bulkhead 92 or other component, other purpose(s) or a combination thereof.

One or more seal members 155 may instead or additionally be provided on the bulkhead 92, side wall(s) 82 of the cargo compartment 60 or other components of the vessel 10 to at least substantially sealing engage the IFR 140, any other purpose(s) or a combination thereof. However, other embodiments may include fewer or no seal members 155 or different variations of sealing components.

Referring again to FIGS. 27 & 28, the exemplary pivoting-type IFR 140 may be pivotably coupled to the vessel 10 in any suitable manner. In this example, the carrier 146 includes multiple receivers 162 (e.g. pipe sections) at or proximate to the rear end 140a of the IFR 140 that fit and freely rotate over one or more hinge pin 148 anchored to the vessel 10 (e.g. the front recessed deck 56 (e.g. FIG. 26) or adjacent component(s)). However, any other suitable components may be used to provide the desired pivotable movement of the pivoting-type IFR 140 relative to the vessel 10. For example, the pivoting-type IFR 140 may instead include one or more pivot pin that is pivotably engaged with the vessel 10, or a different variation of corresponding pivotably mating portions or structures may be provided on the IFR 140 and vessel 10.

Still referring to FIGS. 27 & 28, the buoyancy chamber 152, when included, may have any desired form, configuration, construction and operation. The exemplary buoyancy chamber 152 includes at least one cavity provided therein for containing air (and/or other gases) so that it floats on liquid. As used herein and in the appended claims, the terms "air" and variations thereof is meant to include any type and combination of gas(es) and air. The illustrated buoyancy chamber 152 is shown coupled to the plate 150 proximate to the front end 140b of the IFR 140 and extends across almost the entire width of the carrier 146 to provide the desired buoyancy of the IFR 140, intake resistance, other suitable purpose(s) or a combination thereof. For example, the location of the illustrated buoyancy chamber 152 proximate to the front end 140b of the IFR 140 may be farthest from the pivot mechanism(s) at the rear end 140a, such as to provide the greatest leverage advantage for the IFR 140 (see e.g. FIG. 26) other purpose(s) or a combination thereof. It should be noted that the buoyancy chamber 152 may be coupled to the carrier 146 or IFR 140 in any other suitable manner, at a different location on the carrier 146 and have any other desirable configuration, components and operation, or multiple buoyancy chambers 152 may be included, to provide the desired buoyancy, movement, positioning and/or intake resistance of the IFR 140, other purpose(s) or a combination thereof.

Referring again to FIGS. 23-29, the illustrated pivoting-type IFR 140 is an example of a "fixed-buoyancy" IFR 140 because does not possess any internal mechanisms for varying the buoyancy thereof. Thus, the internal cavity(ies) of the exemplary buoyancy chamber 152 is/are sized to hold sufficient air to provide the desired buoyancy of the exemplary pivoting-type IFR 140. For example, referring to FIG. 26, the illustrated buoyancy chamber 152 may be sized and situated to position the pivoting-type IFR 140 so that the front edge 142 thereof will be above the surface 172 of the water and/or debris within the cargo compartment 60 in a "rest" or "non-operating" position (e.g. when no suction is provided in the cargo compartment 60) after the cargo compartment 60 has been filled with water and before the start of debris recovery operations. FIG. 26 thus reflects an exemplary "rest" position (see also FIGS. 32, 35). For another example referring to FIG. 29, the exemplary buoyancy chamber 152 may be sized and situated to position the illustrated pivoting-type IFR 140 so that the front edge 142 thereof will be below the surface 172 of the water and/or debris in the cargo compartment 60 during debris recovery operations as the vessel 10 moves forward and/or suction (e.g. via discharge pump(s) 184) has commenced in the cargo compartment 60. The position of the exemplary pivoting-type IFR 140 in FIG. 29 reflects an exemplary "operating" position that provides the desired intake resistance (see also FIGS. 33-34). In this exemplary operating position of the illustrated IFR 140, the debris (e.g. oil 34) tends to cascade, or rush, over the front edge 142 of the illustrated IFR 140 and fill the cargo compartment 60 as water 38 is being removed therefrom. (See also FIG. 33-34, 46). In various embodiments, the position of the IFR 140 often may tend to remain relatively static during debris recovery operations (e.g. in the position of FIGS. 29, 33) when the controllable and non-controllable variables remain constant. However, in various instances, the exemplary IFR 140 may reciprocate, flutter, float or constantly adjust position in real-time throughout or intermittingly during operations.

Referring to FIGS. 26 & 32, if desired, the IFR 140 may have an "extended" or "closed" position, such as to close off the front end of the cargo compartment 60 or the opening 102, situate the front end 142 thereof high enough to contact, engage to at least substantially sealingly engage the underside of the top deck 54 of the vessel 10 (or other component(s) on the vessel 10) to at least substantially prevent the loss of liquid/debris from the cargo compartment 60 through the opening(s) 102 before or after debris recovery operations, for any other purpose(s) or a combination thereof. For example, the "rest position" as described above with respect to FIGS. 26, 32 may also serve as the "extended" position. For another example, the IFR 140 may float or be movable (e.g. manually or with a positive movement device, such as one or more mechanical or pneumatic drivers (e.g. as described above with respect to the exemplary gates 110), etc.)) to a higher position (e.g. FIGS. 35 & 40).

In FIG. 40, the illustrated IFR 140 biasingly engages an IFR catcher 300 provided on the vessel 10 to establish or secure it in a closed position. The IFR catcher 300 may have any suitable form, configuration and operation. In this example, the IFR catcher 300 includes a first stop 302 configured to at least substantially sealingly engage the front edge 142 of the IFR 140 and a second stop 304 configured to engage the upper front surface of the IFR 140. The illustrated first and second stops 302, 304 are elongated sections of angle iron coupled to the underside of the top deck 54 and/or the side walls 82 of the cargo compartment 60. However, the stops 302, 304 may have any other suitable form, configuration and operation. In other embodiments, the IFR 140 may be releasably securable to the IFR catcher 300 (e.g. with one or more hooks, latches, magnets, mechanical connectors) to secure the IFR 140 in the extended position (e.g. to prevent debris from sloshing out of the cargo compartment 60 during transport after debris recovery operations). For another example, the "closed" position of the IFR 140 and techniques for moving it into and out of a "closed" position may be similar to that described above for the gates 110 and shown in FIGS. 1-22.

Now referring to FIGS. 35-39, an exemplary sliding-type (fixed-buoyancy) IFR 140 is shown. The illustrated sliding-type IFR 140 (a.k.a. gate 110) is at least partially buoyant and situated in an upright position so that the entire IFR 140 is movable up and down (as indicated with arrows 294) relative to the cargo compartment 60, bulkhead 92 and intake opening 102 to provide the desired intake resistance. In this example, when installed, the sliding-type IFR 140 is perfectly vertical (e.g. relative to a centerline of the vessel 10) or nearly perfectly vertical. However, in other embodiments, the sliding-type IFR 140 may be angled or substantially vertical. Thus, the precise orientation of the sliding-type IFR 140 is not limiting upon the present disclosure and appended claims (unless explicitly noted otherwise), so long as the IFR 140 is movable up and down and has one or more of the capabilities provided herein or which is evident from this disclosure and the appended drawings and claims.

The sliding-type IFR 140 may have any suitable form, configuration and operation. In this embodiment, as shown in FIG. 36, the IFR 140 includes a carrier 146 (e.g. plate 150) and a float 144 (e.g. buoyancy chamber 152) of the same type and having the same features as described above and shown in the appended drawings with respect to the exemplary pivoting-type IFR 140 (except those details relating to the pivotability thereof). Accordingly, all of the disclosure herein with respect to the carrier 146 and float 144 (e.g. the buoyancy chamber 152) of the exemplary pivoting-type IFR 140 (except that relating to the pivotability thereof) and otherwise provided herein with respect to the IFR 40 is incorporated herein by reference in its entirety. For example, the sliding-type IFR 140 may include multiple side-by-side adjacent sections (e.g. multiple sets of carriers 146 and corresponding floats 144) such as to accommodate or provide flexibility in response to side-by-side rocking or rolling of the vessel 10.

Similarly as described above, the sliding-type IFR 140 may not include any separate floats 144 or buoyancy chambers 152, but possess other suitable component(s) to provide the desired buoyancy. For example, the carrier 146 may include one or more buoyancy sections, cavities or chambers, and may be at least partially inflatable. For another example, the sliding-type IFR 140 (e.g. carrier 146) may include foam or other material with floatation properties to provide the desired buoyancy or uplift of the front end 140*b* or other portion thereof. For yet another example, the sliding-type IFR 140 may be, or include, one or more bladder bags coupled to the vessel 10 proximate to the front end 42 thereof and configured to provide the desired intake resistance. If desired, the bladder bag(s) may be fixed buoyancy or variable buoyancy.

Still referring to FIG. 36, if desired, the carrier 146 of the exemplary the sliding-type IFR 140 may include multiple plates 150, one or more support or frame members, such as to provide rigidity, sturdiness, durability, etc. to the plate(s) 150, or may be semi-rigid, flexible or pliable, perforated, non-flat, convex or concave or have any other form, configuration and components. In this embodiment, the IFR 140 includes left and right side frames 282, 283 and top and bottom edge frames 284, 285. The illustrated frame members 282-285 extend inwardly from the plate 150 around the perimeter thereof, such as to provide stiffness to the IFR 140, assist in guiding the movement of the IFR 140, other suitable purpose(s) or a combination thereof.

Referring to FIGS. 35-37, in this embodiment, one or more guide pins 288 are shown protruding outwardly from each of the side frames 282, 283 and configured to move freely up and down (arrows 294) within respective left and right guide rails 290, 292. The guide pins 288 and guide rails 282, 292 may have any suitable form, configuration and operation. In this example, as shown in FIG. 36, two guide pins 288 are provided on each side of the sliding-type IFR 140, but only one or more than two (e.g. 3, 4, 5, etc.) may be included. The illustrated guide pins 288 include a circular plate rigidly coupled (e.g. by weld and/or mechanical connectors) to a pipe section, which is rigidly coupled (e.g. by weld and/or mechanical connectors) to the side frames 282, 283 of the IFR 140. In other embodiments, the guide pins 288 may include a rotatable or non-rotatable wheel or other guide mechanism(s). As shown in FIG. 37, the exemplary guide rails 290, 292 each include a pair of elongated sections of angle-iron rigidly coupled (e.g. by weld and/or mechanical connectors) to the side walls 82 of the cargo compartment 60 or other part(s) or component(s) of the vessel 10. The exemplary sliding-type IFR 140 slides freely up and down within the guide rails 290, 292, which define and limit the path of the IFR 140 (e.g. FIG. 35). The guide rails 290, 292 may be oriented perfectly or near-perfectly vertically, substantially vertically or have another desired orientation. Thus, the precise orientation of the guide rails 290, 292 is not limiting upon the present disclosure and appended claims (unless explicitly noted otherwise).

Referring specifically to FIG. 35, in this embodiment, the debris recovery system 58 is designed so that the sliding-type IFR 140 is free-moving up and down (e.g. in the cargo compartment 60, as per arrows 294). The front end 140*b* thereof will float at or near the surface 172 of liquid contained in the first cargo compartment 60 (or moving into it) during use of the exemplary debris recovery system 58 to provide the desired intake resistance. Specifically, the front end 140*b* of the exemplary sliding-type IFR 140 is shown extending across the intake opening 102 so the debris will flow, or cascade, over the front edge 142 of the IFR 140 as desired and similarly as described and shown herein with respect to the pivoting-type IFR 140. FIG. 35 thus shows an exemplary optimal operating position of the IFR 140 during debris recovery operations. The IFR 140 shown in shadow in FIG. 35 illustrates an exemplary extended, or closed, position of the IFR 140, similarly as described above.

Referring now to FIGS. 38 & 39, if desired, the exemplary sliding-type IFR 140 may include one or more seal members 155 or other components to provide or encourage at least substantial sealing engagement of the IFR 140 with the cargo compartment 60, bulkhead 92 and/or other components. The seal members 155 may have any suitable form, configuration, components and operation. For example, the seal members 155 may include one or more elongated gaskets 156 are shown coupled to the carrier 146 (e.g. with connectors (e.g. bolts), epoxy or other glue, opposing mating portions, by friction fit, or a combination thereof) and extending along the side edges 146*a*, 146*b* of the carrier 146 (e.g. along the outside surfaces of the left and right frames 282, 283) to at least substantially sealingly engage the left and right guide rails 290, 202, respectively, or one or more other components adjacent thereto. In this embodiment, one or more elongated gaskets 156 are also shown extending along the front edge 146*c* of the carrier 146. If desired, one or more seal members 155 (e.g. elongated gaskets 156) may also be provided along the rear edge 146*d* of the carrier 146. One or more seal members 155 may instead or additionally be provided on the bulkhead 92, side wall(s) 82 of the cargo compartment 60 or other components of the vessel 10 for the same purpose. For example, one or more elongated gaskets 156 are shown coupled to the inner wall of the bulkhead 92 across substantially the entire width of the intake opening 102 and/or cargo compartment 60, such as to at least substantially seal the gap 296 (e.g. FIG. 37) between the bulkhead 92 and the sliding-type IFR 140, other purpose(s) or a combination thereof.

If desired, the illustrated sliding-type IFR 140 may be positioned within the cargo compartment 60 with the guide pins 288 inserted into the respective rails 290, 292 before the top deck 54 (or at least the foremost section of the top deck 54) is secured to the vessel 10. If the exemplary debris recovery system 58 includes a variable buoyancy system 250 (such as described below), the system 250 may be used to selectively position the front end 140b of the sliding-type IFR 140 as desired. Otherwise, the debris recovery system 58 can be used to provide the desired intake resistance, similarly as described above with respect to the pivoting-type IFR 140.

Referring now to FIGS. 30-34 & 40, the debris recovery system 58 may include one or more internal mechanisms for varying the buoyancy of the exemplary IFR 140. An IFR 140 used in a variable buoyancy arrangement is sometimes referred to herein as a "variable-buoyancy" IFR 140. Thus, the IFR 140 may be a variable-buoyancy, pivoting-type IFR (e.g. FIGS. 30-34, 40-46), fixed-buoyancy, pivoting-type IFR (e.g. FIGS. 9-11, 13, 26-29), variable-buoyancy, sliding-type IFR, fixed-buoyancy, sliding-type IFR (e.g. gate 110, FIGS. 4-8; FIGS. 35-39) or have any other configuration. The illustrated system 58 includes a variable buoyancy system 250 associated with the IFR 140 and configured to allow the selective insertion and removal of air, gas or a combination thereof into/from the IFR 140 to influence its buoyancy. For example, when it is desirable to decrease the buoyancy of the exemplary IFR 140, air may be allowed to escape from the exemplary buoyancy chamber 152 and be replaced by liquid in the cargo compartment 60 (e.g. FIG. 33). Conversely, when it is desirable to increase the buoyancy of the illustrated IFR 140, additional air may be injected into the buoyancy chamber 152 to displace liquid out of the buoyancy chamber 152 (e.g. FIG. 34). In embodiments of the debris recovery system 58 not including any buoyancy chambers 152 (e.g. an IFR 140 with one or more bladder bags), the variable buoyancy system 250 could similarly be used with other components (e.g. inflatable) of the IFR 140.

The variable buoyancy system 250 may have any suitable form, configuration, components and operation. In this embodiment, referring to FIGS. 30 & 31, the buoyancy chamber 152 includes four water exchange openings 154 (e.g. formed in the bottom 153 of the buoyancy chamber 152 and always open) to allow liquid from the cargo compartment 60 to be able to enter the buoyancy chamber 152. However, any other suitable form, configuration, quantity (e.g. 1-3, 5 or more) and location of the water exchange openings 154 may be used.

The exemplary variable buoyancy system 250 includes at least one air exchange conduit 254 (e.g. flexible hose, steel pipe, etc.) fluidly coupled to the buoyancy chamber 152 and configured to allow the selective insertion and removal of air (and/or gas(es)) into the chamber 152. For example, one or more air compressors 258 may be provided on the vessel 10 for selectively suppling compressed air into the buoyancy chamber 152 via the air exchange conduit 254, such as through one or more air exchange riser 262 (e.g. steel pipe, flexible tubing, etc.). However, any other arrangement of components may be used to selectively provide air in the buoyancy chamber 152.

Figure 30:
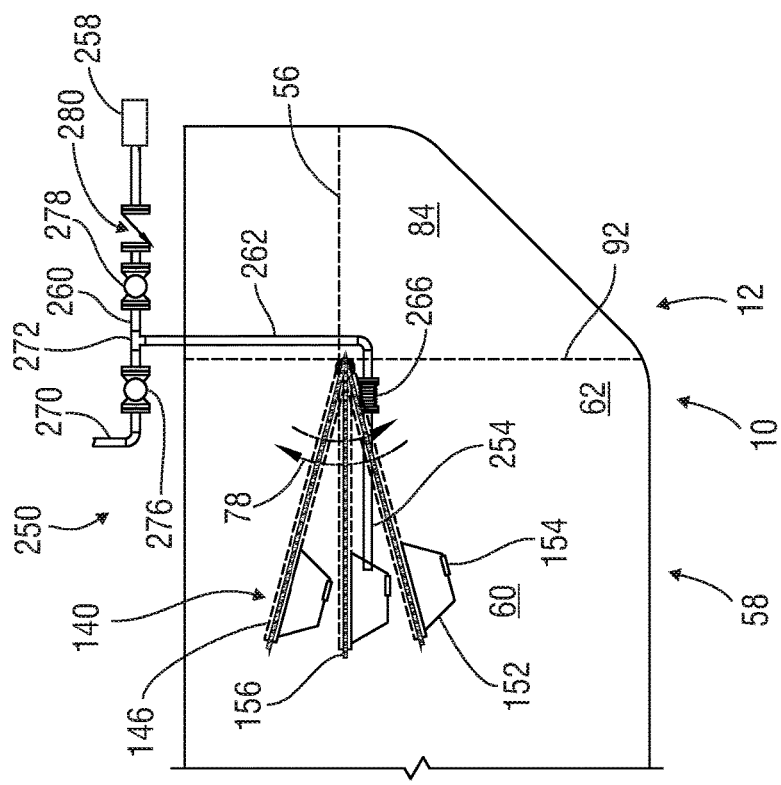
FIG. 30 is a side, cut-away view of part of the exemplary waterborne vessel of FIG. 23 with the side shell removed and the exemplary debris recovery system including an exemplary variable buoyancy system in accordance with one or more embodiments of the present disclosure.

Still referring to FIGS. 30-31, if desired, since the illustrated IFR 140 will move relative the vessel 10 (e.g. arrows 78), one or more flex connector 266 may be strategically placed between the air exchange conduit 254 and air exchange riser 262 to allow movement of the air exchange conduit 254 (with the IFR 140) relative to the air exchange riser 262 (and/or other components) without disconnecting or damaging the air exchange conduit 254, buoyancy chamber 152 and/or other components. The flex connector 266 may have any suitable form, configuration and operation. For example, the flex connector 266 may be a flexible hose or expansion joint.

In this embodiment, the variable buoyancy system 250 also includes one or more discharge conduits 270 (e.g. to the atmosphere) fluidly coupled to the buoyancy chamber 152 to allow air to be selectively discharged therefrom. For example, the illustrated air exchange riser 262 is shown fluidly coupled to both the air compressor 258 (e.g. via air supply branch 260) and at least one air discharge conduit 270, such as at a T-connector 272. The illustrated variable buoyancy system 250 also includes at least one relief valve 276 and at least one fill valve 278 that may be actuated to allow/disallow air to be selectively supplied into the buoyancy chamber 152 from the air compressor 258 (or other source) and discharged out of the buoyancy chamber 152 via the discharge conduit 270. One or more check valves 280 may be included in the variable buoyancy system 250 (e.g. in the supply branch 260 and/or one or more discharge conduit 270), such as to allow only one-way air flow in desired sections of the variable buoyancy system 250. However, all of the above components are not required for every embodiment of the system 58 and/or any other components may be used.

Figure 33:
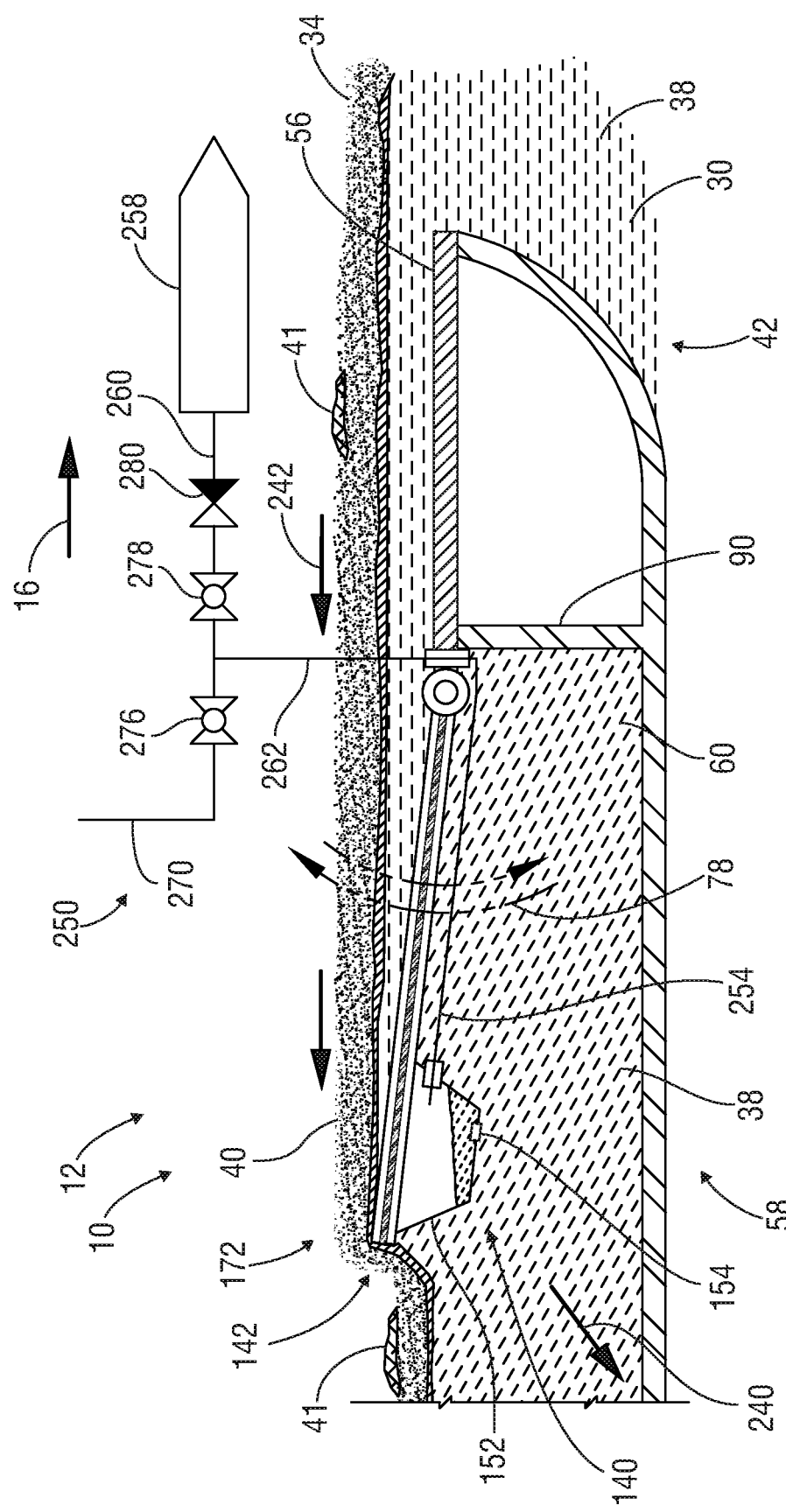
FIG. 33 is a side, partial cross-sectional, view of the exemplary waterborne vessel of FIG. 32 with the side shell removed and showing the exemplary inflow regulator in a first exemplary operating position in accordance with one or more embodiments of the present disclosure.
Figure 34:
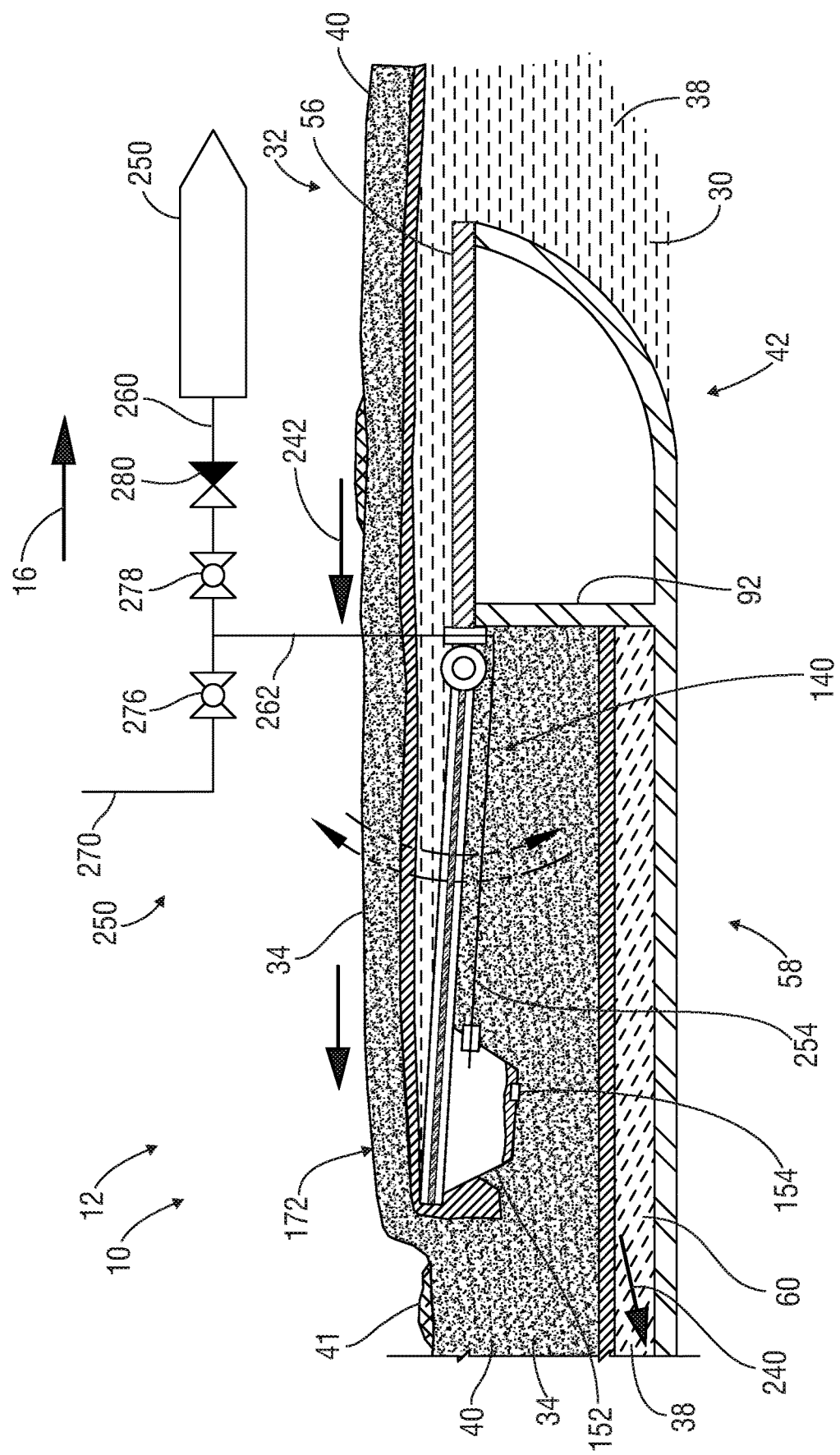
FIG. 34 is a side, partial cross-sectional, view of the exemplary waterborne vessel of FIG. 32 with the side shell removed and showing the exemplary inflow regulator in a second exemplary operating position in accordance with one or more embodiments of the present disclosure.

Referring now to FIGS. 32-34, an example use of the illustrated variable buoyancy IFR 140 will now be described. FIG. 32 represents a potential start, or rest, position of the exemplary variable buoyancy IFR 140 after the cargo compartment 60 has been filled with water and before the start of debris recovery operations. In this example, the buoyancy chamber 152 is filled with air (e.g. naturally, by injecting air therein such as described above or otherwise) so that the front edge 142 of the IFR 140 is positioned above the surface 172 of the water within the cargo compartment 60, representing an exemplary rest or non-operating position of the IFR 140.

Referring to FIG. 33, if it is desired to decrease the buoyancy of the IFR 140 (e.g. move the exemplary IFR 140 down into a lower position relative to the surface 172 of the water/debris in the cargo compartment 60) with the use of the variable buoyancy system 250, the exemplary fill valve 278 is closed and the relief valve 276 opened, allowing a desired volume of air to escape from buoyancy chamber 152 and be replaced by liquid flowing up into the buoyancy chamber 152 through the water exchange opening(s) 154. When the desired position of the exemplary IFR 140 is achieved, the illustrated valve 276 is closed. This may be desirable in various scenarios, such as to establish or maintain the optimal operating position of the IFR 140 and/or optimal intake resistance when the forward movement of the vessel 10 and/or suction pressure (e.g. via the fluid discharge pumps 184 and/or in the relevant suction conduit(s) 160) in the cargo compartment(s) 60 is reduced or stopped, when the thickness of the debris (e.g. oil) in the body of water 30 increases and it is desired to allow more debris to enter the cargo compartment 60, upon the occurrence of one or more other events, variables or situations or a combination thereof. In FIG. 33, some liquid has thus entered the illustrated buoyancy chamber 152, positioning the IFR 140 lower in the cargo compartment 60 as comparted to its rest position in FIG. 32. FIG. 33 thus illustrates the exemplary buoyancy chamber 152 partially flooded and the IFR 140 in an exemplary operating position. In this illustration, suction in the cargo compartment 60 has also commenced and/or the vessel 10 is moving in the forward direction, and debris (e.g. small-sized debris 40, large-sized debris 41, some mixed debris/water) is shown flowing or cascading over the front edge 142 of the IFR 140 into the cargo compartment 60 as water 38 is being removed therefrom.

There may be various situations in which it is desirable to increase the buoyancy of the IFR 140 with the use of the exemplary variable buoyancy system 250. For example, as the cargo compartment 60 becomes more filled with oil (and/or other low density debris), the IFR 140 will tend to float lower in the cargo compartment 60 and it may be desirable to raise up the IFR 140 (e.g. to establish or maintain the optimal operating position of the IFR 140 and/or optimal intake resistance). For other examples, it may be desirable to increase the buoyancy of the IFR 140 (e.g. to establish or maintain the optimal operating position of the IFR 140 and/or optimal intake resistance) upon moving the vessel 10 forward from a stationary position, increasing the forward speed of the vessel 10, initiating or increasing suction pressure (e.g. via the discharge pumps 184 and/or in the relevant suction conduit(s) 160) in the cargo compartment(s) 60, increased wind or wave action (e.g. where fluid pressure provides increased push on the IFR 140), the occurrence of one or more other events, or a combination thereof. To increase buoyancy of the exemplary IFR 140 using the illustrated variable buoyancy system 250, the relief valve 276 is closed, the fill valve 278 is opened and the desired volume of air is injected into the buoyancy chamber 152 from the air compressor 258 (or other source) to push out the desired volume of liquid from inside the buoyancy chamber 152 through the water exchange opening(s) 154. When the desired position of the IFR 140 is achieved, the exemplary valve 274 is closed. FIG. 34 thus shows a less partially flooded buoyancy chamber 152 than in FIG. 33. However, any other technique and components may be used to vary the buoyancy of the IFR 140.

In some embodiments, the variable buoyancy system 250 may be useful on an ongoing basis to continually, or as necessary, selectively adjust the position of the IFR(s) 140 in the cargo compartment(s) 60 to influence (e.g. improve) the efficiency and effectiveness of debris collection operations (e.g. collect as much debris as quickly as possible), establish or maintain the optimal operating position of the IFR 140 and/or optimal intake resistance, other purpose(s) or a combination thereof. Further, the variable buoyancy system 250 may be used in conjunction with one or more other controllable or uncontrollable variables, as mentioned above. Any of the embodiments of the IFR 140 described or shown herein (or of any other embodiments of the debris recovery system 58) may be equipped to function as a variable-buoyancy IFR 140 in the manner described/shown herein or otherwise. Thus, the description herein of the variable-buoyancy IFR 140 and corresponding figures, for example, may be applied to the embodiments of FIGS. 26-29 and 35-39.

Figure 41:
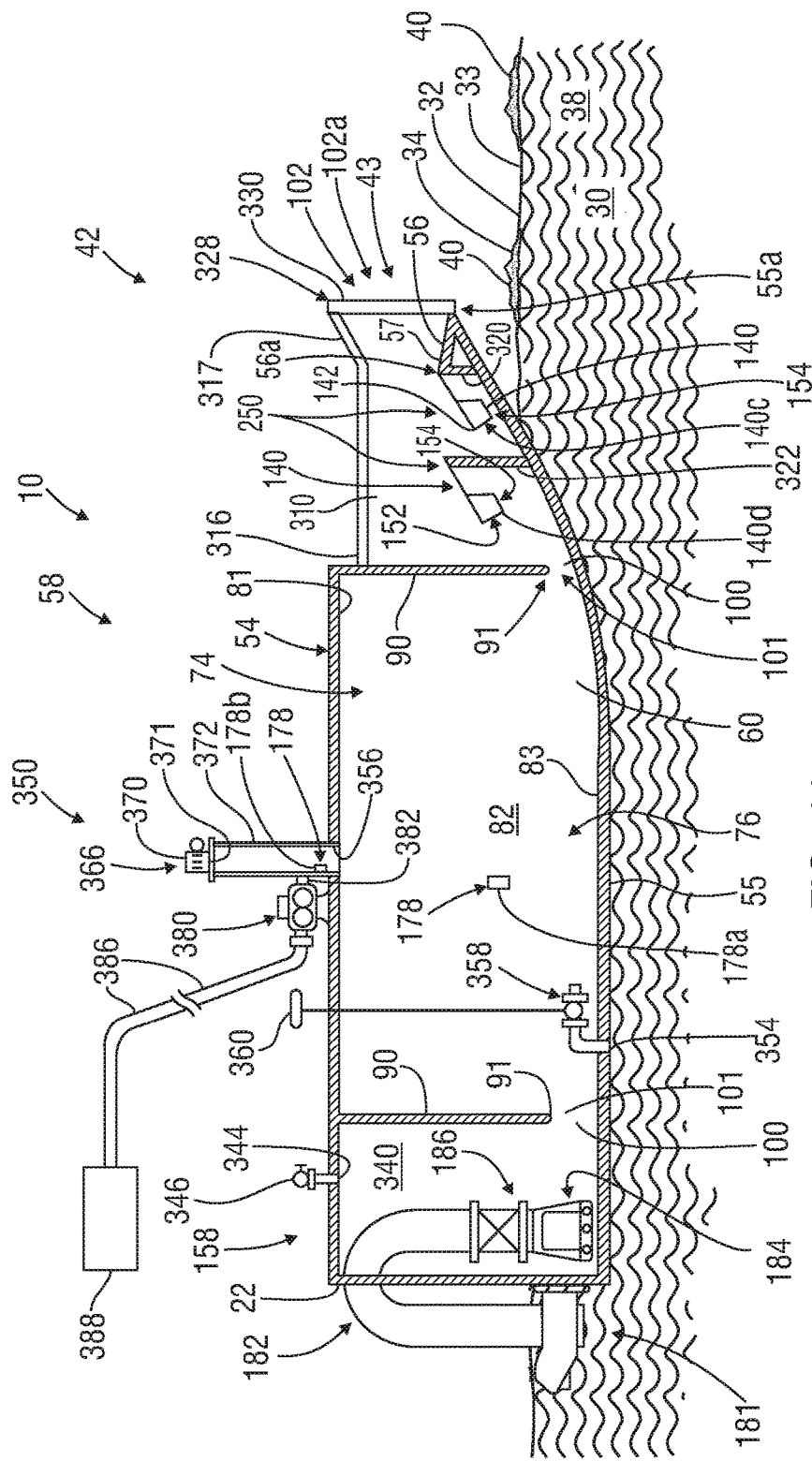
FIG. 41 is partial cross-sectional, side view of a waterborne vessel and at least part of another embodiment of a debris recovery system provided thereon in an exemplary transit mode in accordance with the present disclosure.
Figure 42:
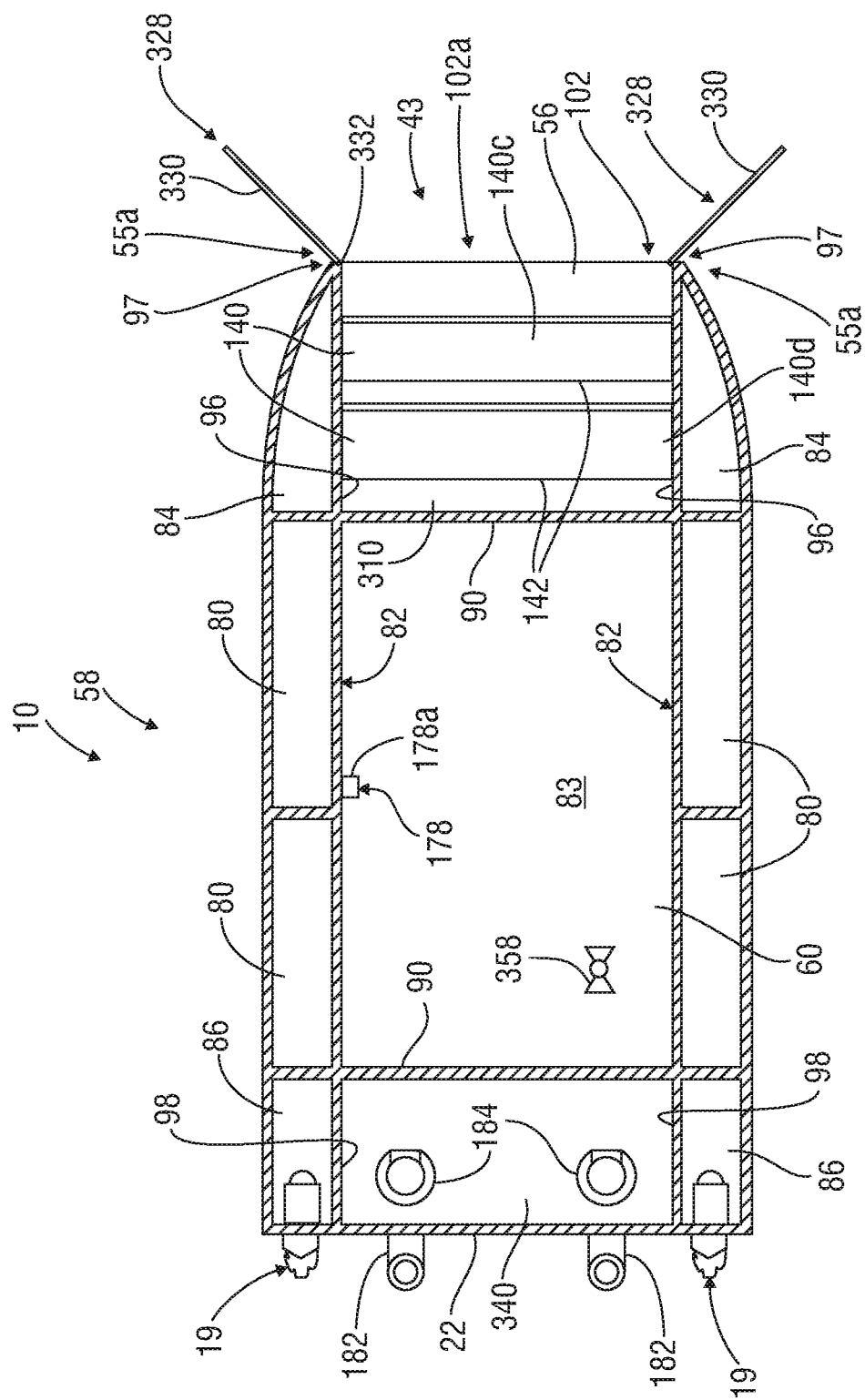
FIG. 42 is a top view of the exemplary vessel of FIG. 41 with the top deck removed and exemplary front doors open to show exemplary interior areas and components.

Now referring to FIGS. 41-51, an embodiment of a debris recovery system 58 is shown having at least one IFR 140 situated within at least one IFR chamber 310 forward of and fluidly coupled to at least one cargo compartment 60 on the debris recovery vessel 10. It should be noted that all of the details and description provided above and/or shown in, or as may be apparent from, FIGS. 1-40 are hereby incorporated by reference herein in their entireties with respect to this embodiment of the vessel 10 and system 58 and FIGS. 41-51, except and only to the extent as may be described differently herein and/or as may otherwise be evident from the description herein and/or the appended drawings. Referring specifically to FIGS. 41 & 42, in this example, the system 58 includes a single cargo compartment 60 and a single IFR chamber 310 containing a front IFR 140c and a rear IFR 140d. Other embodiments may include more or fewer IFRs 140 in any configuration (e.g. front-to-rear and/or side-by-side), more than one IFR chambers 310 and/or cargo compartments 60 or a combination thereof. An example (small-sized) vessel 10 of various embodiments may have an approximate length of 32', an approximate width of 10' and an approximate depth of 4.75' and be configured to effectively recover debris in waterways that may have up to approximately 12" waves (e.g. inland waterways and shallow off-shore locations). As discussed above, the vessel 10 may be self-propelled or propelled by one or more other vessel or any other manner. In some embodiments, the vessel 10 may be self-propelled with two propel units 19 powered by one or more power units. In some embodiments, two MJP Ultrajet 251 units sold by Marine Jet Power, Inc., each having a 250 mm diameter impeller and joy stick control may be used as the propel units 19 and be powered, for example, by a General Motors Marine Diesel VGT500 as the power unit.

Referring still FIGS. 41 & 42, the exemplary IFR chamber 310 is shown separated from the cargo compartment 60 by at least one vertical wall 90 and fluidly coupled to the cargo compartment 60 by at least one fluid passageway, or opening, 100 that allows fluid flow past the vertical wall 90. In this embodiment, the fluid passageway(s) 100 between the IFR chamber(s) 310 and cargo compartment(s) 60 is typically fully submersed in liquid (e.g. FIG. 46) during operations (e.g. to allow a vacuum to be created/maintained in the cargo compartment 60 during operations (such as described below), for one or more other purposes or a combination thereof). For example, the lower end 91 of the vertical wall 90 may not extend down to the hull, or lower plate, 55 of the vessel 10 or other part(s) of the vessel 10 that forms or serves as the bottom 83 of the cargo compartment 60 and/or IFR chamber 310. In such instance, the exemplary fluid passageway 100 may be the entire space 101 extending below the lower end 91 of the vertical wall 90. In other examples, one or more fluid passageways 100 may comprise only a part of the space 101, be formed or provided in or proximate to the lower end 91 of the exemplary vertical wall 90 (which may extend to the bottom 83 of the compartment 60, hull 55 or other component) or provided elsewhere. In yet other embodiments, the exemplary passageway(s) 100 between the cargo compartment 60 and IFR chamber 310 may be in one or more suction conduit(s) 160 (e.g. similarly as described above and shown in various appended figures (e.g. FIGS. 1-2, 13-20)) extending therebetween or therethrough. Accordingly, the compatible features of the suction conduit 160 as described and shown elsewhere in this patent are hereby incorporated herein by reference for these embodiments. Thus, the form, quantity, size, configuration, construction, precise location, orientation and operation of the passageway(s) 100 fluidly coupling the IFR chamber(s) 310 and cargo compartment(s) 60 is not limited or limiting upon the present disclosure, unless and only to the extent as may be expressly provided in a particular claim and only for that claim and claims depending therefrom. If desired, a selectively moveable gate (e.g. gate 110, FIG. 47; see also FIGS. 3-18) may be associated with the passageway(s) 100 to selectively seal off or fluidly isolate the IFR chamber(s) 310 from the cargo compartment(s) 60 as desired, serve as a "sliding"-type IFR 140 (e.g. FIGS. 35-39), for any other purposes or a combination thereof.

Still referring to FIGS. 41 & 42, in this embodiment, for debris recovery operations, the system 58 is designed so that liquid and debris enters the vessel 10 from the body of water 30 via the IFR chamber(s) 310 at one or more intake openings 102 forward of the IFR(s) 140 (e.g. at or proximate to the front end 42 or the mouth 43 of the vessel 10). Any desired number, form and configuration of intake openings 102 may be included. For example, the intake opening 102 may be the entire space 102a extending between front edges of at least one IFR chamber cover 316, top deck 54 or other component(s) and the hull 55, recessed front deck 56 or other component(s) and the opposing side walls 96 that define the IFR chamber 310. In other embodiments, one or more intake openings 102 may, for example, comprise only part of the space 102a, or may be formed in a front bulkhead or vertical wall of the vessel 10 (e.g. similar to other embodiments described above, e.g. FIG. 3). In yet other embodiments, the intake opening 102 may have no upper boundary, such as similar to the embodiments of FIGS. 23-26. Thus, the form, quantity, size, configuration, construction, precise location, orientation and operation of the intake opening(s) 102 is not limited or limiting upon the present disclosure and claims, unless and only to the extent as may be expressly provided in a particular claim and only for that claim and claims depending therefrom.

The recessed front deck(s) 56, when included, may have any suitable form, quantity, size, configuration, construction, precise location, orientation and operation. In this embodiment, the recessed front deck 56 is provided at or near the front 42 of the vessel 10 forward of the front IFR 140c. For example, the recessed front deck 56 may extend between (or near) the front edge 55a of the hull 55 and a front IFR support wall 320. If desired, the recessed front deck 56 may include a wave diminishing surface 57 that slants downwardly toward the front end 42 of the vessel 10 to assist in dampening or reducing the impact, size, action of waves/turbulence in the body of water 30 (e.g. like a beach) or otherwise caused by fluid/debris entering the IFR chamber 310, encourage only the top layer(s) of liquid/debris (e.g. oil 34, debris, algae, oily water) to pass through the intake opening(s) 102, limit the flow of sea water through the intake opening(s) 102, other desired purpose(s) or a combination thereof. However, the recessed front deck 56 may have different features or not be included in various embodiments.

Still referring to FIGS. 41 & 42, when included, the IFR chamber cover(s) 316 may have any suitable form, quantity, size, configuration, construction, precise location, orientation and operation. In this embodiment, the IFR chamber cover 316 is at least partially transparent, or see-through, to allow one or more operators on the vessel 10 to observe one or more conditions in the IFR chamber 310 (e.g. the effect of one or more controllable variables and/or the existence and effect of one or more non-controllable variables (e.g. the nature, action, turbulence and/or content of water (e.g. amount and/or type of debris) entering, within and/or flowing through the IFR chamber 310)), one or more components in the IFR chamber 310, such as the position, intake resistance and/or effectiveness of each IFR 140, in order to determine if, when and what adjustments should be made (e.g. to the IFRs 140, suction pressure from the discharge pump(s) 184, vessel speed, state and speed of the debris pump(s) 380) during operations, for other purpose(s) or a combination thereof. The IFR chamber cover 316 may, for example, be at least partially perforated, constructed at least partially of grating, mesh, clear fiberglass or other at least partially transparent material(s), other suitable material or a combination thereof. In this embodiment, the IFR chamber cover 316 includes a metallic grate.

Figure 48:
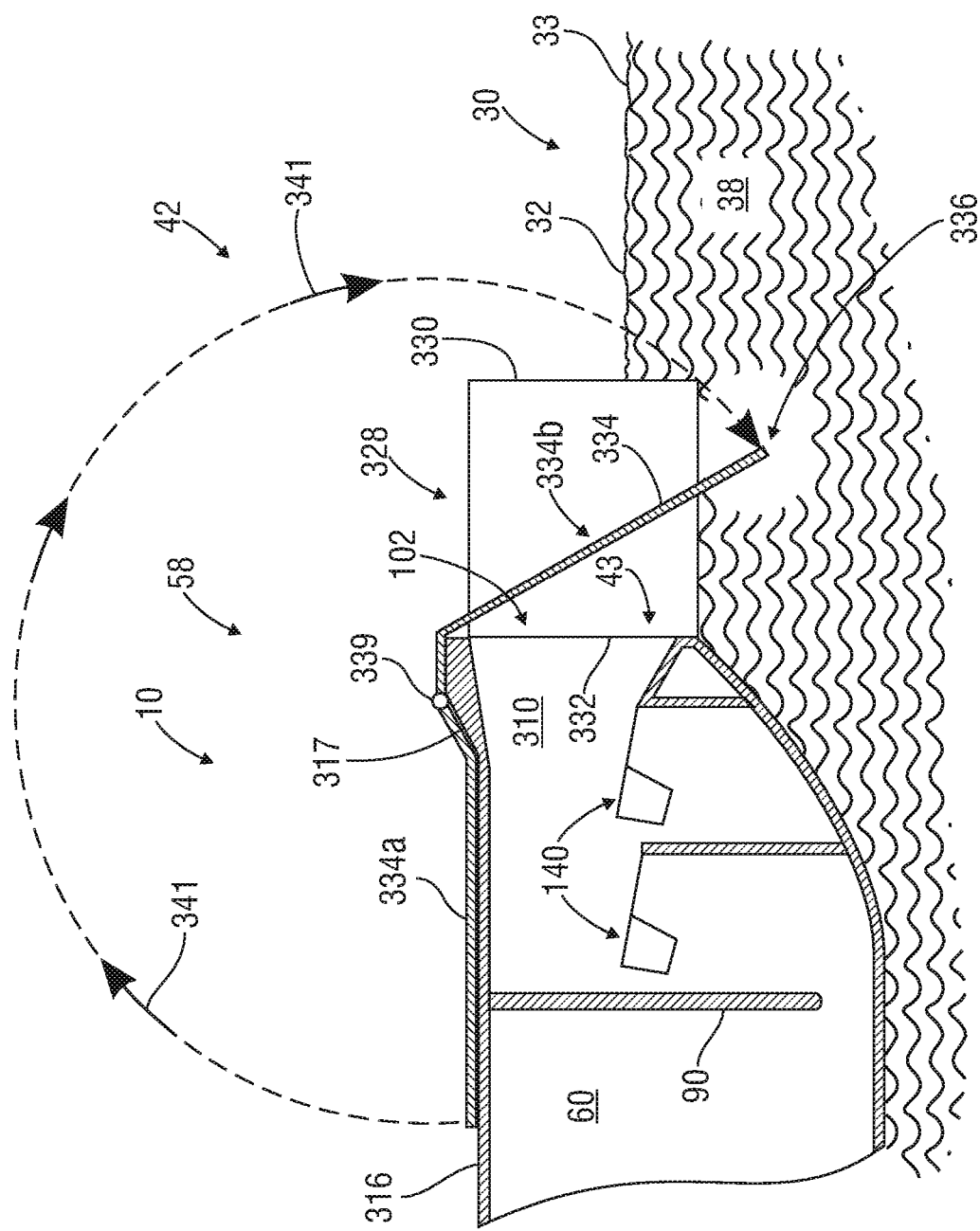
FIG. 48 is partial cross-sectional, side view of part of the exemplary vessel of FIG. 41 and equipped with an exemplary large-sized debris guard in accordance with an embodiment of the present disclosure.
Figure 49:
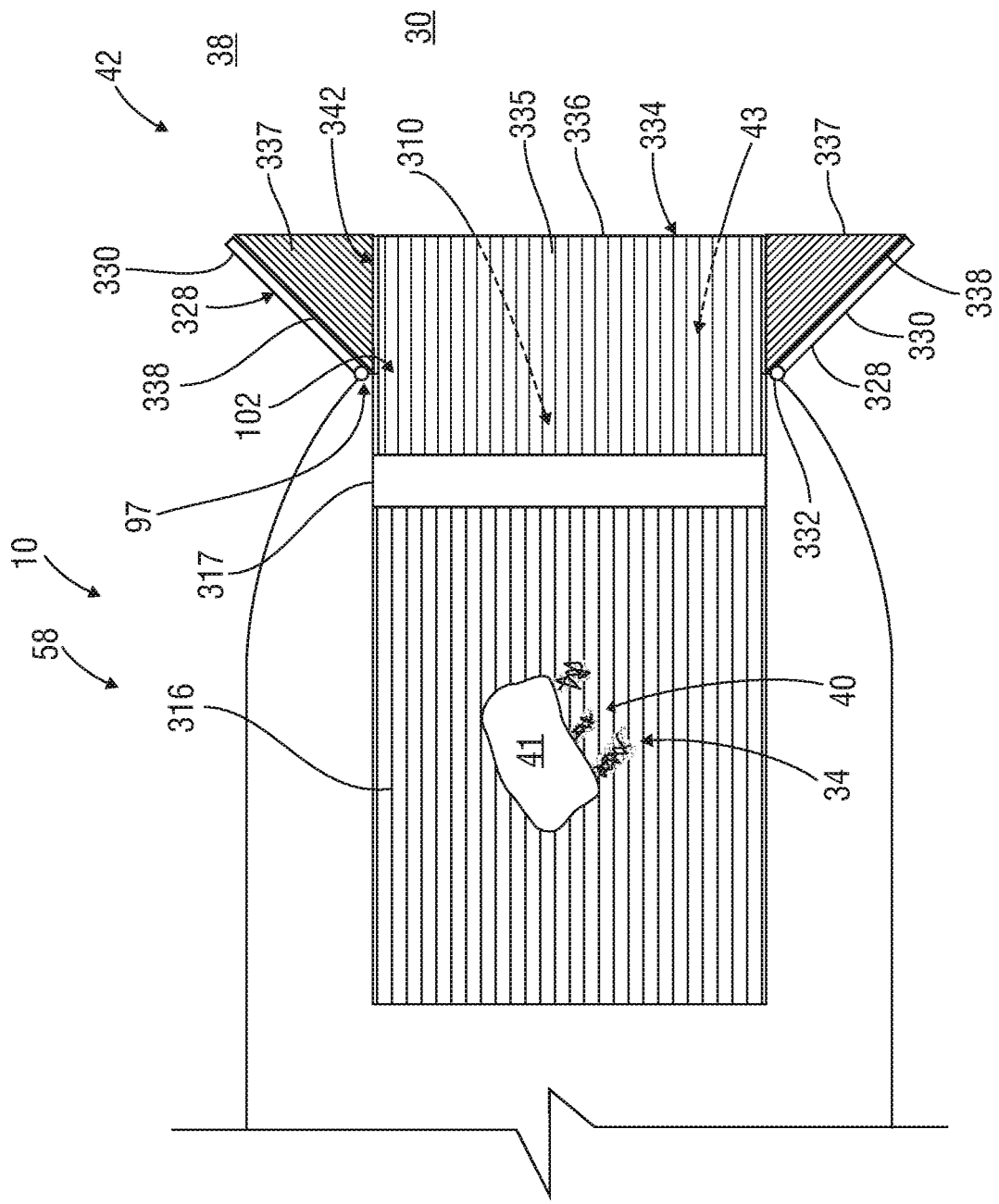
FIG. 49 is a top view of the exemplary vessel of FIG. 48 showing exemplary large-sized debris atop the exemplary IFR chamber cover.

Referring now to FIGS. 48 & 49, the IFR chamber cover 316 may also or instead be used to at least temporarily store large-sized debris 41 recovered during operations. For example, when large-sized debris 41 (e.g. oil-soiled animal life, driftwood, etc.) is encountered during operations (e.g. as or before it enters the IFR chamber 310), the large-sized debris 41 may be grabbed (e.g. with a manually-operated or automated gaff or grabber) and placed atop the IFR chamber cover 316 for later disposal, preventing the recovered debris 41 from clogging the intake opening(s) 102, other purpose(s) or a combination thereof. If the IFR chamber cover 316 is perforated, placement of the large-sized debris upon the cover 316 may allow any small-sized debris 40 (e.g. oil 34, algae bloom) carried by or on the large-sized debris 41 and which is small enough to fit through the perforations in the IFR chamber cover 316 to pass or drip into the IFR chamber 310 for recovery and processing. If desired, one or more front and/or side portions 317 of the IFR chamber cover 316 may be angled upwardly, such as to prevent any large-sized debris 41 placed thereupon from rolling off the vessel 10. However, the IFR chamber cover(s) 316 may have any other configuration, components and operation and is not required in various embodiments.

Still referring FIGS. 48 & 49, one or more front doors 328 may be provided on the vessel 10 (e.g. to selectively close off or block the intake opening(s) 102 during transit or storage of the vessel or any other desired time). The front door(s) 328 may have any suitable form, quantity, size, configuration, construction, precise location, orientation and operation. In the present embodiment, the front doors 328 include a pair of sideways pivoting gates 330 situated at the front 42 of the vessel 10 and selectively moveable between at least one closed position (e.g. FIG. 41) and at least one open position (e.g. FIGS. 42-46, 48-51). The illustrated gates 330 are pivotably coupled (e.g. via one or more hinges 332) at or proximate to the respective front edges 97 (e.g. FIG. 42) of the side walls 96 that form the IFR chamber 310 (or to one or more other components at or near the front end 42 of the vessel 10) and are selectively pivotable (e.g. by electric or solar powered motor, hydraulic or pneumatic power source, manually or otherwise) inwardly and outwardly relative to the vessel 10 between open and closed positions. However, the door(s) 328 (e.g. gates 330), when included, may be configured, coupled to the vessel 10 and moveable between positions in any other suitable manner and technique.

In at least one closed position, the exemplary doors 328 may be configured to substantially or fully, fluidly seal the intake opening(s) 102 and the mouth 43 of the vessel 10 (e.g. to prevent wave splash from entering the vessel 10 and/or debris from escaping from the vessel 10 therethrough during transit to a debris field, for one or more other purposes or a combination thereof). In at least one open position, the exemplary gates 330 allow sea water/debris flow into the IFR chamber 310 for debris recovery operations. If desired, the door(s) 328 may be configured to funnel or encourage debris to move towards the IFR chamber 310 during debris recovery operations. In fact, the door(s) 328 may have any of the compatible features, details or capabilities of the elongated boom(s) 190 as described above and/or shown in other figures appended hereto (e.g. FIG. 1). However, front doors 328 may not be included in some embodiments or may have different or additional features.

Still referring FIGS. 48 & 49, if desired, one or more large-sized debris guards 334 may be provided at the front 42 of the vessel 10 to assist in preventing large-sized debris 41 from entering into and/or blocking the IFR chamber 310. When included, the large-sized debris guard(s) 334 may have any suitable form, quantity, size, configuration, components, construction, precise location, orientation and operation. In this embodiment, a single large-sized debris guard 334 is configured to extend at least partially across the intake opening(s) 102 and/or mouth 43 of the vessel 10 and is at least partially perforated to allow the flow of sea water and small-sized debris 40 to pass therethrough. For example, the large-sized debris guard 334 may include grating or mesh having holes which are sized as desired.

The illustrated large-sized debris guard 334 is configured to be stowed atop the IFR chamber cover 316 (e.g. during transit and/or non-use of the debris recovery system 58) and deployable therefrom to one or more positions forward of the front 42 of the vessel 10. For example, the guard 334 may be pivotably coupled to the IFR chamber cover 316 (e.g. via one or more hinge pins 339) or other component of the vessel 10 and selectively pivotable (e.g. up, over and down, e.g. along arrows 341) relative to the vessel 10 (e.g. by electric or solar powered motor, hydraulic or pneumatic power source, manually or otherwise) between at least one stowed positon (334a) and at least one deployed position (334b). However, any other components and technique may be used to deploy the large-sized debris guard 334, when included. For example, it may be coupled to one or more front doors 328, manually placed in at least one deployed position, etc.

In a deployed position, the exemplary guard 334 extends angularly outwardly in front of the vessel 10 and between the open front door(s) 328 (when included) so that its bottom edge 336 is preferably typically submersed in sea water 38 during debris recovery operations. For example, the guard 334 may include a main (e.g. rectangular) panel 335 and side (e.g. triangular) wing panels 337 in order to extend fully between the open doors 328 and across the vessel mouth 43. In this embodiment, the side wing panels 337 are pivotably coupled to the main panel 335 between at least one folded (e.g. stowed) position and at least one open (e.g. deployed) position of the side wing panels 337, such as with hinge pins 342 or one or more other coupling devices.

If desired, the guard 334 may be selectively releasably coupled to the front door(s) 328 (e.g. gates 330), such as to increase the structural tolerance and/or strength of the doors 328 and/or guard 334, maintain the desired operating position(s) of the doors 328 and/or guard 334, other purpose(s) or a combination thereof. In this embodiment, the side wing panels 337 are configured to be selectively releasably coupled at or near their respective side edges 338 to the open gates 330 with retractable or releasable pins, clamps or the like. However, the large-sized debris guard 334, when included, may have any other suitable arrangement of components and operation.

Referring back to FIGS. 41 & 42, the IFRs 140 in the IFR chamber 310 may have any suitable form, quantity, size, configuration, construction, precise location, orientation and operation. In this embodiment, the front and rear IFRs 140c, 140d are both variable-buoyancy, pivoting-type IFRs 140. For example, the IFRs 140c, 140d may each include a variable buoyancy system 250 (such as described above and shown with respect to FIGS. 30-34 & 40). However, either or both of the IFRs 140c, 140d may be fixed-buoyancy and/or sliding-type IFRs 140 (such as described above and shown in the corresponding figures). The illustrated front IFR 140c is shown pivotably coupled to the front IFR support wall 320 (e.g. at the uppermost edge 56a of, and rearward of, the recessed front deck 56), while the illustrated rear IFR 140d is pivotably coupled to a rear IFR support wall 322 rearward of the front IFR 140c.

Multiple IFRs 140 (e.g. the front and rear IFRs 140c, 140d) may be used in the IFR chamber 310 to improve debris collection operations by directing or allowing mostly debris (more debris and less sea water) into the cargo compartment 60, dampening or reducing wave action and/or turbulence in water entering the vessel 10, providing for more consistent debris recovery operations during a project (e.g. by efficiently and effectively managing the impact of controllable and non-controllable variables to provide steady inflow of primarily debris (e.g. small-sized debris) into the cargo compartment(s) 60), other purpose(s) or a combination thereof. For example, in many use scenarios, the front IFR 140c may typically float primarily in sea water 38 in the IFR chamber 310 (e.g. FIG. 46) and be configured to assist in dampening or reducing the impact, size, action and/or turbulence of waves that may enter the intake opening(s) 102, encourage only the top layer(s) in the sea water (e.g. small-sized debris, oily water) to pass thereby, other desired purpose(s) or a combination thereof. In such instances, the variable buoyancy system 250 (when included) of the exemplary front IFR 140c may be selectively actuated/adjusted during operations based upon the fact that the front IFR 140c floats primarily in water (high density liquid) and in response to or anticipation of direct contact with waves and water turbulence. Thus, in some embodiments, the front IFR 140c may be used to act similarly as the angled wave diminishing surface 57 of the exemplary recessed front desk 56 (when included) as described above and may move drastically between positions. For example, when the body of water is calm (e.g. having a flat surface) during debris recovery operations, it may be desirable to maintain the front IFR 140c in a less buoyant (more horizontal) position. When there is turbulence on/near the surface of the body of water (e.g. due to waves), increased forward motion of the vessel, increased suction caused by the discharge pump(s) 184 (and or the debris pump(s) 380) or a combination thereof, it may be desirable to maintain the front IFR 140c in a more buoyant (angled) position.

Still referring to FIGS. 41 & 42, the exemplary rear IFR 140d may, in many use scenarios, typically float in primarily small-sized debris 40 (e.g. oil 34, oily water, algae bloom) in the IFR chamber 310 (e.g. FIG. 46) with little water turbulence (or less water turbulence than experienced by the front IFR 140c, particularly when the recessed front deck 56 and/or front IFR 140c successfully or significantly reduce the effect of wave action/turbulence in the liquid entering the IFR chamber 310 and/or allow primarily debris (e.g. small-sized debris 40) to pass to the rear IFR 140d). In at least those instances, the variable buoyancy system 250 of the rear IFR 140d may be selectively actuated/adjusted during operations based upon the facts that the rear IFR 140d floats primarily in debris (e.g. often having a lower density than sea water) and/or is subject to little or no wave action or water turbulence. The position of the exemplary rear IFR 140d may thus be fine-tuned (e.g. based upon the thickness and make-up of the debris floating through the IFR chamber 310, vessel speed, discharge pump 184 suction pressure) to optimize intake resistance, the cohesive properties of some small-sized debris 40, the ladle effect or a combination thereof.

In at least some scenarios, the front IFR 140c of various embodiments may be characterized as being more likely to adjust position (e.g. pivot and/or be selectively pivoted in response to controllable and/or non-controllable variables) drastically in its unique environment and to achieve the desired objectives of the front IFR 140c, while the rear IFR 140d may be characterized as more being more likely to adjust position (e.g. pivot and/or be selectively pivoted in response to controllable and/or non-controllable variables) by slight adjustments due to its unique environment and in order to optimize debris recovery operations. For example, the front IFR 140c of a debris recovery system 58 designed to effectively recover debris in a body of water that may have up to approximately twelve inch (12") waves (e.g. on inland bodies of water and shallow off-shore locations) may move (e.g. pivot) within an arc of up to approximately twelve-fourteen inches (12-14") in response to the controllable and non-controllable variables acting upon it during operations. In that scenario, the exemplary rear IFR 140d, though capable of moving within the same range of motion, may be expected to and/or selectively manipulated to move within a smaller range of motion in response to the controllable and non-controllable variables acting upon it and the desired objectives.

As discussed above, in various embodiments, during use of the debris recovery system 58, the buoyancy of the variable-buoyancy IFRs 140 may be adjusted by increasing or decreasing the amount of air in the buoyancy chamber(s) 152 of the IFR 140. In some embodiments, such as shown and discussed above with respect to FIGS. 30-34 & 40, the buoyancy may be increased, for example, by blowing air from a low-pressure air compressor through piping and/or flexible hoses (e.g. flexible hoses may accommodate the movement of the IFR 140) into the buoyancy chamber(s) 152. As air is introduced into the exemplary buoyancy chamber(s) 152, liquid is pushed out of the buoyancy chamber(s) 152 through one or more openings 154 in (e.g. the bottom of) the buoyancy chamber 152. The buoyancy of the exemplary variable-buoyancy IFR 140 may be decreased by releasing air from the buoyancy chamber(s) 152 through the same flexible hoses and/or piping (e.g. through one or more vent valves). In such instances, the hydrostatic pressure around the buoyancy chamber 152 will typically force water back into the chamber 152, resulting in increased weight of the IFR 140 and a tendency for the IFR 140 to be positioned lower, relative to the surface of the liquid it floats in. Letting water into a buoyancy chamber 152, such as described above, may be referred to herein as "ballasting" the IFR 140, while forcing water out of a buoyancy chamber 152 may be referred to as "de-ballasting" the IFR 140.

Referring again to FIGS. 41 & 42, some exemplary operational scenarios that may warrant adjustment to the buoyancy of one or more exemplary variable-buoyancy IFRs 140 (and/or other variables) include when the body of water is dead-calm verses having waves and/or water turbulence. In a dead calm situation, one or more of the exemplary IFRs 140 would typically not have to counter the dynamic force of waves/turbulence and can, if necessary, be ballasted to a less buoyant position. As waves or water turbulence increases, one or more of the exemplary IFRs 140 may be de-ballasted to a more buoyant position. For example, it may be desirable or necessary to (potentially significantly) de-ballast the front IFR 140c to press against and dampen or diminish the effect of the waves, and (typically) less necessary to de-ballast the rear IFR 140d or de-ballast it to a lesser degree.

For another example, when conditions allow, the exemplary vessel 10 may be configured to collect debris while in transit (typically moving forward) through the debris field or fields. The transit motion of the exemplary vessel 10 may create head waves at the front 42 of the vessel 10 and intake opening 102. The head waves may, in many instances, be avoided, reduced or mitigated by increasing the suction of the exemplary discharge pumps 184 (e.g. one or more operators visually observing the water in front of the vessel 10 to see or anticipate head waves and ramping up the pumps 184 as needed). For example, the exemplary discharge pumps 184 may be configured to suck in sea water from the cargo compartment 60 at a rate or volume that is at least slightly greater than the rate or volume of water/debris entering the intake opening 102, reducing or eliminating the existence or effect of head waves. If the maximum suction capacity of the exemplary discharge pump(s) 184 is achieved and head waves are forming, it may be desirable to slow the forward velocity of the vessel 10 to avoid, reduce or mitigate the existence or effect of the head waves. In any case, an increase in the transit motion of the exemplary vessel 10 or suction of the discharge pump(s) 184 (and/or suction of the debris pumps 380 (described below), typically to a less extent than the discharge pump(s) 184), or the existence of head waves or other water turbulence forward of the vessel 10, or any combinations thereof, will typically apply increased forces and/or friction upon the IFRs 140, which may be offset by de-ballasting one or more of the exemplary IFR(s) 140 to a more buoyant position. For example, it may be desirable or necessary to (potentially significantly) de-ballast the front IFR 140c, and (typically) less necessary to de-ballast the rear IFR 140d (or de-ballast it to a lesser degree than the front IFR 140c) to counter increased friction and/or forces thereupon.

For still a further example, the thicker the small-sized debris 40 (e.g. oil 34) on the surface 32 of the body of water 30, the less buoyant the exemplary IFRs 140 (particularly the rear IFR 140d) may typically need to be in order to allow more debris to pass or cascade over it/them. Thus, it may be desirable to (potentially significantly) ballast the exemplary rear IFR 140d and potentially also ballast the front IFR 140c (or ballast it to a lesser degree than the rear IFR 140d) depending upon the thickness of the debris 40. In scenarios with thicker debris, it may also or instead be beneficial to increase the suction of the exemplary discharge pump(s) 184 and/or transit velocity of the vessel 10 to increase debris inflow. Thus, adjustments to the buoyancy of the IFRs 140 may benefit from consideration of the other controllable and non-controllable variables.

In use scenarios when the small-sized debris 40 (e.g. oil 34) on the surface 32 of the body of water 30 is thin (e.g. a mere sheen), it may be desirable to de-ballast the exemplary IFRs 140 (particularly the rear IFR 140d) to make them more buoyant and cause a very thin layer of debris to pass over the front edge 142 thereof. As used herein, the terms "sheen" and variations thereof means a very thin layer of small-sized debris (e.g. oil), such as less than 0.0002-0.005 mm floating on the water surface. Finessing the position of the exemplary IFRs 140, particularly the rear IFR 140d, to cause a very thin layer (e.g. razor or paper thin, sheen) of the small-sized debris 40 to pass over it may increase the volume and cascading movement (rushing, ladle effect) of the debris being collected as it falls over the front edge 142 of the IFR 140 (e.g. due to the cohesive nature of the small-sized debris (particles pulling other particles across the surface of the body of water 30 into the vessel 10) and/or suction of the discharge pump(s) 184 to at least slightly lower the liquid level rearward of the IFR(s) 140 relative to the liquid level forward of the IFR(s) 140) and cause the liquid forward of the IFRs 140 to move rearward and accelerate the recovery of small-sized debris and amount of debris recovered). In fact, the use of the exemplary debris recovery system 58 may result in recovery of substantially all the small-sized debris on or near the surface of the body of water in the subject debris field(s).

Referring still to FIGS. 41 & 42, the illustrated fluid removal system 158 may include one or more discharge pumps 184 situated in one or more suction chambers 340 fluidly coupled to the cargo compartment(s) 60. In this example, two submersible, variable speed discharge pumps 184 are disposed in a single suction chamber 340 rearward of the cargo compartment 60. An example of a commercially available process pump that may be used as each discharge pump 184 in some embodiments of the present disclosure is the model S8M, 8" hydraulic, submersible, axial or mixed-flow, 2,000 gallons-per-minute (GPM) high-volume pump sold by Hydra-Tech Pumps (e.g. 2 each, resulting in 4,000 GPM maximum intake of water/debris into the vessel 10 and water removal from the cargo compartment 60). Other embodiments may include only one or more than two (e.g. 3, 4, 5, etc.) discharge pumps 184, one or more banks of discharge pumps 184, one or more non-variable speed and/or non-submersible discharge pumps 184, more than one suction chamber 340, other features or a combination thereof.

Figure 46:
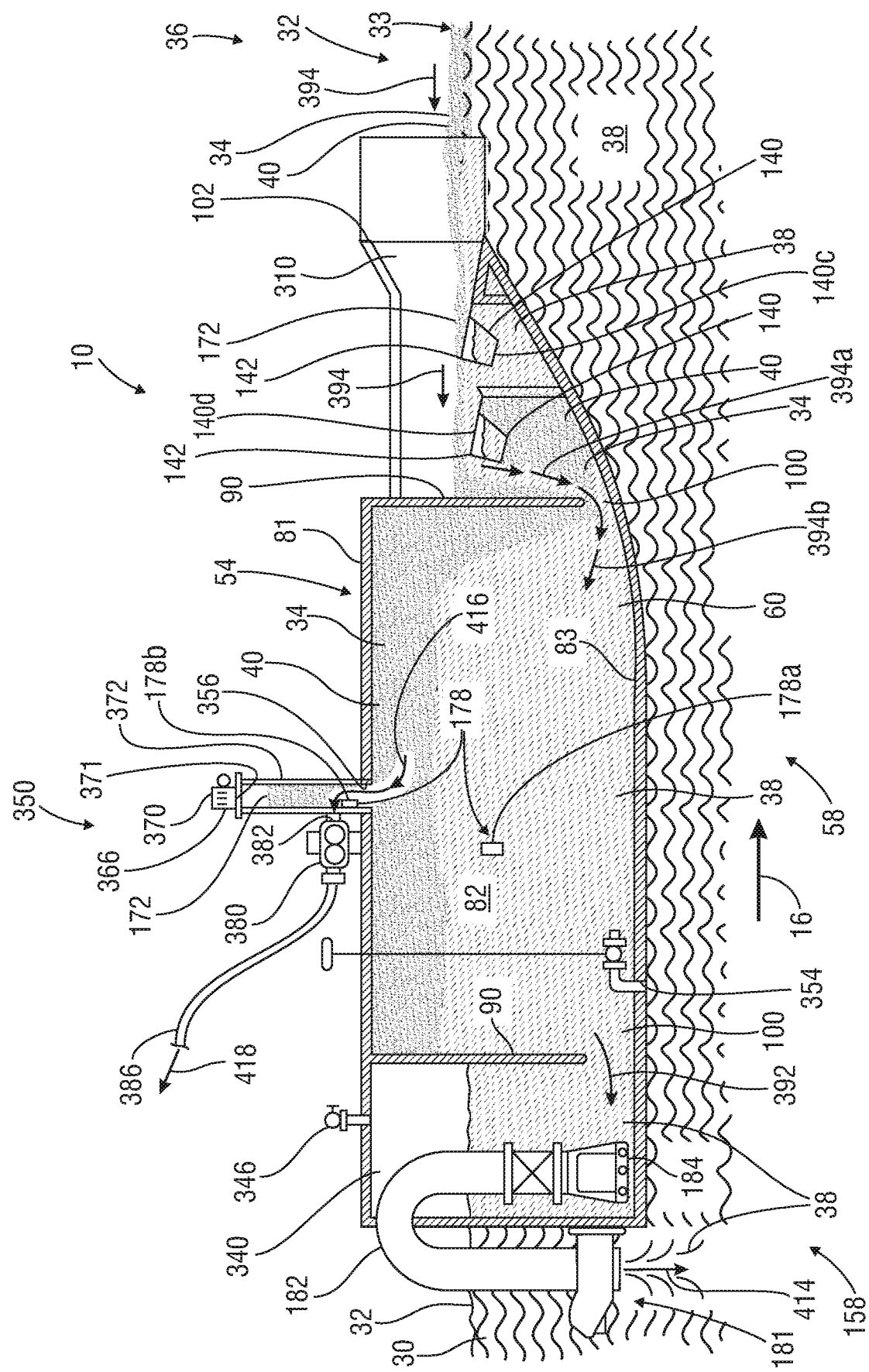
FIG. 46 is partial cross-sectional, side view of the exemplary vessel of FIG. 41 and the exemplary debris recovery system during exemplary debris recovery operations.

The exemplary suction chamber 340 is shown separated from the cargo compartment 60 by at least one vertical wall 90 and fluidly coupled to the cargo compartment 60 by at least one fluid passageway 100 that allows fluid flow past the vertical wall 90. As shown in FIG. 46, during debris recovery operations, the exemplary discharge pump(s) 184 is configured to create suction (e.g. in the suction chamber 340 and/or cargo compartment 60) to concurrently (i) draw at least substantially or entirely sea water from the cargo compartment 60, through the passageway(s) 100 and into the discharge pump(s) 184 (e.g. arrow 392) and (ii) draw debris (and typically some water) from the body of water 30, through the intake opening 102, into the IFR chamber 310 then over the IFRs 140 and into the cargo compartment 60 (e.g. arrows 394). Thus, while the exemplary passageway(s) 100 between the cargo compartment 60 and suction chamber 340 of this embodiment effectively serves at least one common or similar purpose as the "suction conduit(s) 160" described above and shown in various appended figures (e.g. FIGS. 1-2, 13-20), one or more actual suction conduits 160 could, in this embodiment, be coupled to one or more of the exemplary discharge pumps 184, if desired. Accordingly, the compatible features of the suction conduit 160 as described and shown elsewhere in this patent are hereby incorporated herein by reference for these embodiments.

Referring back to FIGS. 41 & 42, in this embodiment, a single passageway 100 is shown extending between the exemplary suction chamber 340 and cargo compartment(s) 60, situated proximate to the lower end 76 of the illustrated cargo compartment 60 and configured to typically be fully submersed in liquid (e.g. sea water) during operations (e.g. FIG. 46) to allow a vacuum to be created/maintained in the cargo compartment 60 during operations (such as described below), draw at least substantially only sea water out of the cargo compartment 60, for one or more other purposes or a combination thereof. For example, the lower end 91 of the vertical wall 90 may not extend down to the hull, or lower plate, 55 of the vessel 10 (or other part of the vessel 10) that forms or serves as the bottom 83 of the cargo compartment 60 and/or suction chamber 340. In such instance, the exemplary passageway 100 may be the entire space 101 extending below the lower end 91 of the vertical wall 90 and between the walls 82, 98 that define or form the cargo compartment 60 and suction chamber 340, respectively. In other examples, the passageway(s) 100 may comprise only part of the space 101, or one or more passageways 100 may be formed or provided in or proximate to the lower end 91 of the exemplary vertical wall 90 (which may extend to the bottom 83 of the cargo compartment and/or suction chamber 340, hull 55 or other component) or elsewhere. In other embodiments, one or more suction conduits 160 (such as described above and shown in the corresponding drawings) may also or instead extend between the cargo compartment(s) 60 and the suction chamber(s) 340 (and/or discharge pump(s) 184) and/or fluidly couple the cargo compartment(s) 60 with the suction chamber(s) 340 (and/or discharge pump(s) 184). Thus, the form, quantity, size, configuration, construction, precise location, orientation and operation of the passageway(s) 100 fluidly coupling the suction chamber 340 and cargo compartment(s) 60 are not limited or limiting upon the present disclosure, unless and only to the extent as may be expressly provided in a particular claim and only for that claim and claims depending therefrom. If desired, a selectively moveable gate (e.g. gate 110, FIG. 47) may be associated with the passageway(s) 100 to selectively seal off or fluidly isolate the suction chamber(s) 340 from the cargo compartment(s) 60 and/or for any other purposes.

Referring still to FIGS. 41 & 42, since the suction created by the exemplary discharge pump(s) 184 is configured to simultaneously remove sea water from the cargo compartment 60 and draw liquid/debris into the IFR chamber 310 and cargo compartment 60 (e.g. provide "active" removal of sea water from the cargo compartment 60), substantial pumping capacity may be necessary in various debris recovery scenarios (such as mentioned above). The liquid captured by the exemplary discharge pump(s) 184 may be delivered to any desired destination, such as discussed above. For example, the discharge pumps 184 may discharge liquid (e.g. entirely or substantially pure sea water) from the cargo compartment 60 into the body of water 30 via at least one discharge opening 181. If desired, the fluid removal system 158 may include one or more discharge pipe (or hose) sections 182 extending from the discharge pump(s) 184 to the body of water 30 (or another vessel, storage tank, bladder bag etc.) for discharging the liquid. However, any other components and techniques may be used for moving or transporting the liquid removed from the cargo compartment(s) 60 by the discharge pump(s) 184 off the vessel 10.

Still referring to FIGS. 41 & 42, the exemplary debris recovery system 58 may include an on-board debris separation system 350 configured to assist in removing recovered debris from the cargo compartment 60 and/or vessel 10. The debris separation system 350 may have any suitable form, configuration, components and operation. In this embodiment, the debris separation system 350 includes at least one suction chamber vent 344 to allow the suction chamber 340 to be selectively at least partially vented of air/gases. For example, during flooding of the exemplary cargo compartment 60 (and/or at any other desired times), the suction chamber vent 344 may be opened to allow air in the suction chamber 340 to escape and sea water to enter the suction chamber 340 sufficient to submerse the passageway(s) 100 between the suction chamber 340 and the cargo compartment 60 and allow a vacuum to be created in the cargo compartment 60, for any other purposes or a combination thereof. (In some embodiments, the exemplary suction chamber 340 will fill with sea water 38 to sea level 33 during flooding (e.g. FIG. 44) and the suction chamber vent 344 will be closed thereafter).

In the illustrated embodiment, the escape of air from the suction chamber 340 through the suction chamber vent 344 may, if desired, be selectively controlled with at least one suction chamber vent valve 346, cap or other component. When included, the suction chamber vent valve 346 may have any suitable form, quantity, size, configuration, construction, precise location, orientation and operation. For example, the suction chamber vent valve 346 (and suction chamber vent 344) may be selectively opened and closed manually (e.g. accessible by operators on the top deck 54) or electronically (e.g. via computer-based controller) as is and becomes further known. In some embodiments, the suction chamber vent valve 346 may, for example, be a suitable 3", 300 #, ball valve.

Still referring to FIGS. 41 & 42, the illustrated debris separation system 350 may include at least one flooding port 354 and at least one air discharge vent 356, both fluidly coupled to the cargo compartment 60. The exemplary flooding port(s) 354 is/are configured to allow the cargo compartment 60 to be selectively filled (e.g. to sea level 33, FIG. 44) with sea water from the body of water (e.g. by free-flooding or active filling of the cargo compartment(s) 60 prior to debris recovery operations). For example, a single flooding port 354 is shown formed in the bottom 83 of the cargo compartment 60 (e.g. the vessel hull 55) to provide direct fluid communication between the body of water and the cargo compartment 60. In other embodiments, the flooding port(s) 354 may be provided at any other location(s) in the cargo compartment 60 or elsewhere in the vessel 10 (e.g. and fluidly coupled to the cargo compartment(s) 60, such as with hoses or pipes).

In the illustrated embodiment, the flow of sea water into the cargo compartment 60 through the flooding port 354 may be selectively controlled with at least one flood valve 358. The flood valve(s) 358 may have any suitable form, quantity, size, configuration, construction, precise location, orientation and operation. For example, the flood valve 358 (and flooding port 354) may be selectively opened and closed via a manual flood valve handle 360 (e.g. accessible by operators on the top deck 54) or electronically (e.g. via computer-based controller) as is and becomes further known. In some embodiments, the flood valve 358 may be a suitable 3", 150 #, flanged ball valve. In other embodiments, a flood valve 358 may not be included (e.g. one or more remotely controllable cap, conduit, submersible fluid pump 376 (e.g. FIG. 47) or other component be provided).

Still referring to FIGS. 41 & 42, the exemplary air discharge vent(s) 356 is/are configured to allow air (and any other gases) in the cargo compartment(s) 60 to be selectively evacuated therefrom (e.g. during flooding of the cargo compartment(s) 60 and/or during debris recovery operations). The evacuation of air from the cargo compartment(s) 60 may be desirable, for example, to allow debris floating in the cargo compartment 60 to reach up to the upper end 74 of the cargo compartment 60 for subsequent removal therefrom and help ensure only (or primarily) sea water is drawn by the discharge pump(s) 184 out of the cargo compartment(s) 60. In this embodiment, a single air discharge vent 356 is provided in the cargo compartment 60 at the upper end 74 thereof (e.g. in the top deck 54 of the vessel 10 or wall 81 forming the top of the compartment 60). If desired, the exhaust of air (and/or other gases) from the cargo compartment 60 through the air discharge vent 356 may be selectively controlled with at least one valve 362 (e.g. FIG. 47), door or other component. However, the suction chamber vent(s) 344, suction chamber vent valve(s) 346, flooding port(s) 354, flood valve(s) 358 and the air discharge vent(s) 356 may have any other suitable form, quantity, size, configuration, construction, precise location, orientation and operation or may not be included in various embodiments.

Still referring to FIGS. 41 & 42, the exemplary on-board debris separation system 350 may include one or more air evacuators 366 configured to encourage the flooding and air (gas) evacuation of the cargo compartment 60. In various embodiments, for example when the exemplary air discharge vent(s) 356 (e.g. disposed at or near the upper end 74 of the compartment 60) and the exemplary flooding port(s) 354 are open and each of the passageways 100 to the compartment 60 is submersed in liquid and/or closed off, a vacuum may be formed in the compartment 60, all or a desired lesser amount of air and other gases therein may be removed therefrom by actuation of one or more air evacuator(s) 366 and the entire cargo compartment 60 (or a desired lesser amount) may be filled with sea water (e.g. FIG. 45).

Figure 47:
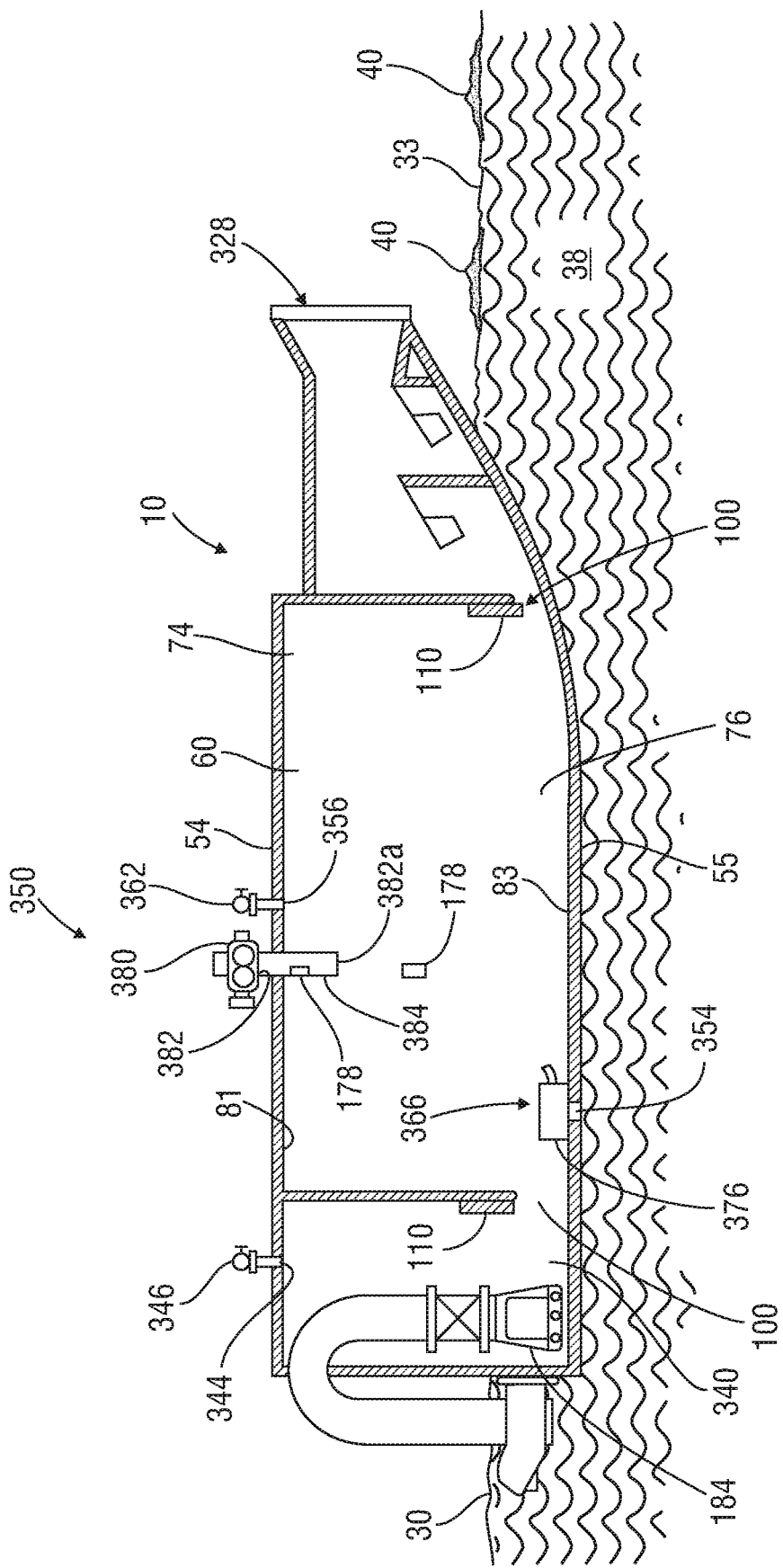
FIG. 47 is partial cross-sectional, side view of the exemplary vessel of FIG. 41 but having an alternate embodiment of components for flooding and air evacuating the illustrated cargo compartment in accordance with an embodiment of the present disclosure.

The air evacuator(s) 366 may have any suitable form, quantity, size, configuration, construction, precise location, orientation and operation. In this embodiment, the air evacuator 366 includes a vacuum pump 370 (e.g. 24 volt standard vacuum pump) fluidly coupled to the air discharge vent 356 at at least one inlet 371 so that the vacuum pump 370 can be selectively actuated to draw air (and other gases) out of the cargo compartment 60 and exhaust it to atmosphere (or other desired destination). In other embodiments, the air evacuator(s) 366 may also or instead include at least one submersible fluid pump 376 (e.g. FIG. 47) configured to actively pump sea water 38 into the cargo compartment 60 and push out the air and/or other gas therein. For example, as shown in FIG. 47, a submersible fluid pump 376 may be fluidly coupled to one or more of the flooding ports 354 (e.g. at the lower end 76 of the cargo compartment 60). In such instance, a selectively actuated door (e.g. gate 110) may be needed to block the passageway(s) 100 between the IFR chamber 310 and/or suction chamber 340 and the cargo compartment 60 to enable flooding of the cargo compartment 60 as desired. However, the air evacuator 366, when included, may have any other suitable form, components, configuration and operation.

Still referring to FIGS. 41 & 42, the on-board debris separation system 350 may include one or more debris pumps 380 configured to remove small sized debris 40 from the cargo compartment 60 (e.g. during or after debris recovery operations). The debris pump(s) 380 may have any suitable form, quantity, size, configuration, construction, precise location, orientation and operation. For example, the debris pump 380 may be a pump capable of pumping liquid and small-sized solid debris (e.g. 1.5" particles or more or less). An example of a commercially available pump that may be used as the debris pump 380 in some embodiments of the present disclosure is the model VX136-210Q positive displacement, self-priming, rotary lobe, 610 GPM volume pump sold by Vogelsang. In some embodiments, the debris pump 380 may be variable speed, or multiple independently controllable debris pumps 380 may be included, such as to serve as a controllable variable during debris recovery operations, provide greater flexibility in the speed of off-loading the debris, other purpose or a combination thereof.

In this embodiment, the inlet 382 to the illustrated debris pump 380 is fluidly coupled to the cargo compartment 60 (e.g. via the air discharge vent 356) at or near the upper end 74 thereof (e.g. to assist in ensuring that only (or primarily) debris that floats to the upper end 74 of the cargo compartment 60 is removed thereby and/or for any other purpose).

In other embodiments, the inlet 382 to the debris pump(s) 380 may be fluidly coupled to the cargo compartment 60 at a location 382*a* (e.g. FIG. 47) in the compartment 60 spaced down from the upper wall 81 of the compartment 60 (e.g. via extension 384). For example, in some embodiments, the inlet 382 may be positioned in the cargo compartment 60 to be submersed in debris therein substantially throughout operations (e.g. to ensure that air/gas that may enter the cargo compartment 60 is not sucked into the debris pump 380 and/or for any other purpose).

Referring still to FIGS. 41 & 42, the exemplary debris pump 380 may, if desired, be configured to off-load or deliver the recovered debris to any desired location during debris recovery operations (e.g. without at least significant, or any, interruption in debris recovery) so that there is effectively no limit in the volume of debris that can be (e.g. rapidly) recovered. For example, one or more hoses, or pipes, 386 may be coupled between the debris pump 380 and one or more other vessels (e.g. barges, ships), floating or submersed storage tanks, bags or other debris storage containers 388, any other destination (on or off shore, on or off the vessel 10) or a combination thereof. Thus, the exemplary debris recovery system 58 is configured to effectively remove a virtually unlimited volume of collected debris 40 during operations and does not need to store the recovered debris on-board. The system 58 may therefore be used continuously to recover debris, separate debris from sea water and separately off-load collected debris and sea water without interruption and unlimited by volume.

Referring to FIGS. 41 & 46, in some embodiments, one or more vacuum trunks 372 may be associated with (e.g. provided over) the air discharge vent(s) 356. The vacuum trunk(s) 372 may have any suitable form, quantity, size, configuration, construction, precise location, orientation and operation. In some embodiments, the vacuum trunk 372 is configured to extend upwardly from (e.g. and above the upper wall 81 of) the cargo compartment 60. If desired, the inlet(s) 382 to the exemplary debris pump(s) 380 may be fluidly coupled to the vacuum trunk 372 upwardly of the top (e.g. upper wall 81) of the cargo compartment 60, and the inlet(s) 371 to the vacuum pump(s) 370 may be spaced upwardly of the inlet 382 to the debris pump 380. With this exemplary arrangement, the vacuum pump 370 may be configured to evacuate air, and other gases, 28 (e.g. FIG. 44, arrows 396) from the cargo compartment 60 (e.g. after free-flooding) sufficient to allow sea water/debris in the cargo compartment 60 to then fill the compartment 60 (e.g. FIG. 45) and extend up into the trunk 372 to a level 172 (e.g. FIG. 46) ideally above the inlet 382 to the debris pump 380 (e.g. FIG. 46). In such instances, floating debris (e.g. small-sized debris 40) will be able to rise all the way to the top of the exemplary cargo compartment 60 and into the trunk 372 (e.g. providing for a maximum volume of debris collected in the compartment 60 and removed therefrom) and can be maintained at a level 172 in the trunk 372 above the inlet 382 to the exemplary debris pump 380 (e.g. ensuring that (at least substantial) air is not sucked into the debris pump 380 when it is actuated and/or for any other purposes). However, the vacuum trunk(s) 372, when included, may have any other configuration and operation.

Still referring to FIGS. 41 & 46, if desired, the debris separation system 350 may include one or more sensors 178, such as to indicate that water or debris in the cargo compartment 60 is at a desired height, depth and/or volume to turn on or off the debris pump(s) 380, any other desired purpose or a combination thereof. The sensor(s) 178 may be provided at any desired location(s). For example, one or more sensors 178 may be provided on one or more of the walls 81, 82, 90 inside the cargo compartment 60 and/or inside the vacuum trunk 372 or extension 384 (e.g. FIG. 47). In the present embodiment, at least a first sensor 178*a* (e.g. FIGS. 41 & 42) is provided inside the cargo compartment (e.g. on one or more of the walls 82 approximately midway between the walls 90 and approximately 12" (or more or less) above the top of the highest passageway 100) to indicate when the debris pump(s) 380 need to be "on" to remove debris from the compartment 60 (e.g. to assist in avoiding (more than minimal) debris being sucked into the discharge pump(s) 184). At least a second exemplary sensor 178*b* may be provided inside the vacuum trunk 372 (or extension 384, FIG. 47) below the inlet(s) 382 to the debris pump(s) 380 to indicate when the debris pumps 380 should preferably be "off" (e.g. to assist in avoiding (more than minimal) sea water being sucked into the debris pump 380). Some exemplary alternative or additional arrangements for detecting debris/water levels in the vessel 10 may include visual inspection (via camera, naked eye, etc.) by operators on the vessel 10 (e.g. through windows, periscopes, etc.), the use of cameras at the desired location(s), the use of one or more mechanical debris level indicators (e.g. configured to float on the surface of water in the cargo compartment 60 and/or vacuum trunk 372 but not in debris (e.g. oil)) visible to operators via an extension through and above the top deck 54 or otherwise.

An exemplary embodiment of a method of debris recovery with the debris recovery system 58 of FIGS. 41-47 will now be described. FIG. 41 illustrates an exemplary state of the system 58 and vessel 10 during transport to the debris field. When included, the exemplary port(s) 354, vents 344, 356, valves 346, 358, 362 and front doors 328 may be closed and the various pumps 184, 370, 380 preferably off during transport.

Figure 43:
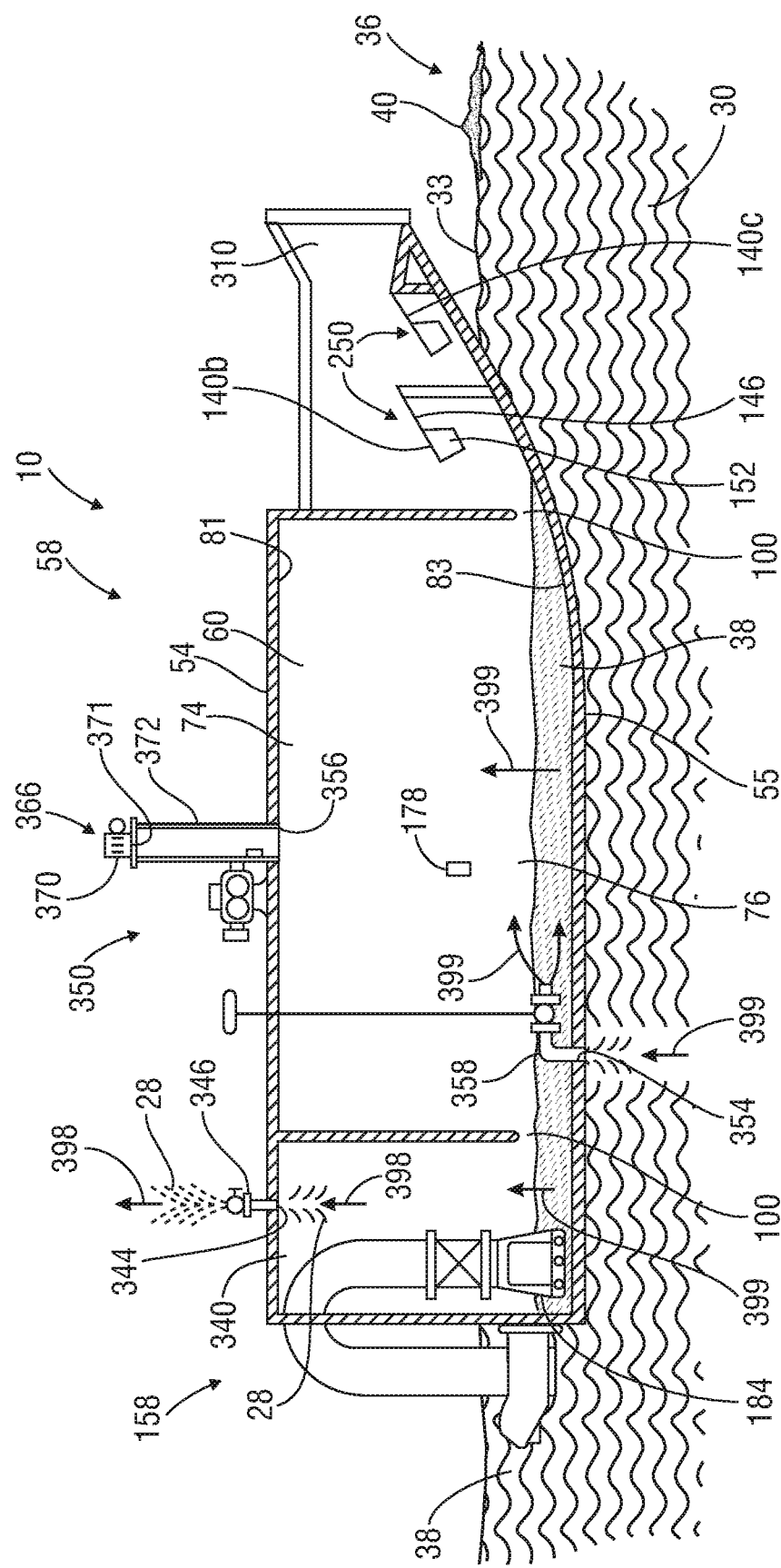
FIG. 43 is partial cross-sectional, side view of the exemplary vessel of FIG. 41 and the exemplary debris recovery system at the beginning of free-flooding of the exemplary cargo compartment in accordance with an embodiment of the present disclosure.

Referring now to FIG. 43, upon arriving at the debris field 36 (or earlier if desired), the exemplary cargo compartment 60 is flooded with sea water 38, such as described above. For example, the illustrated suction chamber vent 344 and the flooding port 354 may be opened, such as by actuating the valves 346, 358, to allow air escape (e.g. arrows 398) from the suction chamber 340, as desired, and free-flooding (e.g. arrows 399) of the cargo compartment 60 (e.g. and the IFR chamber 310 and suction chamber 340) to the desired level, such as until the height of sea water 38 in the compartment is (at least approximately) at sea level 33 (e.g. FIG. 44). (The air discharge vent 356 may or may not be open depending upon operator preference or any other variable(s)).

Figure 44:
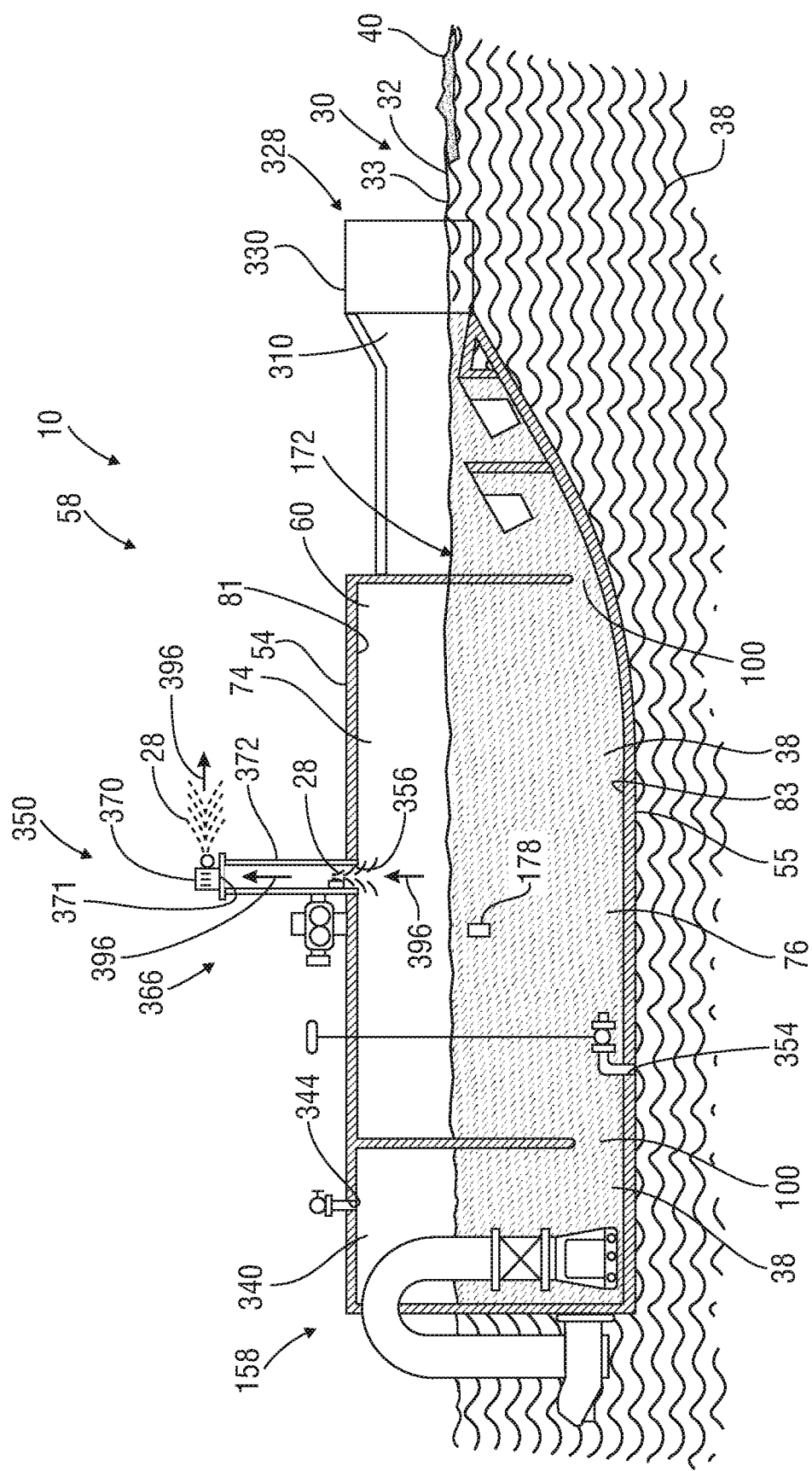
FIG. 44 is partial cross-sectional, side view of the exemplary vessel of FIG. 41 and the exemplary debris recovery system at the end of free-flooding and the beginning of air evacuation of the exemplary cargo compartment in accordance with an embodiment of the present disclosure.

Referring now to FIG. 44, in this embodiment, the exemplary cargo compartment 60 is shown passively free-flooded with sea water 38 to the desired level (e.g. sea level 33) and above the passageways 100 to the compartment 60 to provide a liquid-based seal of the compartment 60. The exemplary suction chamber vent 344 is typically closed and, if the vessel includes one or more front door(s) 328 (e.g. gates 330), one or all doors 328 are typically opened. Gas may then be evacuated from the exemplary cargo compartment 60 (e.g. at or near its upper end 74), such as described above and to form ideal conditions for the removal of debris from the compartment 60 during debris recovery operations, for any other purpose or a combination thereof. In this embodiment, the vacuum pump 370 is turned on to remove gases from the compartment 60 (e.g. arrows 396) until sea water 38 in the cargo compartment 60 rises to the desired level (e.g. above the inlet 382 to the debris pump 380, FIG. 45). (The exemplary flooding port(s) 354 may be open or closed during air evacuation of the cargo compartment 60 depending upon operator preference or any other variable(s)).

However, any other method of and components for evacuating air from the cargo compartment 60 or otherwise at least substantially flooding or filling the compartment 60 with liquid may be used. For example, in the embodiment of FIG. 47, one or more fluid pumps 376 may be used to actively flood the cargo compartment 60 (e.g. with sea water 38) to the desired level (e.g. completely). In such instance, it may be necessary or desirable to open the air discharge vent(s) 356 (e.g. with valve 362) during flooding to allow the air in the compartment 60 to be vented or pushed out and temporarily block the passageway(s) 100 and/or the intake opening(s) 102 and/or close the suction chamber vent 344 such as to fill the compartment 60 with sea water 38 to the desired height. In this embodiment, the cargo compartment 60 is flooded until sea water 38 in the cargo compartment 60 rises to the desired level (e.g. to the upper wall 81 and/or above the inlet 382 to the debris pump 380 (or an alternate location 382*a* thereof) or to any other height).

Figure 45:
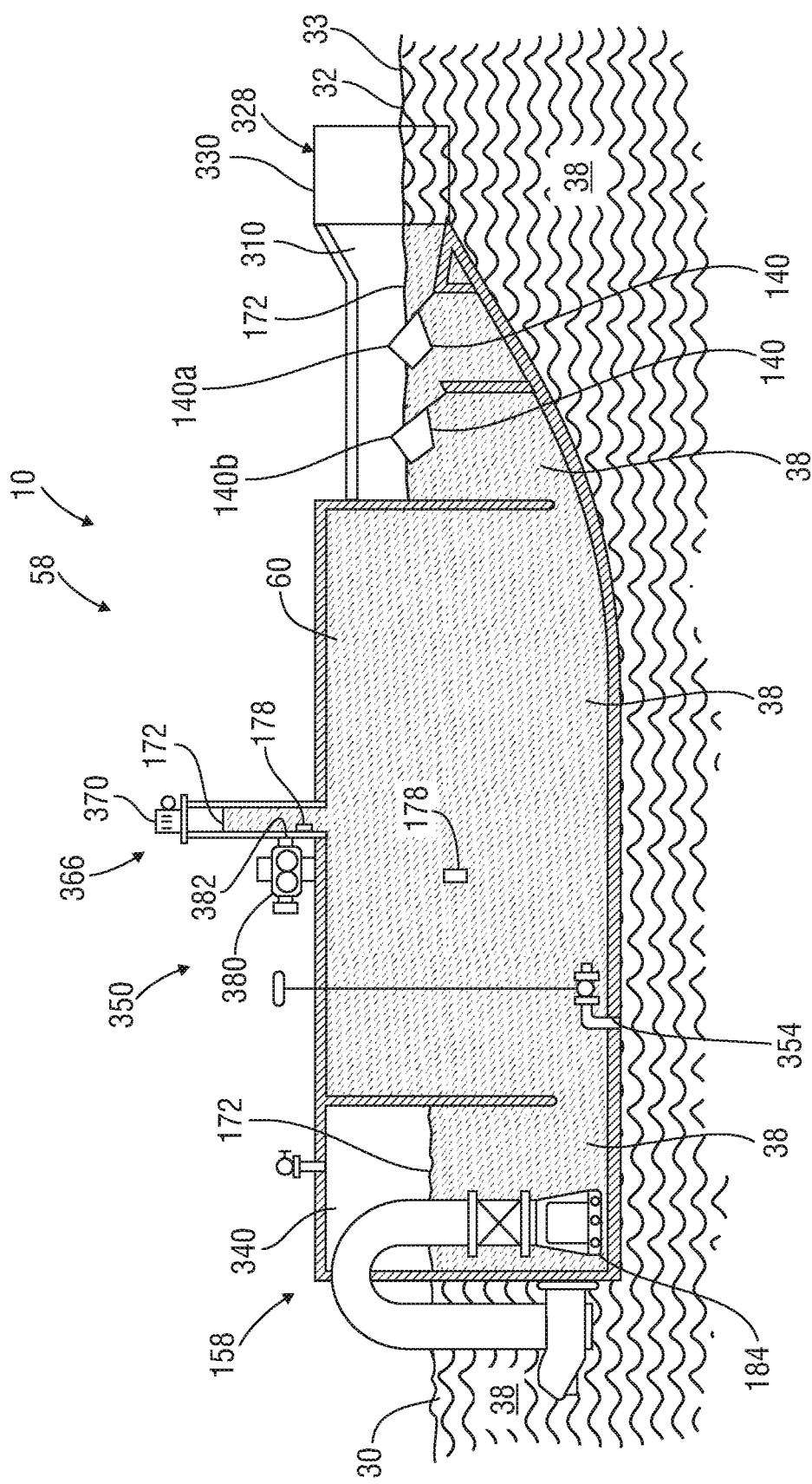
FIG. 45 is partial cross-sectional, side view of the exemplary vessel of FIG. 41 and the exemplary debris recovery system at the end of air evacuation of the exemplary cargo compartment in accordance with an embodiment of the present disclosure.

Referring now to FIG. 45, after the exemplary cargo compartment 60 has been flooded and evacuated of air as desired, the flooding port 354 (if left open) may be closed, the vacuum pump 370, fluid pump 376 (e.g. FIG. 47) or other air evacuator 366 turned off and all doors (e.g. front door 328 to the vessel 10 and gates 110 (FIG. 47)) to the cargo compartment 60 opened. In this embodiment, the discharge pumps 184 and the inlet 382 to the illustrated debris pump 380 are sufficiently submersed in sea water 38. The exemplary vessel 10 is situated in the body of water 30 at a height so that the IFRs 140 are floating in sea water 38 in the IFR chamber 310 as desired and the exemplary debris recovery system 58 is ready for (e.g. continuous) debris recovery, separation and off-loading operations, such as described above.

Referring now to FIG. 46, during debris recovery operations, any among the position, location and transit velocity of the exemplary vessel 10, suction pressure of the discharge pumps 184, off-loading of debris through the debris pump(s) 380 and position/buoyancy of the IFRs 140 may be adjusted (e.g. dynamically and in real-time), such as described above (e.g. based upon one or more controllable and/or non-controllable variables), such as to optimize the intake resistance of the IFRs 140, optimize the efficiency and effectiveness of debris recovery, other purpose of a combination thereof. In this embodiment, the exemplary discharge pump(s) 184 may be actuated as desired to concurrently (i) draw in (at least primarily) sea water 38 from the cargo compartment 60 (e.g. arrow 392) and discharge it to the body of water 30 (e.g. arrow 414), (ii) draw debris (and typically some water) from the body of water 30, through the intake opening 102, into the IFR chamber 310 and over the IFRs 140 (e.g. arrows 394) and (iii) draw primarily debris over the front edge 142 of the rear IFR 140*d* and (e.g. steeply) down into and through the passageway 100 (e.g. arrows 394*a*, 394*b*) from the IFR chamber 310 to the compartment 60. In many situations, this suction of the exemplary discharge pump(s) 184 and other variables will effectively, and possibly only slightly but importantly, lower the front edge 142 of the rear IFR 140*d* and level 172 of debris/sea water in the IFR suction chamber 310 rearward of the rear IFR 140*d* and cause or allow debris to rush or rapidly cascade over the rear IFR 140*d* and down into the cargo compartment 60, essentially separating the debris from the sea water and not emulsifying them together. Depending upon the level of debris 40 in the exemplary cargo compartment 60 (e.g. as indicated by one or more sensors 178 or otherwise), the exemplary debris pump(s) 380 may be actuated to remove debris from the cargo compartment 60 (e.g. arrows 416) and offload it (e.g. arrow 418) to another vessel or any other desired destination, such as described above. Thus, in this embodiment, as long debris in the cargo compartment 60 is at or above a desired level and the exemplary debris pump 380 is coupled to a debris delivery destination (e.g. barge, storage bladder, etc.) with available storage capacity, debris can be continuously recovered, separated and off-loaded from the vessel 10. The movement and velocity of the exemplary vessel 10, buoyancy of one or more IFRs 140 and suction pressure of the exemplary discharge pump(s) 184 may be varied as desired (e.g. for one or more reasons such as described above, on an on-going real-time basis) throughout debris recovery operations.

Figure 50:
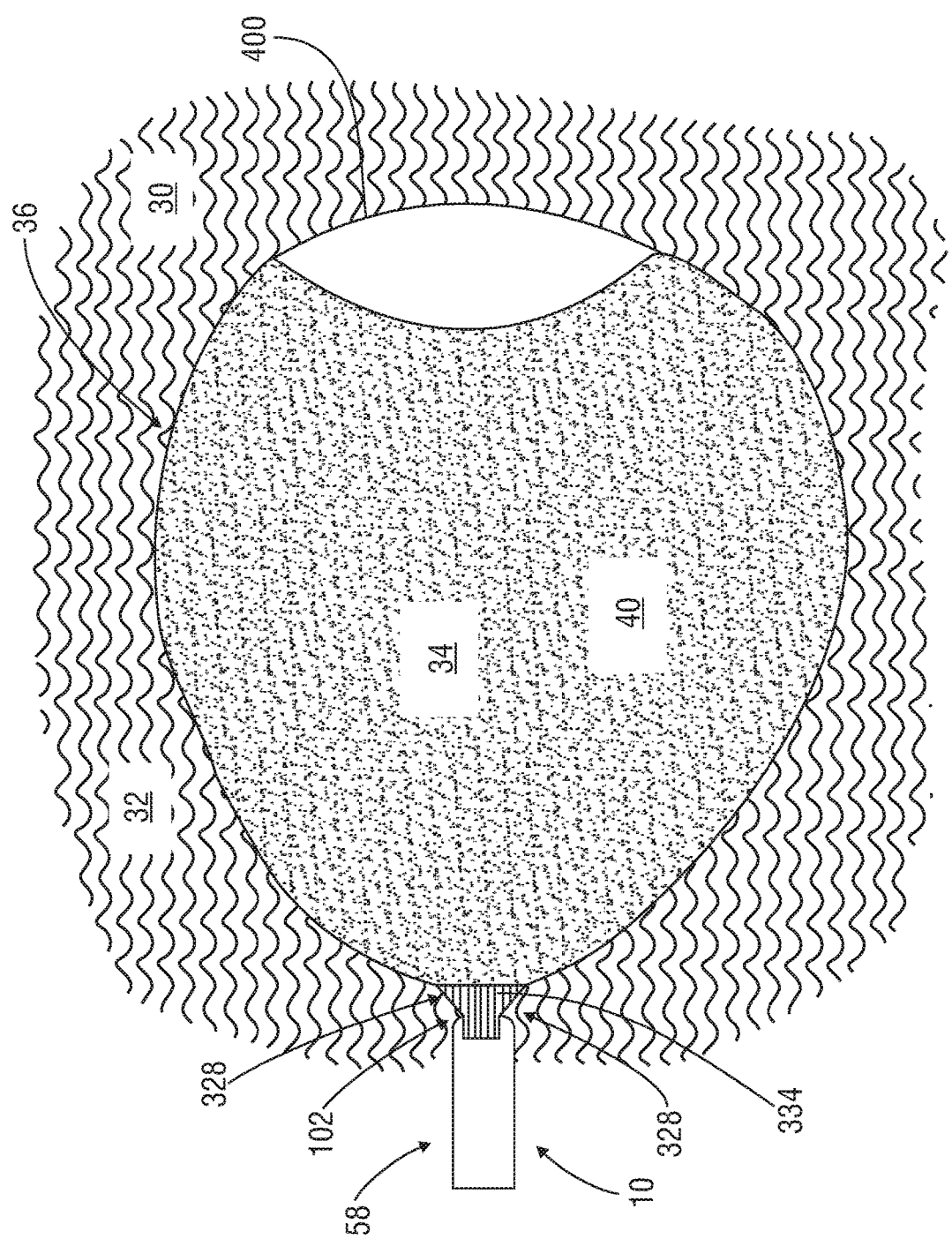
FIG. 50 is a top view of the exemplary vessel of FIG. 48 and equipped with an exemplary debris containment boom coupled to the exemplary front doors of the vessel and surrounding an exemplary debris field in accordance with an embodiment of the present disclosure.

Referring again to FIGS. 41-51 the exemplary vessel 10 may collect debris in a variety of modes. For example, in some situations, the vessel 10 can be positioned stationary during debris recovery operations (e.g. in still, or relatively still, water). Referring to FIG. 50, if desired, one or more debris (e.g. oil) containment booms 400 may be used to increase the efficiency, speed and/or effectiveness of debris recovery operations. The containment boom 400 may have any suitable form, quantity, size, configuration, construction, precise location, orientation and operation. Typical commercially available oil containment booms, for example, are constructed at least partially of flexible (e.g. vinyl) material and configured to extend partially above and partially below the surface 32 of the body of water 30 (e.g. with flotation foam and weighted chain or cable). For example, the containment boom 400 may be coupled at one end to one of the exemplary doors 328 (e.g. at the forward-most point of the door) of the debris recovery system 58, around one or more patches of debris (e.g. oil) and coupled, at its other end, to the other door 328 (e.g. at the forward-most point of the door). As debris is collected on the exemplary vessel 10 and/or the debris on or near the surface of the body of water 30 begins to thin, the containment boom(s) 400 can be drawn in a tighter area, drawing the debris patch as it decreases in volume closer to the intake opening 102.

Figure 51:
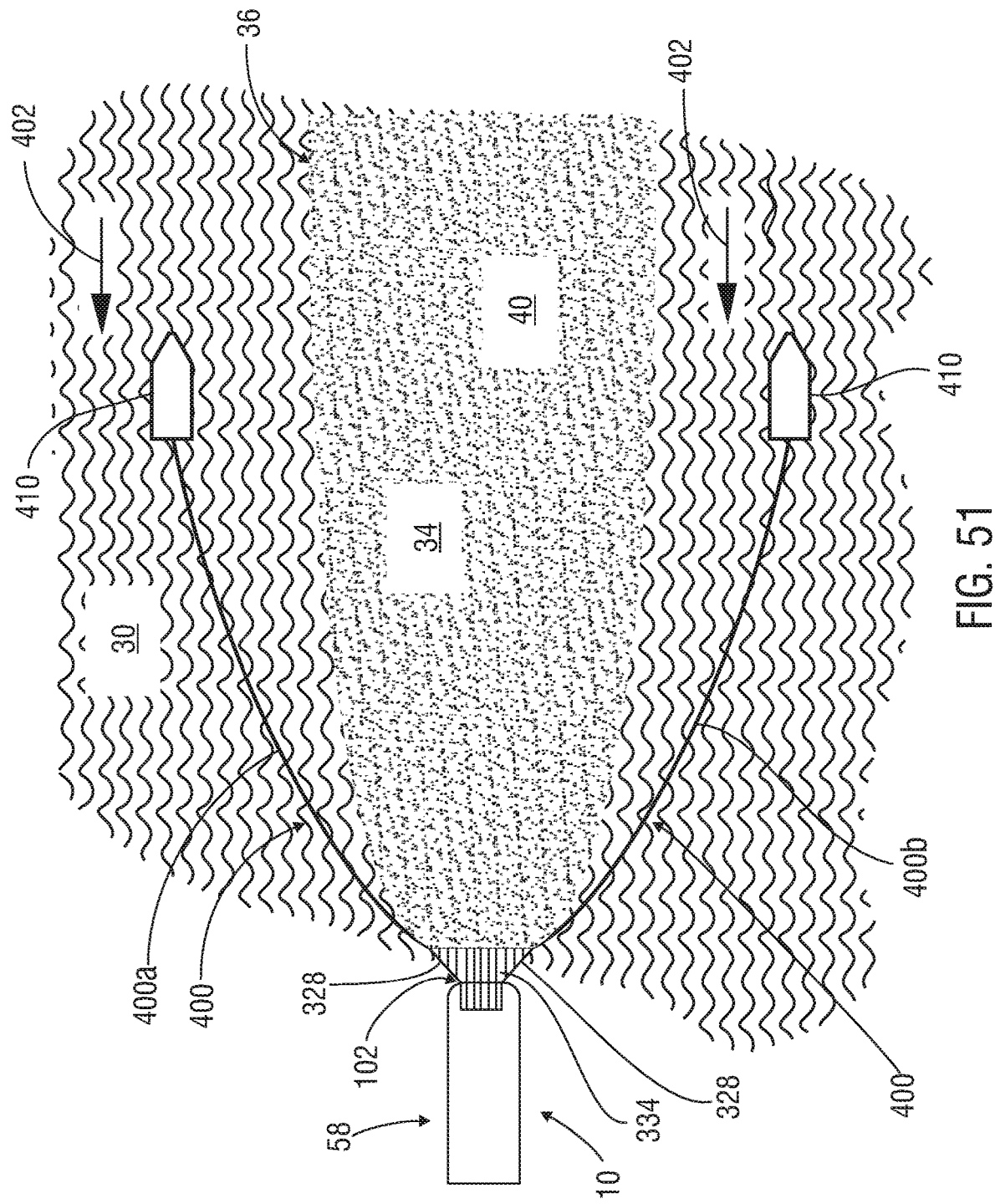
FIG. 51 is a top view of the exemplary vessel of FIG. 48 and equipped with two debris containment booms coupled to the exemplary front doors of the vessel and a pair of exemplary assist vessels in accordance with an embodiment of the present disclosure.

Now referring to FIG. 51, in a river, or other flowing body of water 30, the exemplary vessel 10 may, in some instances, face upstream and be positioned downstream of one or more debris fields 36. Arrows 402 indicate the flow of the current. If desired, one end of first and second containment booms 400*a*, 400*b* may be coupled to one of the doors 328 (e.g. at the forward-most point thereof) respectively, and the containment booms 400*a*, 400*b* extended outwardly therefrom (e.g. to near the shore line) around the debris field(s) 36. For example, the other ends of the respective containment booms 400*a*, 400*b* may be coupled to a respective assist vessel 410 (e.g. adjacent to or upstream of the vessel 10). In this exemplary mode of operation, the vessel 10 may be moving, stationary or alternate therebetween to stay with the floating debris, optimize debris recovery operations, etc. Depending on one or more variables, such as the velocity of the current and the size of the debris field 36, for example, the exemplary vessel 10 may drift almost freely with the current, be propelled downstream at a higher rate than the current, or moved in a forward direction so that it moves upstream against the current, as desired, in order to stay with the debris field 36 (e.g. at or near the forward edge of the debris field 36) and, at the same time, strive to continuously recover debris. With the exemplary debris recovery system 58 (having the ability to offload debris to one or more accompanying transports, vessels, barges or other destinations and other capabilities such as described herein), the vessel 10 may be capable of staying with the moving debris field and recover, separate and dispose of debris without interruption, collecting greater quantities (or virtually all) of the debris on the moving water as compared to other known techniques and regardless of the size of the debris field and volume of debris.

Referring back to FIGS. 41-47, whenever sea water is drawn into the exemplary vessel 10 (without debris) by the suction of the discharge pump(s) 184, the pumps 184 will pump out the ingested sea water 38 without inhibiting other operations. Because debris (e.g. oil) and sea water recovered during typical operations with the exemplary system 58 is not (further) emulsified on the vessel 10 and the system 58 can typically discharge (at least substantially) all of the sea water 38 it takes in, the operation of the vessel 10 and system 58 of various embodiments is not affected by travelling though areas where no debris exists between disconnected patches of debris, allowing for the collection of debris immediately upon reaching the debris field(s) and without the need for taking the time to deploy or use any containment booms 400. Accordingly, in modes of use of the exemplary debris recovery system 58 in one or more debris fields 36 that include multiple discontinuous or disconnected debris patches (or the debris field is broken up due to weather or other causes), the exemplary vessel 10 of various embodiments can transit, or be moved, throughout the greater area and provide continuous debris recovery without delay or interruption (and without the need to deploy debris containment booms 400.

In accordance with various embodiments of the present disclosure, the debris recovery system 58 in able to recover, or ingest, and store (or dispose of) large amounts of debris (e.g. oil) on the vessel 10 without causing any or significant additional mixing, or emulsification, of the debris with water on the vessel 10. By so avoiding further emulsification, the need to separate the debris and water on board is minimized or reduced, reducing the need for extensive separation equipment, allowing for the discharge of a high volume of water or high ratio of water to debris, reducing the time and cost of operations and storage and transport of the recovered debris before final disposal or recycling, other purpose(s) or a combination thereof.

In typical oil recovery operations, an oleophilic collection process is often used followed by the use of dispersants. After the dispersants are used, however, the typical oleophilic collection processes cannot be restarted for further debris collection. Thus, it is often difficult to know when to switch over (guess at the extent of the debris field) to dispersants. The oleophilic collection process may be terminated prematurely to the detriment of thorough and effective debris recovery operations. Since the exemplary debris recovery system 58 and methods of use thereof do not rely upon or use any oleophilic collection process, the system 58 can be used before and after the use of dispersants, providing great flexibility in determining when to utilize dispersants and likely improved effectiveness in debris recovery operations.

Any of the components described above or shown in the appended figures may be electronically controlled, such as with a computer-based controller, as is and becomes further know, to the extent that electronic control is desired and compatible for use with such component(s). Each embodiment described herein or shown in the appended figures and any other embodiments of the debris recovery system 58 may have any one or more of the features described herein, shown in the appended figures or apparent therefrom. Thus, the exemplary embodiments, for example, do not require all of the features presented herein or shown in the appended figures for such embodiments or other embodiments.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. System useful for collecting debris from a body of water on a vessel, the vessel having at least one cargo compartment configured to receive water and debris from the body of water through at least one intake opening during debris collection operations, each cargo compartment having respective upper and lower ends, the system comprising:
   at least one discharge pump fluidly coupled to at least one cargo compartment and being selectively controllable to concurrently (i) draw water and debris from the body of water into the at least one cargo compartment and (ii) remove water from the at least one cargo compartment;
   at least one trunk fluidly coupled to at least one cargo compartment at or above the upper end thereof; and
   at least one debris pump, distinct from the at least one discharge pump, fluidly coupled to at least one trunk and being selectively controllable to remove debris from at least one cargo compartment through the at least one trunk.

2. The system of claim 1 wherein the at least one discharge pump is fluidly coupled to at least one cargo compartment closer to the lower end than the upper end thereof and the at least one debris pump is fluidly coupled to at least one cargo compartment closer to the upper end than the lower end thereof.

3. The system of claim 1 wherein the at least one discharge pump is selectively controllable to vary the volume of water removed from at least one cargo compartment.

4. The system of claim 1 further including
at least one IFR chamber disposed between the at least one cargo compartment and the at least one intake opening, the at least one IFR chamber being at least partially separated from the at least one cargo compartment by at least one wall and fluidly coupled thereto by at least one passageway, and
at least one IFR at least partially free-floating at or near the surface of liquid in at least one IFR chamber.

5. The system of claim 4 wherein the at least one discharge pump is configured to lower the liquid level in at least one IFR chamber between the at least one IFR and at least one passageway to a height below the liquid level in the at least one IFR chamber between the at least one IFR and the at least one intake opening during debris collection operations.

6. The system of claim 4 further including first and second variable buoyancy IFRs disposed in the same IFR chamber, the second variable buoyancy IFR being positioned between the first variable buoyancy IFR and the at least one cargo compartment.

7. The system of claim 4 further including a variable buoyancy system associated with at least one IFR, the variable buoyancy system being configured to (i) allow air to escape from the at least one IFR and be replaced with liquid to decrease the buoyancy thereof and (ii) provide air into the at least one IFR and force liquid out of the at least one IFR to increase the buoyancy thereof.

8. The system of claim 1 further including at least one sensor disposed at least partially within at least one cargo compartment and/or at least one trunk and configured to indicate the height of water and/or debris in the at least one cargo compartment and/or at least one trunk.

9. A method of collecting debris from a body of water on a vessel, the vessel having at least one cargo compartment configured to receive water and debris from the body of water through at least one intake opening during debris collection operations, the method comprising:
selectively actuating at least one discharge pump fluidly coupled to at least one cargo compartment to concurrently (i) draw water and debris from the body of water into at least one cargo compartment and (ii) remove water from at least one cargo compartment;
selectively actuating at least one debris pump, distinct from the at least one discharge pump, to remove debris from at least one cargo compartment;
creating a vacuum above the surface of the contents in at least one cargo compartment; and
maintaining the vacuum during debris collection operations.

10. The method of claim 9 wherein each cargo compartment has upper and lower ends and the vessel includes at least one trunk fluidly coupled to at least one cargo compartment at or above the upper end thereof, further wherein the at least one debris pump is fluidly coupled to at least one trunk, further including
allowing debris to rise into at least one trunk from at least one cargo compartment, and
at least one debris pump removing debris from at least one cargo compartment through at least one trunk.

11. The method of claim 10 further including at least one sensor disposed at least partially within at least one cargo compartment and/or at least one trunk indicating the height of water in the at least one cargo compartment and/or trunk, respectively.

12. A method of collecting debris from a body of water on a vessel having at least one cargo compartment configured to receive water and debris from the body of water through (i) at least one intake opening and (ii) an inflow regulator (IFR) chamber fluidly coupled between at least one cargo compartment and at least one intake opening, the IFR chamber having first and second variable buoyancy IFRs at least partially free-floating at or near the surface of liquid therein during debris collection operations, the second variable buoyancy IFR being positioned between the first variable buoyancy IFR and the at least one cargo compartment, the method comprising:
at least a first pump both drawing water and debris from the body of water into at least one cargo compartment and removing water from at least one cargo compartment;
at least a second pump removing debris from at least one cargo compartment;
selectively actuating the first variable buoyancy IFR to de-ballast it higher in the at least one IFR chamber than the second variable buoyancy IFR when there is an increase in water turbulence and/or wave action in the body of water proximate to the at least one intake opening;
selectively actuating the second variable buoyancy IFR to de-ballast it higher in the at least one IFR chamber than the first variable buoyancy IFR when debris in the body of water is a sheen and/or decreases in thickness proximate to the at least one intake opening; and
selectively actuating the second variable buoyancy IFR to ballast it lower in the at least one IFR chamber than the first variable buoyancy IFR when debris in the body of water is thicker than a sheen and/or increases in thickness proximate to the at least one intake opening.

13. A method of collecting debris from a body of water on a vessel, the vessel including at least one cargo compartment having upper and lower ends and being configured to receive water and debris from the body of water through at least one intake opening during debris collection operations, at least a first pump being fluidly coupled to at least one cargo compartment and selectively controllable to concurrently draw water and debris from the body of water through at least one intake opening and into at least one cargo compartment and remove water from at least one cargo compartment, the method comprising:
selectively actuating at least a second pump having at least one inlet in fluid communication with at least one trunk that extends upwardly from and is fluidly coupled to at least one cargo compartment at or above the upper end thereof to remove debris from at least one cargo compartment through the at least one trunk; and
allowing air to be evacuated from the at least one cargo compartment through at least one air discharge vent disposed above the surface of contents in the at least one cargo compartment to ensure the at least one inlet of each second pump remains submersed in liquid throughout debris collection operations.

14. The method of claim 13 wherein the first pump removes water from at least one cargo compartment at or proximate to the lower end thereof and the second pump removes debris from at least one cargo compartment at or proximate to the upper end thereof.

15. The method of claim 14 further including
selectively controlling the first pump to vary the volume of water removed from at least one cargo compartment.

16. The method of claim 13 wherein at least one inflow regulator (IFR) chamber is disposed between the at least one cargo compartment and the at least one intake opening, the at least one IFR chamber being at least partially separated from the at least one cargo compartment by at least one wall and fluidly coupled thereto by at least one passageway, further including at least one IFR at least partially free-floating at or near the surface of liquid in at least one IFR chamber and limiting the water and debris drawn from the body of water into the at least one cargo compartment to primarily debris and water that passes over the at least one IFR.

17. The method of claim 16 further including the first pump lowering the liquid level in at least one IFR chamber between the at least one IFR and the at least one passageway to a height lower than the liquid level in the at least one IFR chamber between the at least one IFR and the at least one intake opening during debris collection operations.

18. The method of claim 16 further including selectively actuating a variable buoyancy system associated with at least one IFR to adjust the height thereof in the at least one IFR chamber.

19. The method of claim 16 wherein first and second variable buoyancy IFRs are disposed in the same IFR chamber, the second variable buoyancy IFR being positioned between the first variable buoyancy IFR and the at least one cargo compartment, further including
the first variable buoyancy IFR primarily reducing wave action and/or turbulence in the water and debris moving through the at least one IFR chamber from the intake opening(s) to the cargo compartment(s), and
the second variable buoyancy IFR primarily causing mostly debris to enter the at least one cargo compartment during debris collection operations.

20. The method of claim 16 wherein first and second variable buoyancy IFRs are disposed in the same IFR chamber, the second variable buoyancy IFR being positioned between the first variable buoyancy IFR and the at least one cargo compartment, further including
selectively actuating the first variable buoyancy IFR to de-ballast it higher in the at least one IFR chamber than the second variable buoyancy IFR when there is an increase in water turbulence and/or wave action in the body of water proximate to the at least one intake opening,
selectively actuating the second variable buoyancy IFR to de-ballast it higher in the at least one IFR chamber than the first variable buoyancy IFR when debris in the body of water is a sheen and/or decreases in thickness proximate to the at least one intake opening, and
selectively actuating the second variable buoyancy IFR to ballast it lower in the at least one IFR chamber than the first variable buoyancy IFR when debris in the body of water is thicker a sheen and/or increases in thickness proximate to the at least one intake opening.

21. The method of claim 13 further including
creating a vacuum above the surface of the contents of at least one cargo compartment, and
maintaining the vacuum during debris collection operations.

22. The method of claim 13 further including at least one sensor disposed at least partially within at least one cargo compartment and/or at least one trunk indicating the height of water and/or debris in the at least one cargo compartment and/or trunk.

* * * * *